US012797174B2

(12) United States Patent
Scherzinger et al.

(10) Patent No.: US 12,797,174 B2
(45) Date of Patent: Nov. 17, 2026

(54) DRIVE UNIT FOR AN ELECTRIC TOOTHBRUSH HANDPIECE, ELECTRIC TOOTHBRUSH HANDPIECE, METHOD FOR PRODUCING OF AN ELECTRIC TOOTHBRUSH HANDPIECE, ATTACHMENT BRUSH FOR AN ELECTRIC TOOTHBRUSH HANDPIECE, AND ELECTRIC TOOTHBRUSH

(71) Applicant: TRISA HOLDING AG, Triengen (CH)

(72) Inventors: Stefan Scherzinger, Willisau (CH); Jonas Scherrer, Sempach (CH)

(73) Assignee: TRISA HOLDING AG, Triengen (CH)

( * ) Notice: Subject to any disclaimer, the term of this patent is extended or adjusted under 35 U.S.C. 154(b) by 531 days.

(21) Appl. No.: 18/257,762

(22) PCT Filed: Oct. 15, 2021

(86) PCT No.: PCT/EP2021/078672
§ 371 (c)(1),
(2) Date: Jun. 15, 2023

(87) PCT Pub. No.: WO2022/128207
PCT Pub. Date: Jun. 23, 2022

(65) Prior Publication Data
US 2024/0108447 A1 Apr. 4, 2024

(30) Foreign Application Priority Data
Dec. 18, 2020 (EP) .................................... 20215774

(51) Int. Cl.
*A61C 17/22* (2006.01)
*A46B 5/00* (2006.01)
(Continued)

(52) U.S. Cl.
CPC ........ *A61C 17/3481* (2013.01); *A46B 5/0095* (2013.01); *A46B 9/04* (2013.01);
(Continued)

(58) Field of Classification Search
CPC ........... A61C 17/34; A61C 17/22; A46B 9/04; A46B 5/00
See application file for complete search history.

(56) References Cited

U.S. PATENT DOCUMENTS 3,046,584 A 7/1962 Wepfer
8,793,829 B2 * 8/2014 Shimoyama ......... A46B 13/023 433/118
(Continued)

FOREIGN PATENT DOCUMENTS

CH 384539 2/1965
DE 20109552 U1 9/2001
(Continued)

OTHER PUBLICATIONS

Written Opinion and International Search Report issued Mar. 25, 2022 in Intl Appl. No. PCT/EP2021/078672.

*Primary Examiner* — Michael D Jennings
(74) *Attorney, Agent, or Firm* — MEDLER FERRO WOODHOUSE & MILLS PLLC

(57) ABSTRACT

A drive unit for an electric toothbrush handpiece is disclosed having a gear unit and an electric motor. The gear unit includes an eccentric, a connecting rod, a drive shaft, and an articulation piece securely connected to the drive shaft. The electric motor has a motor shaft. The disclosure is additionally directed to an electric toothbrush handpiece, a method for producing an electric toothbrush handpiece, to an attachment brush for an electric toothbrush handpiece and to an electric toothbrush.

20 Claims, 30 Drawing Sheets

(51) Int. Cl.

| | |
|---|---|
| ***A46B 9/04*** | (2006.01) |
| ***A46B 13/02*** | (2006.01) |
| ***A61C 17/34*** | (2006.01) |

(52) U.S. Cl.

CPC .......... *A46B 13/023* (2013.01); *A61C 17/222* (2013.01); *A61C 17/3418* (2013.01)

(56) References Cited

U.S. PATENT DOCUMENTS

| | | | | |
|---|---|---|---|---|
| 10,966,807 | B1 * | 4/2021 | Arafat | A46B 9/04 |
| 11,363,881 | B1 * | 6/2022 | De Mesa | A46B 15/0081 |
| 2002/0092104 | A1 | 7/2002 | Ferber et al. | |
| 2009/0183324 | A1 * | 7/2009 | Fischer | A61C 17/3454 15/22.1 |
| 2012/0279002 | A1 * | 11/2012 | Sokol | A61C 17/3481 15/22.1 |
| 2014/0259469 | A1 | 9/2014 | Garrigues et al. | |
| 2019/0175322 | A1 * | 6/2019 | Bloch | A61C 17/34 |
| 2020/0214816 | A1 * | 7/2020 | Bloch | A61C 17/3481 |
| 2021/0100346 | A1 * | 4/2021 | Dishon | A61C 17/222 |

FOREIGN PATENT DOCUMENTS

| | | | |
|---|---|---|---|
| EP | 0560758 | B1 | 9/1993 |
| EP | 0850027 | B1 | 7/1998 |
| WO | 91/07115 | A1 | 5/1991 |
| WO | 98/01083 | A1 | 1/1998 |
| WO | 02/071972 | A1 | 9/2002 |
| WO | 2008040401 | A1 | 4/2008 |
| WO | 2017008038 | A1 | 1/2017 |

* cited by examiner

DRIVE UNIT FOR AN ELECTRIC TOOTHBRUSH HANDPIECE, ELECTRIC TOOTHBRUSH HANDPIECE, METHOD FOR PRODUCING OF AN ELECTRIC TOOTHBRUSH HANDPIECE, ATTACHMENT BRUSH FOR AN ELECTRIC TOOTHBRUSH HANDPIECE, AND ELECTRIC TOOTHBRUSH

TECHNICAL FIELD

The invention relates to a drive unit for an electric toothbrush handpiece, an electric toothbrush handpiece, a method for producing an electric toothbrush handpiece, an attachment brush for an electric toothbrush handpiece, and an electric toothbrush.

BACKGROUND

A motor-driven toothbrush is known from CH 384 539, the trim carrier of which is connected to an output member of an electric motor, which is arranged in a housing designed as a handle. A gear unit is arranged between the rotating output member of the electric motor and the trim carrier, converting the rotating movement of the output member into an oscillating movement of the trim carrier. To convert the rotating movement into an oscillating movement, a double crank gear unit is provided in particular. Furthermore, a variable speed gear unit is arranged between the engine and the double crank gear unit.

The special design of the double crank gear unit leads in particular to an unfavorably large overall height.

An electrically operated toothbrush with, among other things, a conrod gear is known from U.S. Pat. No. 3,046,584. In the conrod gear, the drive shaft of the toothbrush is connected to a disc, which is driven directly by the shaft of the electric motor by means of a crank and a connecting rod, which are pivoted together by a pivot pin, wherein the crank is pivoted eccentrically with respect to the disc in return by the pivot pin.

This conrod gear also requires a relatively large amount of space and, in particular, results in an undesirably high design.

EP 0 560 758 B1 also describes an electrically drivable toothbrush with an electric motor arranged in a handle, which drives a rotatably mounted toothbrush part in an oscillating manner via a gear unit and a reversing device driven by the motor. The gear unit is designed as an articulated quadrilateral, which has a crank that can be driven by means of the electric motor and at least indirectly drives a drive shaft of the toothbrush part in an oscillating manner by means of a coupler via a swing arm. The crank is designed as an eccentric disc and the coupler as a conrod. The conrod has a bearing eye in which the eccentric disc is rotatably received, wherein the eccentric disc is penetrated by an axle which is rotatably received in a bearing block and a bearing plate.

The gear unit of this electric toothbrush has a more space-saving arrangement, but it requires a relatively large number of individual components, which increases the installation effort.

EP 0 850 027 B1 describes an electric toothbrush that has a handle part and a brush part. The handle part houses an electric motor. Furthermore, a shaft protrudes from the handle part, which is coupled with the electric motor. The brush part can be attached to the handle part. Furthermore, a brush carrier that can be coupled to the shaft is held on the brush part, from which a plurality of brushes protrude. In the switched-on operating state, the brush carrier performs a rotary movement as well as a stroke movement, wherein the frequency of the stroke movement is greater than the frequency of the rotary movement. The lifting movement represents a poking movement of the brushes, which is used to remove plaque from the tooth surfaces. The rotary movement wipes away the detached plaque from the tooth surfaces.

The gear unit required to generate this combined rotating and lifting movement is in turn complex in design and thus involves increased manufacturing costs.

Many of the known electric toothbrushes also have undesirably high noise emissions, i.e., particularly above 65 dB, which many users find annoying.

WO 2008/0404401 A1 further describes an electric toothbrush with a gear unit, wherein the gear unit serves to transmit and convert a rotary movement oriented in one direction of rotation, which is provided by an electric motor on a drive shaft, into a movement of an output axis for driving a movable cleaning element of the electric toothbrush. The gear unit has a cam that is operatively connected to the input shaft and a corresponding pickup that is non-rotatably connected to the output shaft. In this gear unit, the ratio of the distance between the longitudinal center axis of the output shaft and the longitudinal center axis of the input shaft in the area of the pickup on the one hand to the distance between the longitudinal center axis of an axle driving the cam and the longitudinal center axis of the cam on the other hand is at least 10:1.

In this solution, there are particularly non-contacting portions between the cam and the pickup, which may cause the gear unit to chatter and thus also increase the noise level.

The object of the present invention is thus to provide a drive unit for an electric toothbrush handpiece which has a significantly reduced noise level and, associated therewith, a correspondingly low-vibration and compact design and which can ensure low power consumption and, in addition, a high cleaning performance. In addition, a corresponding electric toothbrush handpiece, a correspondingly simple manufacturing method for such a toothbrush handpiece, a correspondingly suitable and efficient attachment brush, and a corresponding electric toothbrush are to be specified.

SUMMARY

According to the invention, the object is solved by an electric toothbrush handpiece as defined in a first independent claim and a method of producing an electric toothbrush handpiece as defined in a second independent claim. Advantageous embodiments of the invention result in each case from the dependent claims.

The essence of the invention is as follows: A drive unit for an electric toothbrush handpiece, which has a gear unit and an electric motor. The gear unit comprises an eccentric, a connecting rod, a drive shaft, and an articulation piece securely connected to the drive shaft. These are therefore the four moving parts of the gear unit (from the motor shaft and including the drive shaft). Optionally, one to two additional plain bearings or sleeves can be fitted on the articulation pin and/or the eccentric pin or on the connecting rod to improve the sliding properties. The electric motor has a motor shaft. The eccentric has a main part with a main part axis and an eccentric pin which is arranged on the main part and extends from the main part in parallel with the main part axis. The connecting rod has a first bearing, a second bearing, and a rod element which connects the first bearing to the second bearing. The articulation piece is secured to the drive shaft (preferably injection-molded onto the drive shaft) and has an articulation pin which extends in parallel with the drive shaft and counter to the eccentric pin. The main part of the eccentric is attached along the main part axis to the motor shaft of the electric motor and the eccentric pin is received by the first bearing of the connecting rod and the articulation pin of the articulation piece secured to the drive shaft (preferably injection-molded onto the drive shaft) is received by the second bearing of the connecting rod. The gear unit does not require any toothed components such as gears, pinions or similar.

The "electric motor" may in principle comprise diverse forms of electric motors, such as approximately DC motors, AC motors, three-phase motors, swing armature motors, or linear motors, wherein a DC motor with a continuous 360° rotation is particularly preferred. Electric motors with a maximum efficiency at a torque of 0.5 to 6 mNm, in particular 1 to 3.5 mNm, are particularly suitable for the application. The corresponding motor power is necessary to ensure direct or reduction-free transmission of the motor rotation into a periodic back-and-forth swinging movement of the drive shaft. In this context, reduction-free means that every engine revolution is converted into a back-and-forth motion of the drive shaft by the gear unit. The gear unit therefore preferably does not need any gears, which are commonly used for reduction gears. As a result, fewer components are used and the backlash or noise emissions of the gear unit can be reduced.

The term "eccentric" may generally comprise any suitable form of control body or disc attached to a shaft, the center of which is off the shaft axis. In particular, the eccentric is intended to convert a rotary movement (rotational) of a motor shaft into a rotational back-and-forth rotary movement of a drive shaft.

In this case, the "main part" forms the part of the eccentric which is attached to the motor shaft, preferably in the press fit, and which is regularly designed to be larger than the eccentric pin, i.e. that it has in particular a larger diameter than the "eccentric pin" which projects freely from the main part (i.e. away from the motor). The "main part axis" represents the axis of rotation of the eccentric and thus coincides with the axis of the motor shaft. However, the main part axis can also be arranged outside the center of the main part, i.e. the main part axis can be arranged eccentrically. This allows the unbalance of the eccentric which is caused by the eccentric pin to be compensated. The eccentric pin can be designed in two parts. The eccentric pin can be inserted as a separate part, e.g. in the eccentric main part. However, the eccentric pin can also be made of a different material in its cylinder shell layer. For example, a metal sleeve can be attached to the eccentric pin. The eccentric pin in this case consists of two parts. This allows the friction properties and also the heat generation to be optimized in interaction with the connecting rod.

The "articulation piece", which is permanently mounted on the drive shaft or injection-molded onto the drive shaft, forms the counterpart on the drive shaft side to the eccentric on the motor side, wherein the articulation pin projects from the articulation piece on the drive shaft in the opposite direction to the eccentric pin. The articulation pin and the eccentric pin are preferably designed as cylindrical bodies which interact with the bearings of the connecting rod with as little play as possible.

As used herein, the term "connecting rod" may comprise any suitable type of connecting piece for transmitting rotary movement from a gear component on the engine side to a gear component on the drive shaft side. The two bearings on opposite sides of the rod element are preferably designed as plain bearings for the articulation pin and the eccentric pin. The plain bearings are preferably formed directly in the connecting rod without additional parts. However, it is also conceivable to have bearing bushes or bearing sleeves embedded in the connecting rod or its bearings on one or both sides (i.e. particularly if the latter are made of plastic).

Due to the few components of the gear unit, a particularly space-saving and at the same time low-noise drive unit can be provided, which also ensures efficient transmission of the engine rotation into a periodic back-and-forth swinging movement of the drive shaft. In particular, the toothless and low-backlash motion transmission contributes to low-noise and low-vibration operation. There is no need for gearing, since the gear unit does not require reduction by means of corresponding toothed components such as pinions, gears or similar.

Preferably, the main part of the eccentric comprises one or more recesses configured such that the center of mass of the eccentric is located on the motor shaft of the electric motor. The eccentric here therefore has an improved design with optimized unbalance, i.e. the eccentric runs with less unbalance than known solutions and thus more quietly or with less vibration. The mass distribution is particularly homogeneous in the cross-section, so that the motor is loaded more regularly.

The mass or volume of the recess(es) in the main part does not usually correspond to the mass or volume of the eccentric pin fitted. The position of the center of mass is primarily decisive. However, the mass or volume of the recess(es) in the main part is determined by the size as well as the position of the eccentric pin and the basic arrangement of the main part and the recess for the motor shaft.

In principle, the eccentric can be eccentrically aligned with respect to the motor shaft or the recess that receives the motor shaft, and the eccentric pin can then also be eccentrically positioned on the main part. The appropriately designed distances again result in a homogeneous mass distribution or that the center of mass is located on the motor shaft.

The length design of the eccentric is such that the recess for the connection to the motor shaft is of different length or depth. The eccentrics can be replaced in the present setup without the need for further adjustments. The design of the eccentric has a substantial influence on whether this is possible, because the end of the eccentric or the end face of the eccentric on the side of the connecting rod must always be in the same place in the design of the gear unit. The length compensation happens via the depth of the recess for the connection to the motor shaft.

This has the advantage that the same gear unit design can be used to create a gear unit for a different product with just a few changes. For example, different eccentrics can be used in this manner to achieve different angles of rotation of the drive shaft by changing the eccentricity of the eccentric pin. Furthermore, the motor and key element can be changed in parallel, so that the same gear unit can be used to create a toothbrush with a sonic movement as well as a toothbrush with an oscillating movement (periodic back-and-forth rotary movement around the brush head axis). The changes entail that different angles of rotation of the drive shaft, different speeds of rotation of the drive shaft and thus different speeds can be achieved at the brush head.

As a further possibility, in principle also the installation resp. shaping of a flywheel is conceivable, in order to bring more mass to the eccentric, for example in form of a disc (i.e. more mass is positioned further outside). The advantage of such an embodiment is a lower power consumption of the electric motor during operation, however, a higher power consumption may have to be accepted during start-up. The flywheel also allows quieter or lower-vibration operation. The additional moment of inertia of the flywheel makes it easier to overcome load peaks (e.g. high pressure from the user on the brush head). The flywheel can be designed as a part of or by means of enlargement of the eccentric.

Preferably, the main part of the eccentric has a pedestal-like elevation on its end face facing away from the electric motor, on which the eccentric pin is arranged. The step created in this manner on the main part or its end face allows the eccentric to be arranged closer to the connecting rod, which in turn contributes to the particularly compact design.

Preferably, the eccentricity of the eccentric pin axis relative to the main part axis is from 0.2 mm to 3 mm, preferably from 0.3 mm to 2 mm. In this area, particularly low-noise and low-vibration operation of the gear unit can generally be ensured. In this area, the motor speed of the drive unit in the unloaded state is preferably from 3,000 rpm to 12,000 rpm.

Particularly preferably, the eccentricity of the eccentric pin axis relative to the main part axis is from 0.3 mm to 1 mm, if a so-called sonic movement is to be generated. In this sonic variant, the periodically reciprocating movement of the drive shaft is transmitted directly to a corresponding (sonic) brush or its brush head by means of the correspondingly designed drive unit or drive shaft. In the sonic variant, the brush heads are generally substantially elongated oval to rectangular in shape, preferably with the greater longitudinal extension in the direction of the longitudinal axis of the attachment brush. The axis of the direction of rotation of the brush head of the (sonic) attachment brush is parallel to the drive shaft—in contrast to the axis of the direction of rotation of the brush head of the (oscillating) attachment brush, which is substantially perpendicular to the drive shaft.

In a sonic movement, the minimum angle between the longitudinal direction of the rod element of the connecting rod with respect to the articulation piece axis is from 50° to 90° preferably from 62° to 78° and the maximum angle range is from 80° to 120° preferably from 92° to 108°. This way, there is no dead spot in the movement sequence that could block the movement. The articulation piece axis is understood to be the axis on the articulation piece, which is designed between the center of the drive shaft and the center of the articulation pin, perpendicular to the drive shaft.

The movement of the drive shaft (from its basic position) comprises an angular range of +/−1° to +/−15°, preferably +/−3° to +/−10°, in the sonic variant.

Particularly preferably, the eccentricity of the eccentric pin axis relative to the main part axis is from 1.4 mm to 2 mm, if a so-called oscillating movement (of an oscillating attachment brush) is to be generated. In the oscillating variant, the corresponding periodically reciprocating motion of the drive shaft is converted into a periodically alternating rotary movement of a brush head mounted rotatably in a head portion of the attachment brush by means of a corresponding conversion unit in the attachment brush (i.e. the rotary movement is perpendicular to the brush head axis). In the oscillating variant, the brush heads are generally substantially round or slightly oval in shape. As already described, the axis of the direction of rotation of the brush head of the (oscillating) attachment brush is substantially perpendicular to the drive shaft.

The angle between the longitudinal direction of the rod element of the connecting rod with respect to the articulation piece axis is, for the oscillating variant, minimally from 40° to 75° preferably from 50° to 65° and maximally from 90° to 130° preferably from 105° to 117°. In this manner, again, there is no dead spot in the movement sequence that could block the movement. The articulation piece axis is understood to be the axis on the articulation piece, which is designed between the center of the drive shaft and the center of the articulation pin.

The movement of the drive shaft or brush head of the (oscillating) attachment brush (from its home position) comprises an angular range of +/−10° to +/−40° for the oscillating variant, preferably +/−20° to +/−30°, and most preferably +/−25°.

The brush fields on the brush heads of the corresponding brushes can be basically the same or at least partially the same for both variants.

Basically, with regard to the aforementioned differences in eccentricity, the smaller the eccentricity, the more force can be developed by the motor shaft (i.e. in accordance with the law of leverage), wherein, however, the stroke or angle of rotation of the drive shaft or brush head becomes all the smaller.

Preferably, the motor speed in the unloaded state is generally from 3,000 rpm to 12,000 rpm. For the oscillating version, the motor speed in the unloaded state is 3,500 rpm to 10,000 rpm, preferably 4,000 rpm to 7,000 rpm. For the sonic variant, the motor speed in the unloaded state is from 7,000 rpm to 12,000 rpm preferably from 9,000 rpm to 11,000 rpm. This means that target values of 7,000-10,000 movements per minute can be achieved for the oscillating variant and 15,000-25,000 movements per minute for the sonic variant. Left and right rotations from the center position of the brush head are counted as movements in each case. In other words, for a rotation angle of +/−10° degrees, the movement is counted after +10° and −10°. In this area of speeds, relatively low power consumption can be achieved for both the sonic variant and the oscillating variant.

In this regard, it should be noted that a "loaded state" is referred to when a load or contact pressure of approximately 300 g or more is applied to a corresponding brush-on. The term "unloaded state" is used when no contact pressure is applied to a corresponding attachment brush.

Preferably, the articulation pin of the articulation piece permanently mounted on the drive shaft or injection-molded onto the drive shaft and the eccentric pin have approximately the same diameter. In this manner, particularly smooth running of the gear unit can be ensured. This means that the connecting rod can also be designed symmetrically, which results in a more equivalent mass distribution, which has a significant influence on running behavior and facilitates installation, since the connecting rod does not have to be aligned. As described above, the connecting rod or its bearing or/and the articulation pin and/or the eccentric pin can be provided with sleeves which optimize the sliding properties between the connecting rod or/and articulation pin or connecting rod or/and eccentric pin.

Preferably, the connecting rod and/or the articulation piece molded onto the drive shaft is/are formed from a hard component preferably polyoxymethylene (POM). This can provide particularly suitable plain bearings for the gear unit. In addition, the corresponding components have a pronounced robustness.

Preferably, the eccentric is made of metal, especially preferably brass, or else of a hard component preferably polyoxymethylene (POM). A design of the eccentric made of metal, particularly brass, may have somewhat better running properties, whereas a design made of polyoxymethylene (POM) is somewhat easier and more cost-effective to manufacture.

Different materials can be used for the articulation pin or eccentric pin and conrod. The different materials can be a plastic and metal. Preferably, a hard component such as POM and a copper alloy such as brass are used.

Articulation pins and/or the eccentric pin can be made of a hard component, particularly POM. In this case, the connecting rod is made of metal.

Articulation pins and/or the eccentric pin can be at least partially made of metal, particularly brass. For example, the cylinder jacket layer of the articulation pin and/or the eccentric pin can be provided with a metal sleeve, particularly made of brass. In this case, the connecting rod is made from a hard component, particularly POM.

Another aspect of the invention is as follows: An electric toothbrush handpiece having a housing, a frame unit, an energy source, a key element, and a drive unit. The drive unit is preferably designed in the same manner as the drive unit described above, in particular with a corresponding gear unit and a corresponding electric motor. However, it is conceivable that the electric toothbrush handpiece could also be operated with a different compact drive unit or a compact drive unit modified in one or more features without departing from the scope of the present invention. The housing of the electric toothbrush handpiece thereby surrounds the frame unit, the drive unit and the energy source (and the key element at least partially). The frame unit has at least a gear unit zone, a motor zone, and an energy source zone, wherein the gear unit zone is configured to receive the gear unit, the motor zone is configured to receive the electric motor, and the energy source zone is configured to receive the energy source. The key element is arranged on a front part of the housing and preferably has a key geometry configured to couple with a corresponding key coupling geometry of an attachment brush. The energy source is configured to supply the drive unit with energy. The drive unit is configured to generate movement of a drive shaft of the gear unit, wherein the drive shaft has an extension through the key element and preferably has an axis geometry configured to couple with a corresponding axis coupling geometry of a slip-on brush. The axis geometry can particularly comprise a flattening and/or a notch or recess at the front or free end of the drive shaft.

In the present context, the term "frame unit" is generally understood to mean a holding device with various holding zones for various components of the electric toothbrush handpiece. In any case, the holding zones should hold the corresponding components so firmly that they cannot fall out when inserted into a housing of the toothbrush handpiece and that the components cannot change position relative to one another. Preferably, all mechanical and electrical components of the toothbrush handpiece should be held firmly in the frame accordingly. The person skilled in the art is aware that, in principle, all clamping, latching, holding, preloading, securing and/or positioning devices etc. can be used for the corresponding fall-out-proof design of the receiving zones, depending on the suitability for the corresponding component.

The term "energy source" is used here to refer to replaceable and non-replaceable as well as rechargeable and non-rechargeable devices that can store electrical energy and release it over a longer period of time, such as rechargeable batteries (e.g. nickel metal hydride rechargeable batteries or lithium ion rechargeable batteries) or batteries (e.g. alkaline batteries).

The term "key element" is understood to mean a component which contains an interface suitable for one or possibly several types of brushes for attaching the toothbrush handpiece, which has a geometry or structure corresponding to the brush or brush shaft, which may also be able to secure the brushes against unintentional removal from the toothbrush handpiece.

Preferably, the gear unit zone has a first bearing device or a support and adjustment stop for a rear end of the drive shaft and preferably also a tensioning arm configured to engage with the drive shaft and optionally exert a preload force on the drive shaft. In this manner, chattering of the gear unit can be reduced or prevented in a particularly efficient manner and the gear unit can be operated at low noise levels. The stop surface of the first bearing device for the drive shaft is used for axial receptacle of the forces which can act on the drive shaft. The position of the stop surface is used to adjust the position of the drive shaft relative to the key element and thus, at least for the oscillating embodiment, to adjust the depth of engagement of the drive shaft with the attachment brush.

Preferably, the motor zone is configured to secure the electric motor. This can be approximately one or more preload surfaces of the motor zone, by which the housing of the electric motor is held in a form-fit/force-fit manner. This ensures that the electric motor cannot fall out of the frame unit.

Preferably, the power source zone has at least one latching apparatus configured to latch with the energy source. In turn, this can be approximately one or more preload surfaces by which the housing of, for example, an accumulator or a battery is held in a form-fit/force-fit manner. This ensures that the energy source, i.e. the rechargeable battery or battery, cannot fall out of the frame unit.

Preferably, the toothbrush handpiece (used synonymously with "handpiece" in this paper) or frame unit has a coil zone configured to receive a coil carrier, which is preferably formed from a soft component, preferably silicone. If necessary, the coil carrier can engage or latch with snap-on devices and/or positioning aids (e.g. guide cylinders or blind holes) of the frame unit designed in the coil zone.

A charging coil for charging the energy source is attached to or wound onto the coil carrier in particular. The coil carrier fitted with the charging coil is arranged as the rearmost carrier or electrical functional element at the rear end of the frame unit and may have an opening for a housing cover. In this manner, the housing cover can retract into the coil so that the ferrite core of a charger can later be placed in the charging coil.

Alternatively, the coil carrier can also be molded from a hard component, preferably a polyamide, which at most achieves the required softness through the addition of additives. This means that a protective function can be provided by the choice of material, for example if the handpiece falls down. Further protective functions for this case can be achieved by appropriate geometric designs. In addition, the soft design of the coil carrier allows length compensation of the frame unit within the handpiece by allowing the coil carrier to compress slightly due to the soft material, for example from a soft component, thereby forming a preload.

Alternatively or additionally, the coil carrier preferably has a length compensation means, preferably in the form of an elastic portion, which supports the frame unit relative to a housing cover of the handpiece. In other words, the elastic portion in the installed state ensures that the housing cover and the frame unit do not touch. This allows length compensation between the frame unit and the coil carrier as well as a floating bearing of the frame unit within the housing. Due to the resulting decoupling of the frame unit from the housing, an optimum damping effect (and thus less vibration and noise) can be achieved for the entire handpiece. Furthermore, the damping effect helps to protect the apparatus, for example, in the event of a fall to the floor. The coil carrier is also the part of the whole assembly which can be extended, for example, in the case of larger housings, in order to compensate for the mass. This means that the structure can be used for different insertion sizes or housings of different lengths and that only different coil carriers are used for length compensation and the other components remain substantially identical.

Preferably, the frame unit has a print zone which is configured to receive a print plate and which preferably comprises a recess in which the print plate is received. The print plate is used for the receptacle of electrical functional components, in particular for the controller of the drive unit and other apparatus functions. The control function components on the print plate are used to control the speed of the electric motor in particular, such as when executing specific cleaning and/or massage programs. To protect the electronics from incorrectly flowing currents, an electrical reverse polarity protection is preferably installed in the electrical circuit, which functions in the manner of a fuse (e.g. in the form of reverse polarity protection diodes).

The print plate is arranged in the recess of the print zone, preferably on the upper side of the frame unit, wherein the print zone extends regularly over a major part of the total length of the frame unit, i.e. in particular over several zones of the frame unit (i.e. in particular over the motor, energy source and coil zones). Clamping devices in the form of approximately clamping arms are preferably designed on the frame unit, which clamp the print plate and/or press it into the recess. Furthermore, one or more lugs can be designed on the frame unit which, in the mounted state of the print plate, engage in recesses in the print plate and/or at least partially surround it. They are arranged in such a manner that clear positioning or installation is made possible and also that displacement in the longitudinal direction is prevented in the installed state.

Preferably, the key element is configured to latch with a snap-on element of the frame unit at its rear end facing the handpiece (it preferably has a corresponding recess for this purpose). This construction is preferred in that the key element is regularly formed from a hard component, preferably glass bead reinforced polyoxymethylene (POM), and is thus itself less likely to form a snap-on element compared to the formation of the same on the frame unit.

Preferably, the frame unit comprises two half-shell-like halves formed from a hard component, preferably polyoxymethylene (POM). In this manner, sufficient stability can be provided even if, approximately for reasons of material savings, several recesses or apertures are provided in one or more zones of the frame unit.

Preferably, the key element has a through bore for the drive shaft and a second bearing device for a front area of the drive shaft, wherein the second bearing device is preferably arranged at the end of the key element facing away from the hand part. In this manner, it can be achieved that the two bearing points for the drive shaft are sufficiently far apart to give the gear unit additional stability and ensure smooth running of the drive shaft.

Preferably, the key element has a recess in which a sealing element, preferably a bellows seal, is arranged, which is configured to seal the housing or the key element against the drive shaft. The bellows seal is preferably a one-piece component which is mounted in a corresponding recess of the key element and subsequently pushed onto the drive shaft.

The bellows seal is preferably rotationally symmetrical. An annular element of the bellows seal, which is designed on the inside, later rests against and seals around the drive shaft. An annular element of the bellows seal, which is designed externally, later rests against the key element and seals there. A torsionable element or torsionable zone in the form of a surface is designed between the two ring-shaped elements. The sealing element thus serves in particular to seal the interior of a housing from the drive shaft. For this purpose, the sealing element is in contact with the axis of the interface, particularly with an undersize, so that the sealing element twists at least partially during a rotary movement of the axis of the interface. On the other hand, the sealing element lies against the pivot with an oversize in order to fit it as tightly as possible. The design of the bellows seal described above creates a kind of torsion spring which acts on the drive shaft, thus reducing energy consumption compared to other sealing solutions. The position of the bellows seal is secured in the longitudinal direction of the drive shaft once at the front by means of a stop in the key element and once at the rear by means of a stop on the frame unit (i.e. in the fully installed state). The bellows seal is particularly preferred for the oscillating version.

Preferably, on the end of the key element facing the frame unit, a sealing/damping element made of a soft component is attached, which is configured to seal the housing against the key element and which is configured to provide a damping bearing for the key element. The sealing/damping element thus offers a combination of two functions in one component. The sealing/damping element is slipped over the key element and is thus positioned between the key element and the housing. Further, it extends to the side of the frame unit, thus the frame unit is also laterally damped. The sealing/damping element preferably snaps lightly onto the frame unit. Preferably, the sealing/damping element is formed from a soft component, particularly silicone. Together with the coil carrier, the sealing/damping element forms the floating bearing of the frame unit and thus contributes to low-noise and low-vibration operation of the apparatus.

Preferably, the first and second half-shell-like halves of the frame unit have positioning aids, preferably in the form of guide cylinders and corresponding blind holes. The positioning aids preferably have the form of blind holes and circular cylinders that can be inserted and/or clicked into one another. Particularly preferably, 2 to 10 preferably 4 to 8 positioning aids are provided per half-shell-like half. Here, a half-shell half may have all blind holes and a half-shell half may have all circular cylinders. Mixed arrangements are also conceivable. The half-shell halves of the frame unit are joined together laterally. The parting line extends substantially longitudinally under the print plate, around the electric motor, above the energy storage unit and around the gear unit.

A still further aspect of the invention is as follows: A method of producing an electric toothbrush handpiece. The electric toothbrush handpiece to be produced should preferably be designed like the handpiece described above. However, it is also conceivable that the electric toothbrush handpiece to be produced has deviating designs in one or more features without leaving the scope of the present invention while being manufactured in an equally simple manner. The method comprises the steps described below, some of which are optional. The individual steps can, but do not have to be carried out in the specified order.

In a step (a), a second half-shell-like half of a frame unit comprising the second half and a first half-shell-like half corresponding thereto is first laid out.

In a step (b), the (lateral) installation of a drive unit with an electric motor and a gear unit takes place, wherein the electric motor is connected to the gear unit and the electric motor is positioned in a motor zone and the gear unit is positioned in a gear unit zone of the second half-shell-like half and secured there.

In step (b), the eccentric is preferably first attached to the motor shaft. Subsequently, the connecting rod with one bearing is preferably fitted onto the eccentric pin and the drive shaft with the firmly attached or injection-molded articulation piece is inserted into the other bearing of the connecting rod by means of the articulation pin, wherein said bearings are not to be understood as separate parts in the sense of bearings. The parts pre-assembled in this manner are inserted laterally into the motor or gear unit zone of the laid out second half-shell-like half. In this case, the drive shaft preferably engages with a clamping arm in the gear unit zone and a rear end of the drive shaft is received by a (first) bearing device in the gear unit zone. The motor zone may have separate detent or preload surfaces for the electric motor.

In an optional step (c), if necessary, the installation of a rear and a front spring plate in the second half-shell-like half can take place, wherein preferably the rear and the front spring plate are each held in position by retaining arms. The two spring plates are preferably inserted laterally into corresponding receptacles of the second half-shell-like half. The spring plates are preferably mounted in front of a possible print plate, since the spring plates may still have to be inserted into or passed through the print plate in order to be connected there later, for example by soldering.

In a step (d), a print plate is installed in a print zone of the second half-shell-like half, wherein the print plate is preferably inserted laterally into a corresponding recess of the print zone. If necessary, at least a first connecting piece of the rear spring plate and a first connecting piece of the front spring plate are guided through corresponding recesses in the print plate, and the print plate is preferably latched or clamped in the recess of the print zone.

In a step (e), the installation of the first half-shell-like half to the second half-shell-like half is carried out, wherein the two half-shell-like halves are preferably inserted into each other and/or clicked or latched at several locations. Preferably, a slight preload is built up. Due to this preload, the two half-shell-like halves can brace against one another, which serves the overall stability of the frame unit.

Steps (a), (b), (d) and (e) basically form the basis of the simplified manufacturing process according to the invention. Herein, may further be comprised:

In an optional step (f), if necessary, a key element can be installed on the frame unit, wherein the key element is slid on over the drive shaft and preferably latches to the frame unit. Preferably, the key element is also fitted with a bellows seal beforehand to seal the housing against the drive shaft (i.e. particularly in the case of the oscillating variant).

In an optional step (g), if necessary, the installation of a coil carrier with a loading coil can be carried out in the coil zone of the frame unit, wherein the coil carrier is attached to a rear end area of the frame unit (coil zone), preferably plugged on. This step is regularly not performed when using replaceable batteries.

In a step (h), if necessary, electrical connections can be established, preferably by routing wires (or metal strands or cables) from the print plate to the electric motor (or vice versa) and soldering the first connecting pieces of the rear and front spring plates as well as the ends of the cables of the charging coils to the print plate.

In a step (i), if necessary, the installation of an energy source can take place, wherein the energy source is received in an energy source zone of the frame unit, if necessary in a clamped manner between a spring piece of the rear spring element and a spring piece of the front spring element. The rechargeable battery or the battery is preferably introduced into the energy source zone from the underside through a corresponding opening in the frame unit, wherein the rechargeable battery or the battery may additionally be received by lateral preload surfaces of the frame unit and held with a preload. This type of installation of the accumulator or battery allows easy replacement without the need to disconnect fixed connections (e.g. unsoldering, disconnecting electrical connections, etc.). In conjunction with a reclosable housing cover and a removable or mountable slide-in unit or frame unit, this makes it easy to repair the apparatus or battery. Supporting ribs can be attached along the side of the preload surfaces on the frame unit, at the edge of the opening of the frame unit, which also hold or support the battery.

In an optional step (j), the (assembled) frame unit (also referred to as "slide-in unit") can be inserted into the housing of the handpiece and, if necessary, a housing cover can be attached. The frame unit together with all components is then firmly positioned inside the housing.

The insertion of the fully equipped frame unit into the housing of the handpiece is preferably supported by insertion aids, such as insertion ribs or rails, which are arranged approximately laterally on the frame unit or a sealing/damping element and/or laterally on the inner wall of the housing. This allows the frame unit to slide safely into the intended target position. In particular, "blind" insertion of the slide-in unit into the housing with corresponding misalignment can be avoided.

Preferably, in step (b) the gear unit having an eccentric, a connecting rod, a drive shaft and an articulation piece firmly connected to the drive shaft, preferably injection-molded or attached thereon, is connected to the electric motor by attaching the eccentric to a motor shaft of the electric motor and applying, preferably plugging, the connecting rod to the eccentric and to the articulation piece firmly connected to the drive shaft. This makes it easy to provide a particularly space-saving and low-noise gear unit.

Preferably, in step (b), the drive shaft is engaged in the gear unit zone of the first half-shell-like half and is preferably further supported in a first bearing device of the gear unit zone. In this manner, particularly low-noise operation can be ensured.

Preferably, a sealing element, preferably a bellows seal, is inserted into the key element prior to step (f). This additional element serves to efficiently seal the housing or key element from the drive shaft.

Preferably, after step (f), a sealing/damping element is mounted to the frame unit, or a front end thereof, wherein the sealing/damping element is slid over the key element and preferably latches to the frame unit or housing. The sealing/damping element seals and damps between the key element and the housing. In addition, the sealing/damping element supports the floating or soft bearing of the frame unit.

A still further aspect of the invention is as follows. An attachment brush for an electric toothbrush handpiece. The electric toothbrush handpiece should preferably be designed like the handpiece described above. However, it is also conceivable that the electric toothbrush handpiece may also have deviating designs in one or more features, without departing from the scope of the present invention, while retaining the same compact design. The attachment brush particularly comprises a head portion having a brush head, an attachment portion, and a neck portion connecting the head portion to the attachment portion. The brush head has a brush field. The brush field thereby comprises at least an inner circle having a first shape of brush bundles and an outer circle having a second shape of brush bundles, wherein the first shape of brush bundles is different from the second shape of brush bundles. Gaps are provided between the individual brush bundles of the first shape on the inner circle, and gaps are also provided between the individual brush bundles of the second shape on the outer circle.

The "brush head" comprises approximately embodiments with a carrier plate for the brushes or the brush bundles for the brush field inserted into a recess of the brush head. The carrier plate can be arranged movably, particularly rotatably, in the brush head. Also comprised are embodiments in which the bristles or brush bundles are mounted directly on the brush head, i.e., without a carrier plate.

The "brush field" comprises in particular brushes arranged individually or combined in brush bundles, wherein other functional elements, such as polishing and massaging elements (made of soft component(s)), can also be part of the brush field. Examples of such functional elements and preferred materials for the individual elements or for the brushes are listed below.

In the present context, "shapes" of brush bundles are understood to mean in particular geometric shapes (for example, the cross-section of the brush bundle as it emerges from the brush head), which are designed by the bristles of a brush bundle. The brushes forming the individual brush bundles can be arranged adjacent to each other or at a small distance from each other.

"Gaps" as used herein are substantially unoccupied locations or interruptions between two adjacent brush bundles on the respective rings of the brush field. However, it is conceivable that brush bundles of a ring located further inwards on the brush field at least partially engage in the gaps between the brush bundles of a ring located further outwards.

The individual "circles" of the brush field are ring- or oval-shaped structures arranged substantially concentrically to the center of the brush head, usually the center of rotation, on which the brush bundles lie. As a rule, a brush head has an inner and an outer circle with brush bundles and, if necessary, also a middle circle with brush bundles between the inner and outer circle with brush bundles. Designs with more than three circles with brush bundles are also conceivable in principle, depending on the space available on the brush head. In the case of an oval designed brush head, the brush bundles would be arranged analogously on concentric oval lines. The oval lines can be designed elliptical to rectangular.

Preferably, the first shape of brush bundles on the inner circle comprises circular segment shaped, diamond shaped or triangular shaped brush bundles and the second shape of brush bundles on the outer circle comprises circular segment shaped, triangular shaped or oval shaped brush bundles. These brush bundle shapes have proven to be particularly suitable for use in connection with the sonic variant described above and in particular with the oscillating variant described above, since a particularly good cleaning effect can be achieved in the interdental spaces and in the area of the gingival margin.

Preferably, the brush field further comprises a central circle having a third shape of brush bundles, wherein gaps are provided between the individual brush bundles of the third shape on the central circle, wherein preferably the third shape of brush bundles comprises circular segment-shaped, oval-shaped or triangular-shaped brush bundles. In this manner, the cleaning effect described above can be further optimized.

Preferably, the third shape of brush bundles on the middle circle corresponds to the second shape of brush bundles on the outer circle—but has smaller dimensions. This allows the flexibility of the brush field in the central area of the brush head to be advantageously designed.

Preferably, the brush bundles of the third shape on the central circle are arranged offset from the brush bundles of the second shape on the outer ring and preferably engage at least partially in the gaps between the brush bundles of the second shape on the outer circle. This can be used to effectively remove plaque in the area of the gingival margin in particular.

Preferably, the brush bundles of the first shape on the inner circle are arranged offset from the brush bundles of the second shape on the outer circle and preferably engage at least partially in the gaps between the brush bundles of the second shape on the outer circle. This can also effectively remove plaque in the area of the gumline.

Preferably, particularly for the oscillating variant, the attachment portion has a coupling geometry configured to couple with a corresponding coupling geometry of an electric toothbrush handpiece. Here, the coupling geometry of the attachment portion particularly preferably corresponds to the geometry of the key element of the electric toothbrush handpiece described above and is thus also referred to as the key coupling geometry. The sonic variant, on the other hand, does not use coupling geometry on the key element. This object is performed by the drive shaft, which has the coupling geometry for sonic attachment brush.

A still further aspect of the present invention consists of the following: An electric toothbrush comprising an electric toothbrush handpiece, preferably as described above, and an attachment brush, preferably as described above.

Further preferred embodiments and specifications of the present invention, which are proposed generally for both the sonic variant and the oscillating variant, or else specifically for one of the two variants, are given below, wherein aspects already addressed are also described or explained in more detail where appropriate.

In the context of the present application, as already explained above, a general distinction is made between an oscillating variant and a sonic variant. The variant to be used in each case ultimately depends on the attachment brush to be attached to the electric toothbrush handpiece accordingly.

In the oscillating variant, a periodically reciprocating movement of the drive shaft is generated by means of the correspondingly designed drive unit, which is converted into an oscillating movement of the brush head of a correspondingly designed attachment brush.

In the sonic variant, a periodically reciprocating movement of the drive shaft is transmitted directly to a correspondingly designed attachment brush or its brush head by means of the correspondingly designed drive unit. The angular area of the periodically reciprocating movement of the drive shaft is regularly smaller here than with the oscillating variant.

In general, however, it can be stated that substantially the same basic design of the slide-in unit applies to the oscillating variant and to the sonic variant.

However, certain parts have differences, as already mentioned above. In particular, the design of the eccentrics used differs. In the oscillating variant, the eccentric pin in particular is further away from the motor shaft or the main part axis than in the sonic variant.

Furthermore, a different performance can be provided for the motors, wherein preferably a higher motor speed is used for the sonic variant than for the oscillating variant.

There are also differences with regard to the connection from the handpiece to the attachment brush.

In the oscillating version, the connection to the handpiece is made via the drive shaft and at the key element. In this case, the key element secures the attachment portion and the drive shaft is firmly connected to a corresponding shaft portion in the attachment brush, which, if necessary by means of a corresponding conversion unit, ensures a periodic (rotary) movement of the brush head, i.e. perpendicular to the brush head axis.

In the sonic variant, a fixed connection is only made opposite the drive shaft.

Generally, the hand part of the respective electric toothbrush comprises a housing with a housing cover as well as a frame unit.

All components of the drive unit, i.e. the electric motor and the gear unit, in this case in the form of a conrod gear unit, are installed in the frame unit. The equipped frame unit thus represents a slide-in unit which is inserted into the housing of the electric toothbrush handpiece after installation of all components provided for the frame unit.

The components and the general structure of the electric toothbrush handpiece are described again below.

The housing and the housing cover are basically familiar in terms of construction, but they have certain special features.

The bearing of the frame unit in the housing, for example, is designed to be flexible. The flexible bearing in the housing is used for damping so that the handpiece does not vibrate or vibrates as little as possible.

The frame unit is preferably mounted in two positions, namely at the front of the key element by means of the sealing/damping element and at the rear of the coil carrier.

The sealing/damping element offers a combination of two functions in one part. Firstly, the inside of the handset is sealed against the outside and between the housing and frame unit. On the other hand, a damping and bearing function is provided. The sealing/damping element is slipped over the key element and is thus positioned between the key element and the housing.

The coil carrier has a length compensation means, preferably in the form of an elastic portion, which supports the frame unit relative to a housing cover of the handpiece. This can be used to achieve length compensation between the frame unit and the coil carrier, if necessary, as well as a floating bearing of the frame unit within the housing. Due to this decoupling of the frame unit, a damping effect (less vibration or noise development) can be achieved for the entire handpiece.

Insertion and positioning aids are also provided as additional features of the housing. Flaps/ribs/rails are preferably formed on the inside of the housing, in the front area (in the direction of the drive shaft outlet) on both the left and right sides. On the outside of the frame unit, two flaps/ribs/rails are also preferably formed as counterparts. The flaps/ribs/rails of the housing and the frame unit each fit together and are inserted into one another. This serves two functions, one for torque support and the other for positioning the frame unit within the housing. The sealing/damping element can extend from the key element to the frame unit and cover the flaps/ribs/rails, thus providing further damping.

A mere guiding of the frame unit in the housing takes place in the rear part (i.e. an alignment takes place only in the front area). Recesses in the form of longitudinal grooves are provided as guides on the frame unit. Corresponding lateral edges are provided on the housing.

Preferably, the gear unit in the form of a conrod gear unit is also provided in the handpiece.

The energy source for the electric toothbrush handpiece is preferably formed by rechargeable batteries (nickel-metal hydride or lithium-ion batteries), wherein preferably only one energy carrier unit is used. The batteries are preferably charged inductively or directly with a plug-in connection.

The installation of the handpiece is generally carried out as follows. First, the interior or the individual components thereof are mounted on the frame unit or inserted into the first half-shell-like half and secured with the second half-shell-like half. Then the frame unit including the inner workings is pushed into the housing. The housing cover is subsequently screwed onto the housing and locked or secured in place. The frame unit together with its inner workings is thus secured or held in the housing with a clamp or preload. Clamping takes place between the key element and the coil holder.

In addition, the interior is sealed to the outside so that no water or moisture can penetrate. At the rear end, the handpiece is sealed with the housing cover. The housing cover contains a seal which seals between the housing cover and the housing (preferably by means of an O-ring). At the front end of the handpiece, sealing against the outside takes place by means of e.g. a bellows seal, which is arranged inside the key element and pushed onto the drive shaft, and the seal/damping element between the key element and the housing.

The frame unit is thus a kind of chassis for the various electrical and mechanical components of the handset. Furthermore, it is a slide-in unit, i.e. it is completely equipped with the electrical/mechanical components before being inserted into the housing.

The design of the frame unit preferably comprises two longitudinally aligned half-shell-like halves or halves that are joined together. This results in good stability and less bending/twisting or torsional susceptibility compared to a modular design with elements mounted one behind the other on the longitudinal axis, which accommodate the individual components such as the motor, battery and gear unit. In addition, the bearing of the conrod gear with the drive shaft can be made more stable. The structure of the frame unit is thus in two parts with a right side and a left side or with a first half-shell-like half and a second half-shell-like half.

The two-part design is preferred here because a protective coating is usually applied to the print plate of the handpiece, which can be rubbed off by vibrations, etc. The coating is then applied to the handpiece. The rubbed-off protective coating can cause a possible short circuit between the motor and the print plate. Therefore, a distance must be created between the motor and the print plate. The print plate is therefore preferably mounted in a recess in the upper area frame unit and is preferably shielded/supported on its underside for the most part with plastic. The frame unit forms a plastic layer between the print plate and the motor or between the print plate and the battery.

Care is taken to keep the slit, or line of abutment, in the center where the two half-shell-like halves meet as small as possible. This also supports the print plate, which must be implemented particularly with regard to the on/off switch so that the print plate does not bend and become damaged when it is actuated. By adapting the design of the print plate accordingly, it is possible to reduce the support struts or the support of the print plate by elements on the frame unit and still maintain the same stability and safety.

The frame unit is mainly loaded from the side. In this process, the first half-shell-like half is first fitted, then the second half-shell-like half is added, and subsequently both half-shell-like halves are joined together and together form the slide-in unit, as mentioned.

The overall length of the slide-in unit (i.e. from the rear end of the coil carrier to the front end of the drive shaft) is from 170 mm to 220 mm preferably from 180 mm to 190 mm. The length of the slide-in unit for the oscillating variant is slightly longer than the slide-in unit for the sonic variant with the same design (due to the different design of the key element). With the same design, the difference in length between the oscillating variant and the sonic variant is between 3 mm and 8 mm.

The internal length of the slide-in unit (i.e. from the rear end of the coil carrier to the exit of the drive shaft from the front end of the frame unit) is between 135 mm to 170 mm for both variants, preferably 145 mm to 160 mm. The internal length to the exit of the drive shaft from the body (i.e. from the rear end of the coil carrier to the exit of the drive shaft from the body or the key element) is from 150 mm to 185 mm preferably from 160 mm to 175 mm for the oscillating variant and from 135 mm to 170 mm preferably from 145 mm to 160 mm for the sonic variant, which corresponds to the dimension of the internal length of the slide-in unit, since no key geometry is designed for the sonic variant.

The maximum width of the slide-in unit is from 15 mm to 27 mm preferably from 18 mm to 23 mm.

The maximum height of the slide-in unit is from 15 mm to 30 mm preferably from 19 mm to 25 mm.

The frame unit has different geometries lined up for the receptacle of the different components of the interior. The frame unit is mainly loaded from the side, but also from above or below. For this purpose, the frame unit is divided into different zones in particular.

The coil zone, seen from the front end, is the last zone and is used for the installation of the loading coil. The coil carrier is not installed until the half-shell halves are assembled or mounted.

The energy source or accumulator zone follows directly subsequently to the coil zone. This represents the location for mounting the battery. The installation of the rechargeable battery or the battery takes place from below through a corresponding recess or opening in the frame unit.

The energy source zone is followed by the motor zone. This is the installation location for the electric motor. The installation of the electric motor is preferably done from the side. In particular, the motor zone can accommodate, for example, a DC motor with continuous 360° rotation (in one piece).

The motor zone is followed by the gear unit zone. This is the mounting location for the gear unit. The installation of the gear unit is preferably carried out simultaneously with the installation of the motor from the side.

The print zone is preferably located on the upper side of the frame unit and preferably extends over the coil, battery and motor zones. The print plate can also be installed from the side.

The preferred plastic material for the frame unit is a hard component, particularly preferably a polyoxymethylene (POM).

Specific features of the frame unit comprise length compensation, as addressed above, and torque support. Another specific feature is the securing of the two half-shell-like halves. The half-shell-like halves are joined together laterally, preferably by means of latching apparatuses and positioning aids, i.e. for example a combination of latching/clicking and slip-over/guiding, or a combination of form-fit/force-fit connections and form-fit connections.

Alternative connection methods may comprise bonding or bolting.

The number of latching apparatuses is from 4 to 12 preferably from 4 to 8. Latching apparatuses in the form of snap-action or preload arms are particularly preferred.

The latching apparatuses are preferably distributed regularly in the longitudinal direction of the frame unit, preferably at the front, rear and center. Further preferably, they are arranged, as far as possible, symmetrically at the corresponding longitudinal positions.

A connection by turning over is made approximately at the drive shaft outlet of the housing. In the process, the key element is slipped over the two connected half-shell-like halves or, in particular, over the two front guide pin halves of the frame unit.

Another specific design of the frame unit is material savings in the form of recesses in the half-shell-like halves. Particularly in the area of the energy source zone, a truss-like construction with openings and connecting webs is created, the aim of which is to save material while maintaining the stability of the frame unit and not restricting its functionality.

The minimum dimensions for the connecting webs between the apertures are, with regard to the width (lateral plan view), from 1 mm to 6 mm, preferably from 2 mm to 4 mm, and with regard to the material thickness (thickness) of the webs (corresponding to the thickness of the frame unit), from 0.5 mm to 4 mm, preferably from 0.75 mm to 2 mm.

The shapes of the apertures are preferably triangular, wherein one diagonal of a rectangle is left standing in each case. In this manner, a particularly stable truss structure is designed.

The apertures can also be used to enable additional functions. For example, in tight spaces, certain elements such as the connecting rod can take up more space if corresponding apertures are made in their surroundings. The gear unit then protrudes into corresponding apertures in the gear unit zone.

As further specific features of the frame unit, apertures for cable guides are provided at two positions or for two elements. Once at the motor, opposite from the motor shaft, apertures are provided for two cables. Furthermore, apertures for one spring element each are provided at the spring elements, i.e. in front of and behind the battery.

Positioning aids, in particular in the form of guide cylinders and blind holes, are formed here for positioning the left half with respect to the right half, which provide a corresponding positioning or orientation aid.

Preferably, 2 to 10 preferably 4 to 8 positioning aids are provided per half shell-like half. The positioning aids preferably have the form of corresponding blind holes and circular cylinders which are inserted (in a form-fit manner) into each other.

Particularly preferably, the support of the two half-shell-like halves is designed by means of a click system. Thereby 4 to 12 preferably 6 to 10 click positions are provided. Of these, two click positions are preferably located in the longitudinal direction in the area of the key element. The click positions can be formed by snap and/or preload elements.

As already mentioned, the frame unit holds the loading coil and the coil carrier. These are arranged as the rearmost carrier or electrical functional element at the rear end of the frame unit, i.e. on the side of the housing cover. The housing cover drives into the coil so that the charger's ferrite core can later be placed inside the charging coil.

The installation/holding of the loading coil/coil carrier takes place along the longitudinal axis. The coil holder is slipped over the rear end of the frame unit. Due to the production of the coil carrier from soft components, particularly silicone or a soft hard component, it is designed to be flexible. The coil carrier is therefore not secured to the rear end of the frame unit, but can be removed from it. The charging coil is wound onto the coil carrier.

The electrical connections comprise wires which are led from the charging coil to the print plate and soldered there. The wires lie in corresponding guides on the coil carrier. The guides are again arranged in arms which are guided over the print plate.

The charging coil inner diameter is from 7 mm to 15 mm preferably from 9 mm to 13 mm.

The charging coil outer diameter is from 13 mm to 21 mm preferably from 15 mm to 19 mm.

The height of the charging coil is from 3 mm to 10 mm preferably from 4 mm to 8 mm.

The number of coil windings is from 60 to 200 preferably from 80 to 120.

The wire diameter is from 0.1 mm to 0.5 mm preferably from 0.2 mm to 0.4 mm. The wire is preferably made of copper.

The coil carrier is configured to carry the charging coil. Furthermore, it positions the coil opposite the print plate. It also provides damping and longitudinal compensation, as mentioned above. The coil carrier presses against the back of the housing cover and rests against the front of the frame unit.

A spring element is preferably arranged in the coil carrier between the coil carrier and the frame unit.

The coil carrier also has a protective function. It can protect the inner workings to a certain extent if the apparatus falls down. This is because the coil carrier is preferably formed from a soft component, particularly silicone, or a soft hard component.

In accordance with an alternative embodiment, the charging coil is positioned as close as possible to the pivot of the charger. The charging coil touches the housing cover and the silicone coil holder is located between the charging coil and the frame unit.

The interior of the frame unit further comprises at least one rechargeable battery or, optionally, a battery as an energy source. Viewed from the rear end, the accumulator or battery is positioned directly following the coil. The installation of the battery is done through a recess or opening in the underside—but regularly only after the installation of the remaining components on the frame unit.

Both half-shell-like halves thereby preferably define the lower recess or opening so that the battery or accumulator can be inserted into the frame unit from below, i.e. the two opening halves of the two half-shell-like halves fit together in the installed state of the frame unit and thus form a large lower opening. The advantage here is that the battery does not have to be installed until final installation, which makes handling the battery much easier. Accumulators or the battery can also be easily replaced with this design.

In addition, two spring plates are installed in the energy source zone. The two spring plates are located in front of and behind the battery in the direction of the longitudinal axis. By means of the spring plates, the battery is clamped at the front and rear when it is inserted and thus held resiliently in the longitudinal direction. The spring plates are guided into recesses provided for this purpose on the frame unit and clamped therein. The shape of the spring plates is designed in such a way that it is possible to clamp or hold them to the frame unit and clamp or contact the rechargeable battery or the battery. The spring plates are electrically conductive due to the appropriate choice of material and are preferably nickel-plated to reduce contact corrosion.

In the center of the spring plates there is a main surface which is clamped in the frame unit. Positioning shoulders are designed at the top and bottom of the spring plate to prevent slippage in interaction with the frame unit. Furthermore, the spring element has one projecting leg each at the top and bottom, wherein the upper leg forms the later connecting piece to the print plate. The lower leg forms the spring piece and thus the contact points to the battery. At the side of the main surface, the spring plate can be reduced, for example to save material or also to create distance in the area of the spring plate on the side of the motor to reduce the risk of short circuits.

The preferred method of installing the spring plates is to slide them into the frame unit from the side. The spring plates are held in position by retaining arms of the frame unit. The spring plates are secured or clamped laterally between the half-shell-like halves and thus prevented from falling out.

In the radial direction, a protruding element is formed at the front and rear of the frame unit respectively. The spring plates, in turn, have a shoulder, each of which interacts with the protruding element. The protruding element acts as a stop for the shoulder of the respective spring element. Further displacement of the spring element is therefore no longer possible. The spring plates prevent the battery from shifting longitudinally and can therefore also compensate for manufacturing tolerances in the battery.

Furthermore, one pretensioning surface per half-shell-like half is preferably designed on the frame unit for the rechargeable battery or the battery. When installing the battery in the assembled half-shell halves, the preload surfaces clamp the battery accordingly.

The electrical connection to the print plate is made via the spring plates. The spring plates are held in the frame unit and guided through recesses in the print plate. The spring plates are then soldered to the print plate.

It is true that the batteries themselves cannot be positioned unambiguously in this way, as there are no unique geometric elements that would prevent incorrect insertion. However, securing the electronics is preferably done in an electrical manner. For this purpose, approximately an electrical reverse polarity protection is built into the circuit on the print plate, which functions in the manner of a fuse (e.g. in the form of reverse polarity protection diodes).

The print plate is preferably arranged on the upper side of the frame unit. The print plate is regularly attached over a large part of the total length of the frame unit, i.e. over several zones. A recess for the print plate is preferably formed in the upper side of the frame unit. Clamping arms are further preferably formed on both half-shell-like halves, which press the print plate into the recess in the frame unit.

The recess and clamping arms are provided accordingly in both half-shell-like halves. A slight preload is preferably provided here for the insertion of the print plate so that a firm hold can be ensured after installation. This secures the position of the print plate. Displacement in the longitudinal direction as well as in the transverse direction is prevented by the recess. A displacement in height is prevented by the clamping arms. Thus, a positive/force fit occurs when both half-shell-like halves are assembled.

As an alternative to the recess, or if the recess is not designed around the print plate, combinations of lugs on the frame unit with recesses on the print plate can be formed. The lug of the frame unit engages in the recess on the print plate. This allows the print plate to be aligned (clear installation) and prevents displacement in the longitudinal direction. Furthermore, the use of the lug-recess combination can also ensure securing if, for example, print plates of different lengths are used in the same setup, which are only guided on the long sides or the recess has a wall there and the short sides are free. Then the longitudinal securing takes place via the lug-recess combination and can be used identically for the print plates of different lengths.

Retaining arms or support struts for the print plate are also preferably provided at certain locations on both half-shell halves, at least in the area of the drive unit and the on/off switch. These are located to the side of the longitudinal axis and are preferably distributed regularly. The support is provided at least in the rear and front areas in the direction of the longitudinal axis. The number of retaining arms or support struts ranges from 5 to 12 per frame unit half, preferably 7 or 11 per frame unit half.

The retaining arms or support struts for the print plate can be reduced or removed if the print plate is thicker and thus more stable. Therefore, it is also possible to reduce the support struts or the support of the print plate by elements on the frame unit and still maintain the same stability and safety.

Further guidance for the installation of the print plate is provided by the recesses for the spring elements. In addition, the spring elements, which are already mounted, specify the front-rear alignment, as these would be in contact with the underside of the print plate if they were not aligned correctly. The recesses are usually not symmetrical with respect to the shape of the printing plate.

Possible alternative landmarks may be that the print plate may not be rectangular in shape, but instead have, for example, a capped corner or other recess on the side so that installation is only possible in one way (i.e., as with a SIM card for a cell phone, approximately).

The print plate is installed by inserting the connecting pieces of the spring plates, subsequently sliding them sideways into the first half of the frame unit and then sliding on the second half of the frame unit.

The elements on the print plate are approximately conduits, resistors, LEDs, control units, on/off switches and similar components. The function of the print plate is in particular to connect the electrical functional elements and to control them.

Another element of the interior, which is mounted in the frame unit, is the electric motor. Its motor shaft provides an interface to the gear unit. The motor is provided, for example, in the form of a DC motor (direct current motor) with continuous 360° rotation. Motors with a maximum efficiency at a torque of 0.5 mNm-6 mNm, particularly 1. mNm-3.5 mNm, are basically suitable for the application.

Preferably, the motor speed in the unloaded state is from 3,500 rpm to 12,000 rpm. For the oscillating version, the motor speed in the unloaded state is 3,500 rpm to 10,000 rpm, preferably 4,000 rpm to 7,000 rpm. For the sonic variant, the motor speed in the unloaded state is from 7,000 rpm to 12,000 rpm preferably from 9,000 rpm to 11,000 rpm. This means that target values of 10,000 movements for the oscillating variant and 20,000 movements for the sonic variant can be achieved.

Supports are preferably provided in the frame unit or in the motor zone for holding the motor. On each half-shell-like half of the frame unit, approximately 2 to 3 supports are preferably provided at the top and approximately 2 to 3 supports at the bottom (particularly preferably 2 supports in each case, as better support and balance can be achieved with this). Preferably, the supports are arranged symmetrically at the top and bottom. This then brings the radial positioning of the motor within the frame unit. Longitudinal stabilization of the motor is further preferably achieved by front and rear stops, namely on both half-shell-like halves. The electrical connection to the print plate is made via appropriate cables. The opposing supports can exert a certain preload on the motor and thus also keep the motor position stable under load.

The motor and gear unit are pre-assembled in such a manner that the motor is pre-assembled with the eccentric, the connecting rod and the drive shaft with the molded-on articulation piece. Here, the parts are subsequently inserted together from the side into the corresponding half-shell-like half, which is intended for the receptacle.

The present gear unit provides a substantially play-free drive. The gear unit elements (in contrast to a gear unit with toothed elements such as pinions, gears, etc.) are here preferably directly connected to each other and remain in contact with each other, i.e. they are regularly not merely loosely guided into each other (i.e. they do not have any contact-free portions).

Therefore, the result is a particularly precisely defined movement of the gear unit without shocks, vibrations or chatter and with minimal noise.

The present gear unit converts a continuous 360° rotary movement of the motor shaft into a reversing rotary or pivoting movement of the drive shaft. One revolution of the motor shaft results in one cycle of the drive shaft (e.g. left-right-left or once back and forth).

The eccentric, in turn, is the interface of the gear unit to the engine. It is attached to the motor shaft, preferably pressed (press fit). Furthermore, there is a connection to the connecting rod. This is not a fixed connection; the individual elements are preferably put over each other or inserted into each other and can also be taken apart again. They must therefore be held in a fixed position to secure them. Alternatively, the connecting rod can be snapped onto the eccentric.

The main part of the eccentric has a length of 4 mm to 9 mm preferably of 5.5 mm to 7.5 mm and a diameter of 3 mm to 8 mm preferably of 4.5 mm to 6.5 mm.

The eccentric pin of the eccentric has a length of from 1 mm to 6 mm preferably from 2 mm to 4 mm and a diameter of from 1 mm to 4 mm preferably from 1.5 mm to 2.5 mm.

The eccentricity of the eccentric pin axis relative to the main body axis is generally from 0.2 mm to 3 mm preferably from 0.3 mm to 2 mm. For the oscillating variant, an area of 1.4 mm to 2 mm is particularly preferred, and for sonic variant, an area of 0.3 mm to 1 mm is particularly preferred.

The eccentric is preferably formed of metal, most preferably brass. The production is preferably carried out by means of milling. Alternatively, a hard component can be used (by means of injection molding) such as a polyoxymethylene (POM). Here the production is done by means of injection molding. As already described, the eccentric can also be designed in two parts. The eccentric pin may be at least partially metal. For example, a sleeve can be attached to it.

The eccentric is basically made up of two circular cylinders arranged one above the other. The first, larger cylinder is the main part and the second, smaller cylinder is the eccentric pin.

The eccentric has an improved design, in particular with optimized unbalance, i.e. the eccentric runs with less unbalance and thus more quietly. The mass distribution here is particularly homogeneous in the cross-section, so that the motor is loaded more regularly.

Through one or more, preferably two, recesses in the main part, the center of mass of the eccentric is located on the motor shaft. The recess(es) usually do not correspond to the mass or volume of the eccentric pin. The position of the center of mass is decisive in this case. However, the mass or volume of the recess(es) is determined by the size and position of the eccentric pin.

Another possibility is to install or shape a flywheel to bring more mass to the eccentric, for example in the form of a disc (i.e. more mass is positioned further out). The advantage of this is less power consumption during operation, but higher power consumption may have to be accepted during startup.

For the compact design of the gear unit, a narrow pedestal-like elevation is formed on the face side of the main part. The recess created in this manner on the main part allows the eccentric to be arranged closer to the connecting rod.

Another element of the gear unit is a connecting rod. This has a bearing at each end, which are connected together by a rod element. The bearings are not to be understood as independent elements but as parts of the connecting rod. Alternatively, bearing sleeves can be used as described. The rod element is regularly designed narrower than the bearings, but it can also have a width corresponding to the diameter of the bearings. The rod element is also regularly designed longer than the bearings, but it can also have a length that is smaller than the diameter of a bearing. The production of the connection to the eccentric pin as well as the connection to the articulation pin of the articulation piece molded onto the drive shaft is in each case made by the bearings of the connecting rod.

The connection between the eccentric pin and the connecting rod is preferably not a fixed connection. The two elements are merely plugged into each other, i.e. they can also be taken apart again. To secure them, however, they must be held in a fixed position. The same applies to the connection between the other bearing of the connecting rod and the articulation pin of the articulation piece. As explained further below, the defined positioning of the drive shaft with eccentric pin and the defined positioning of the motor with eccentric pin within the frame unit can also secure the position of the connecting rod between eccentric pins or eccentric pins within the gear unit. The articulation piece and the eccentric have corresponding stop surfaces for the connecting rod. This eliminates the need for additional positioning or securing aids for the connecting rod.

The articulation pin preferably corresponds to the eccentric pin in terms of its dimensions. The articulation pin and the eccentric pin have a length of from 1 mm to 6 mm preferably from 2 mm to 4 mm and a diameter of from 1 mm to 4 mm preferably from 1.5 mm to 2.5 mm.

As already described, the articulation piece can also be designed in two parts. The articulation pin may be at least partially metal. For example, a sleeve can be attached to it.

The length of the connecting rod (from bearing center to bearing center) is from 3 mm to 8 mm preferably from 4.5 mm to 6.5 mm.

The thickness of the connecting rod (in the direction of the bearing axes) is from 1 mm to 5 mm preferably from 1.5 mm to 3.5 mm.

The width of the connecting rod (perpendicular to the bearing axes) is from 1.5 mm to 6.5 mm preferably from 3 mm to 5 mm.

The material for the connecting rod is a hard component preferably polyoxymethylene (POM). An advantage of this material is that it has good sliding properties and the bearings are designed accordingly directly with the sliding material and no further element is required. The hard component of the connecting rod can at most be equipped with additives to support the necessary properties, for example with Teflon. The connecting rod can also be made of metal, for example by means of punching.

The connecting rod is preferably designed in a bone-like manner, i.e. the two larger ends or the bearings are connected via a narrower rod element and preferably have the same diameter. This design provides an optimal flow of forces. The symmetrical design allows easier installation. The bone-like design reduces the weight of the connecting rod, which is important because this moving component is subject to high accelerations.

The articulation piece provides the connection between the connecting rod and the drive shaft. The connection to the drive shaft is such that the articulation piece is molded onto the drive shaft. A special design of the drive shaft in this respect consists of improving the connection during overmolding by fluting or rimming the surface and/or in a geometry specially designed for this purpose. (Alternatively, the articulation piece can also be mounted on the drive shaft in a positionally secure manner—e.g. by means of a press fit).

Such special geometry of the drive shaft may comprise approximately a blind hole or a through hole, or else a recess in the drive shaft. The recess can be designed longitudinally or transversely. Preferably, a form closure is provided by a notch, wherein the notch preferably has the same geometry and orientation as a notch of the drive shaft at the attachment brush interface. This so that the production is simplified.

The above-described embodiments serve to prevent longitudinal displacement of the articulation piece and to prevent rotation of the articulation piece.

The position of the articulation piece also at least partially defines the position of the drive shaft in the axial direction. The articulation piece locks the connected drive shaft in axial tension against a corresponding stop surface on the frame unit. The drive shaft is thus supported or positioned against axial tension by means of a stop on the articulation piece and against axial pressure on the frame unit. The defined positioning of the drive shaft with eccentric pin and the defined positioning of the motor with eccentric within the frame unit also secures the position of the connecting rod between eccentric pins or eccentric pins within the gear unit. The articulation piece and the eccentric have corresponding stop surfaces for the connecting rod. This eliminates the need for additional positioning or securing aids for the connecting rod.

The articulation piece has a length (from bearing center to bearing center) of 2 mm to 6 mm, preferably 3.5 mm to 4.5 mm.

The preferred material for the articulation piece is again polyoxymethylene (POM).

To prevent the drive shaft from being pulled out longitudinally, the gating is shaped so that the articulation piece stops at a stop on one or both half-shell-like halves. Preferably, the articulation piece is in contact with the latching or clamping arm, which presses on the drive shaft.

The gating on the drive shaft with the above-mentioned positive locking elements also makes it impossible for the articulation piece to become detached from the drive shaft. This also means that the gear unit cannot be overtightened, i.e. if overtightened with massive force, the articulation piece would break. The articulation piece thus forms an anti-rotation lock and a longitudinal lock for the drive axle.

The drive shaft, for its part, is generally designed to transmit the movement generated by the gear unit to the attachment brush. The free end of the drive shaft forms the interface to the attachment brush. Different drive shafts can be provided for the various attachment brushes.

Two fixings to the handpiece are provided for the oscillating variant (rotary movement/round head). A fixing exists between the key element and the attachment portion so that the brush head rotates and the housing remains secured. The fixing is designed approximately in the form of a snapper or a clamp arm. The second fixing is with respect to the drive shaft by means of snap and/or clamping elements inside the attachment brush, which cooperate with corresponding geometries on the drive shaft.

For the sonic variant (to-and-fro swiveling movement of the oval/rectangular head), on the other hand, only a fixing relative to the drive shaft is provided. The entire attachment brush is moved or swiveled here in relation to the handpiece with the drive shaft. The attachment brush is again secured by snapping or clamping it onto the drive shaft. The drive shaft has geometries with surfaces, angles and/or recesses that optimally or appropriately accommodate the opposite geometry of the attachment brush.

The drive shaft has a diameter of 1.5 mm to 4.5 mm, preferably 2.5 mm to 3.5 mm.

The basic shape of the drive shaft is cylindrical. Deviations from the basic shape may be provided, once at the front for coupling with the attachment brush and at the rear for applying or spraying on the articulation piece.

In an alternative embodiment, instead of an articulation piece and a connecting rod, a (single) element may also be provided, which has a film hinge provided at the location where the connection between the connecting rod and the articulation piece or joint pin is otherwise designed. The advantage of this is a (completely) play-free design in this area of the gear unit. A hard component is preferably used for this purpose.

The bearing of the drive shaft preferably takes place once in a first bearing device within the gear unit zone of the frame unit and once at the front in the through bore on the respective key element.

For the bearing of the drive shaft, a recess is thereby preferably formed in the gear unit zone of the first half-shell-like half for insertion, wherein the second half-shell-like half closes the recess in such a manner that a kind of blind hole is formed in the connected end shape of the frame unit. The bearing geometry is also preferably backed on the outside with supports so that the bearing can be designed to be as stable as possible.

The frame unit is formed from a hard component, preferably polyoxymethylene (POM), which in turn eliminates the need to install a separate bearing, because POM, as already mentioned, has good sliding properties and thus forms a plain bearing for the drive shaft.

The hard component for the key element (preferably POM) is usually reinforced with glass beads, so that the abrasion resistance in use is better and the bearing properties are still given.

The length of the gear unit L G from the motor end of the eccentric main part to the front end of the fixing of the articulation piece to the drive shaft is from 8 mm to 20 mm preferably from 11 mm to 17 mm.

Regarding the fixing of the gear unit, it should be noted that not all connections are fixed, i.e. some connections (particularly those of the connecting rod) are preferably merely pushed or plugged into one another.

Appropriate stops are preferably provided for securing the gear unit. For the drive shaft, a rear stop (in the recess in which it is mounted) is provided on the frame unit (approximately in the plane of the front end of the motor) in its bearing device, and furthermore a front stop is provided for the drive shaft, wherein the articulation piece abuts or rests with its front end face against a stop element of the frame unit. The purpose of this is to prevent the drive shaft from slipping, so that the various gear parts cannot become disengaged, but are held securely in position.

The key element, which virtually establishes the connection or interface between the frame unit and the attachment brush, is preferably secured to the frame unit by means of snap-on elements arranged on the frame unit. Preferably, recesses are provided on the key element itself into which the snap-on elements of the frame unit can engage.

This structure is preferred in that the hard component (usually POM) of the key element is preferably reinforced with glass beads and is thus itself less suitable for forming a snap-on element.

One snap element and one guide pin half are preferably formed at the front end of each half-shell-like half of the frame unit. Supportingly, a front snap element, approximately in the form of a snap ring, is formed across the two half-shell-like halves and engages the corresponding snap recess(es) of the key element.

In addition to its function as an interface, the key element is also used to connect the two half-shell halves, i.e. the key element is pushed over their (preferably cylindrical) front end, i.e. the two half-cylindrical guide pins of the frame unit, so that the two half-shell halves are held securely together, particularly in the front area.

The key element is shaped in such a way that the wall thickness is kept as constant as possible. This is preferably controlled via recesses inside the key element. This allows better stability of the key element and optimized production with, in particular, fewer sink marks. Additional recesses/apertures may also be provided to prevent material buildup and minimize warpage.

In the area where the key element rests against the frame unit, a type of plate is formed, with the plate preferably being placed asymmetrically to the key element. Functional elements are preferably formed on the plate, such as the counterpart to the snap elements of the half-shell-like halves and a receptacle for the cylindrical guide pin of the assembled frame unit.

The internal geometry of the key element (particularly for the oscillating variant) preferably comprises a total of four diameter stages, which are described below.

The first stage comprises the coupling to the frame unit and the contact area to the bellows seal. Preferably, a (strong) chamfer is created in the direction of the opening so that the installation of the bellows seal can be carried out in a simple manner. The diameter of the first stage is from 5 mm to 10 mm preferably from 6 mm to 8 mm.

The second stage represents the transition area and serves as a free space for a movement of the bellows seal. The diameter of the second stage is from 4 mm to 9 mm preferably from 5 mm to 7 mm.

The third stage comprises the drive shaft feedthrough and is regularly smaller than the second stage. The diameter of the third stage is from 2 mm to 6 mm preferably from 2.5 mm to 4.5 mm. The diameter is preferably not constant here, since recesses can be performed in the bushing, which serve as distortion optimization. Material buildup can thus be avoided and the key element can be better produced without distortion.

The fourth stage comprises the (second) bearing device of the drive shaft. It is regularly smaller in diameter than the third stage. The diameter is from 1 mm to 5 mm preferably from 2 mm to 4 mm.

However, the design of the key element is usually different for the sonic variant. In the sonic variant, the key element is not usually formed with a special interface or coupling geometry for the attachment brush, since the attachment brush is only secured in place relative to the drive shaft. In this case, the attachment brush can be moved relative to the housing. The key element is therefore also shorter in the sonic variant than in the oscillating variant.

In addition, in this respect the diameter in accordance with the third stage in the sonic variant is also not formed, so that the third stage in the sonic variant virtually corresponds to the fourth stage in the oscillating variant, where the drive shaft is mounted. Furthermore, no bellows seal is mounted in the key element; the seal is provided by the sealing/damping element. This is possible due to the lower deflection with the sonic variant.

The maximum wall thickness of the key element is from 0.5 mm to 2 mm preferably from 0.75 mm to 1.25 mm.

The length of the key element in the oscillating variant is from 20 mm to 40 mm preferably from 25 mm to 35 mm.

The length of the key element in the sonic variant is from 5 mm to 20 mm, preferably from 10 mm to 15 mm.

Inside the key element, a seal in the form of a bellows seal is preferably arranged, which is attached to the drive shaft. The bellows seal is preferably a one-piece element that seals the housing from the drive shaft. The bellows seal is preferably mounted in the key element and subsequently pushed onto the drive shaft.

The position of the bellows seal is preferably secured in the longitudinal direction of the drive shaft once at the front by means of a stop in the key element itself and once at the rear by means of a stop on the frame unit (i.e. in the installed state on the guide pin).

A sealing/damping element is slipped over the key element from the front—as an external seal—which seals the key element against the housing.

The sealing/damping element has a shell-like structure; in terms of its function, it is like a skin that is simply slipped over the key element and part of the frame unit. This means that the sealing/damping element is on the outside of the key element. The sealing/damping element has lateral guide rails which assist in inserting/positioning the interior of the slide-in unit into the handpiece and, if necessary, cooperate with corresponding rails on the inside of the housing. In doing so, they create damping with regard to vibrations and noise between the housing and the inner workings thanks to the soft components used. One to five beads are formed in the cylindrical part of the sealing/damping element, which run around the longitudinal axis of the sealing/damping element. These serve to ensure the seal between the sealing/damping element and the housing. The beads are in contact with the housing in the installed state.

The attachment brushes for the handpiece according to the invention are also basically differentiated with regard to the types of movement.

In the oscillating variant, the attachment brush regularly has several moving parts. The attachment brush comprises at least a head portion having a brush head, an attachment portion, and a neck portion connecting the head portion to the attachment portion, wherein the (movable) brush head has a brush field. The attachment portion has a conversion unit with possibly several connecting and bearing elements with which the periodic back-and-forth swinging movement of the drive shaft can be converted into an (oscillating) rotary movement of the brush head.

The coupling geometry corresponds in this respect with the geometry of the drive shaft which engages in the attachment portion of the attachment brush. The periodic pivoting movement of the drive shaft is thus converted in the attachment brush portion into the (oscillating) rotary movement of the brush head perpendicular to the brush head axis.

In the sonic variant, on the other hand, the attachment brush has no moving parts. The attachment brush comprises a head portion having a brush head (immovable), an attachment portion, and a neck portion connecting the head portion to the attachment portion, wherein the brush head has a brush field. The attachment portion may be one-piece (e.g., fully injection molded) or it may be multi-piece (e.g., the attachment portion may be injection molded and the coupling geometry may be arranged in an element that is inserted into the attachment portion).

The attachment portion corresponds to the geometry of the drive shaft, which is inserted directly into the attachment portion of the attachment brush. The periodic swiveling movement of the drive shaft is transmitted here directly to the attachment brush. In this respect, there is no (additional) fixing of the attachment portion relative to the electric toothbrush handpiece in this variant, as is the case with the oscillating variant.

Further preferred embodiments for the electric toothbrush handpiece or individual components thereof are given below.

The motor output of the electric motor particularly preferably comprises a torque of 0.5 mNm to 1.96 mNm, further preferably of 1.2 mNm to 1.8 mNm. This is independent of the battery type. The motor characteristic curve specifies the torque.

However, the current consumption of the motor depends in each case on the load. In this regard, it should be noted once again that a “loaded state” is referred to here when a load or a flat contact pressure of approximately 300 g is exerted on the brush head of the attachment brush. We speak of an “unloaded state” when no contact pressure is exerted on the attachment brush.

With an oscillating movement, the current consumption is from 0.2 A to 0.5 A in the unloaded state and from 0.3 A to 0.6 A in the loaded state.

The rotational speed ranges for both oscillating and sonic variants are basically the same. In this case, the motor speed in the unloaded state is from 5,000 rpm to 15,000 rpm, preferably from 7,000 rpm to 13,000 rpm. In the unloaded state, the motor speed is from 5,000 rpm to 15,000 rpm preferably from 7,000 rpm to 13,000 rpm.

The movement of the drive shaft (from the home position) comprises an angular area of +/−10° to +/−40° preferably +/−20° to +/−30° and most preferably +/−25° for an oscillating movement.

In a sonic movement, the movement of the drive shaft (from the home position) comprises an angular area of +/−1° to +/−15° preferably from +/−3° to +/−10°.

However, for different angles of rotation, as explained above, there are changes with regard to the eccentric pin or eccentricity, i.e. for the oscillating movement, approximately the eccentric pin is more offset with respect to the motor shaft than for the sonic movement.

The length of the drive shaft from the housing exit (i.e., the front end of the key element) to its free end is from 10 mm to 30 mm preferably from 14 mm to 22 mm for an oscillating movement and from 20 mm to 40 mm preferably from 26 mm to 34 mm for a sonic movement.

The angle between the longitudinal direction of the rod element of the connecting rod with respect to the articulation piece axis for an oscillating movement is minimally from 40° to 75° preferably from 50° to 65° and maximally from 90° to 130° preferably from 105° to 117°. In this manner, there is no dead spot that could block the movement.

In a sonic movement, the minimum angle between the longitudinal direction of the rod element of the connecting rod relative to the articulation piece axis is from 50° to 90° preferably from 62° to 78° and the maximum angle range is from 80° to 120° preferably from 92° to 108°.

If we consider the handpiece with the attachment brush attached, the angle of rotation of the brush head during an oscillating movement in the unloaded state is +/−15° to +/−40°, preferably from +/−20° to +/−30°.

In a sonic movement, the swivel angle of the brush head in the loaded state is +/−1° to +/−15° preferably from +/−3° to +/−10°, which corresponds to the movement of the drive shaft from the home position.

With regard to the contact pressure, it should be noted that the current consumption of the motor increases with increasing load. The greater the change in contact pressure, the easier it is to measure the load indirectly using the motor current. The increase in motor current between the unloaded state of the attachment brush and a load of 500 g on the attachment brush is approximately between 20% and 80%, ideally in the area of 30% to 50%.

Nickel metal hydride (NiMH) and lithium ion (Li-ion) rechargeable batteries in particular are used for the present electric toothbrush handpiece. For NiMH batteries, the voltage is approximately 1.2 V. The energy density is approximately 70 W/kg to 90 W/kg. For Li-ion batteries, the voltage is approximately 3.6 V. Preferably, a protection circuit is provided for the Li-ion batteries.

For the protection circuit, a protection circuit IC ("IC" stands for integrated circuit) with the lowest possible overcurrent detection voltage of preferably less than 0.15 V, even more preferably less than 0.12 V, and ideally 0.1 V, is preferably selected to also allow small RDSon resistances ("RDSon" stands for turn-on resistance) in the turn-off MOSFETs ("MOSFET" stands for metal-oxide-semiconductor field-effect transistor).

This is because higher overcurrent detection voltage results in higher maximum breaking currents with the same RDSon. This in turn can lead to excessive power dissipation at the MOSFET. Therefore, a MOSFET with an RDSon in the tolerance of approximately 8 mOhm to 23 mOhm preferably from approximately 9 mOhm to 20 mOhm should be used. This results in a switch-off current that is on the one hand high enough to avoid accidentally switching off the apparatus during current peaks, but on the other hand low enough not to exceed the maximum discharge current of the battery and the maximum power dissipation at the MOSFET.

By means of this circuit, a lower quiescent current can be achieved. This results in a longer storage life of the batteries, i.e. particularly finished products with an installed battery can be stored for longer without the battery discharging and its functionality being impaired.

In addition, LMO (lithium manganese oxide spinel) Li-ion batteries have proven to be particularly suitable, as they allow higher discharge currents of up to 10 C. Maximum discharge currents of 1 C to 3 C, preferably 1 C to 2 C, are particularly suitable for the application here. This is significant insofar as higher starting currents are required due to the design with motor and gear unit. In addition, LMO batteries do not contain cobalt, which makes them more environmentally friendly. Furthermore, they have higher thermal stability, which means greater safety. The energy density of these batteries is approximately 100 W/kg to 150 W/kg.

NMC batteries ("NMC" stands for lithium-nickel-manganese-cobalt oxides) are also preferred because they have a comparatively high energy density of approximately 150 W/kg to 220 W/kg.

The rechargeable batteries used generally have a voltage of 1 V to 5 V and preferably of 1.2 V to 3.6 V.

Replaceable (disposable) alkaline batteries, for example, can also be used as an alternative to rechargeable batteries if the product design is adapted accordingly.

Distances of particular relevance to the present invention comprise approximately the distance between the motor shaft and the drive shaft. This is from 4 mm to 12 mm preferably from 5 mm to 8 mm. The motor shaft is located above the drive shaft, which enables a particularly compact design.

Furthermore, the distance from the exit of the motor shaft from the motor to the exit of the drive shaft from the housing (i.e., the front end of the key element) is from 40 mm to 60 mm preferably from 45 mm to 55 mm for the oscillating variant and from 25 mm to 45 mm preferably from 30 mm to 40 mm for the sonic variant.

With regard to the length ratios of the connecting rods in the gear unit, an aspect ratio of the connecting rod to the articulation piece of at least 2:1 is preferred, and an aspect ratio of at least 3.5:2 is even more preferred. The connecting rod and the articulation piece have the same length for both the oscillating and the sonic version. The differences in movement are achieved via the different design of the eccentric or eccentricity.

Important protective features for the electric toothbrush handpiece according to the invention include waterproofing, low noise, or vibration during operation, and chemical resistance.

The production of water tightness is achieved by means of sealing elements, once against the housing, once against the drive shaft and once against the housing cover. The housing itself is inherently waterproof. The on/off switches of the toothbrush can each be actuated via a membrane made of preferably a soft component preferably elastomeric plastic.

A seal is thereby arranged on the key element and seals the key element against the housing. This seal is the sealing/damping element described above. Another seal is arranged inside the key element and seals the drive shaft from the key element. This seal is the bellows seal described above. The sealing/damping element can also be replaced by a soft component, which is injected onto the hard component of the key element, preferably by 2-component injection molding.

A still further preferred seal in the form of an O-ring is arranged on the housing cover itself (i.e. not on the frame unit). The O-ring provides a seal between the housing cover and the housing. The O-ring can also be replaced by a soft component, which is injected onto the hard component of the housing cover, preferably in a 2-component injection molding process.

With the lower volume during operation, a significant improvement in comfort can be achieved. In particular, the clearance between the moving parts has been reduced so that the movements are transmitted with more direct or closer contacts and without interlocking. In addition, the number of components has been reduced.

Furthermore, as described above, the bearing points for the drive shaft are far apart, which gives the gear unit additional stability and quietness. Furthermore, the frame unit is damped in the housing, which brings vibration and noise decoupling and damping. Finally, a motor with less play in itself or with an improved bearing of the motor shaft is preferred.

Chemical resistance is provided by suitable materials of the seals. In addition, the inner workings of the toothbrush are otherwise not exposed to the outside world.

There are also differences between the gear unit for oscillating movement and the sonic gear unit with regard to the components to be changed. In particular, other eccentrics, other drive shafts, other sealing/damping elements and other key elements are provided. Further, the bellows seal is omitted. However, switching manufacturing from an oscillating toothbrush to a Sonic toothbrush (or vice versa) does not involve too much effort in this respect. A substantial proportion of the components remain unchanged.

Various cleaning programs are comprised as another preferred function of the electric toothbrush handpiece according to the invention.

The cleaning programs are defined via speed patterns. In principle, a cleaning program can also be defined as a sequence of speed patterns.

The cleaning programs can run at a constant speed, for example at 100%, which is also referred to as "Clean". Here, the utilization rate is at 100%, i.e. the motor is always under power. A constant speed at 60% to 80% is also conceivable, which is also referred to as "sensitive". Here, the utilization rate is 60% to 80%, i.e. the motor is not always under power.

However, cleaning programs are also comprised in which the speed fluctuates between two or more values. The speed therefore changes during operation. This can take the form of a swell and decay, or a swell with a jump to a base value with a renewed swell. It is also possible to jump directly between speed values. For example, stage 1 high speed, stage 2 low speed, stage 1 . . . etc. However, massage programs are also conceivable in which the utilization level alternates between 0% and 100%.

Furthermore, a timer function is preferably provided to indicate the cleaning time. Approximately four signals can be provided here, always after 30 seconds, wherein the fourth signal may be somewhat longer to signal the end of the cleaning time. Of course, only one signal can be provided at the end of the cleaning time.

Possible signal types are approximately a (short-time) speed change as acoustic signal type or the use of LEDs as optical signal type (or possibly a combination of both).

The speed change can take the form of a reduction, a stop (down to zero speed) or an abrupt increase in speed. On the other hand, LED lamps can also be provided, which may generate different colored flashing and/or light signals.

Furthermore, an auto-off function is also conceivable. This comprises a function for switching off the apparatus in the event of unintentional switch-on (e.g. during travel or transport). The apparatus then switches off after a preset period of time. The predetermined time duration can be approximately between 2 min and 10 min preferably between 2 min and 6 min.

Furthermore, an easy-start function can also be provided. This function makes it easier for the user to get used to handling the product. This means approximately that in the course of the first number of uses (e.g. from the new purchase or from a reset) the movement or the motor speed is gradually increased. The increase can occur with each use or only after several uses.

For example, the motor speed during initial use may be 40% to 70% preferably 45% to 55% of the maximum speed or maximum motor speed. This depends in each case on the cleaning program used.

The increase in motor speed can be unlimited per use or at least 5%. It can also be linear, with or without an underlying function. If necessary, the function is specially adapted to the corresponding cleaning program.

The number of uses for acclimation is from 4 to 12 times preferably from 8 to 10 times. The final level again depends on the cleaning program. If the cleaning program is running at approximately 80% of the maximum motor speed, there will be no further increase above this value.

Furthermore, a soft-start function can also be provided. In this case, the movement starts up slowly each time it is switched on, i.e. the motor is slowly ramped up to the motor speed. This can be done using a linear or a non-linear (e.g. progressive) curve or function.

The time required to go from 0% to 100% of the motor speed is from 200 ms to 1200 ms, preferably from 400 ms to 800 ms. The speed does not necessarily comprise 100% of the engine speed, certain cleaning programs can also run at a lower speed.

Furthermore, a soft stop function can be provided. Here the movement stops slowly at each switch-off, i.e. the motor is slowly run down. This can be done using a linear or a non-linear (e.g. a degressive) curve or function.

The time required to go from 100% to 0% of the motor speed is from 100 ms to 800 ms, preferably from 300 ms to 600 ms. The speed does not necessarily comprise 100% of the engine speed, certain cleaning programs can also run at a lower speed.

As a further function, the possibility of reprogramming on the charging station can also be provided. The reprogramming function is particularly suitable for properties where it is possible to set between two values, such as switching on and off (i.e. it switches from one value to the other in each case).

Examples of reprogramming options comprise, for example, switching on and off or changing a contact pressure upper limit and, if necessary, also a contact pressure lower limit, switching between two cleaning modes, switching the Auto-Off between two values (on and off), switching the Easy Start on and off, switching the Soft Start on and off, and switching the Soft Stop on and off. When the apparatus is on the charging station, such functions can thus be switched on or off and/or threshold values for such functions can be changed.

For this purpose, the apparatus is preferably placed on the connected charging station. Subsequently, the on/off switch is held down for a given period of time (wherein this can in principle also be another existing switch). The given time duration is between 1 s and 10 s preferably between 3 s and 7 s.

The confirmation of the change of the respective value can be confirmed to the user in an acoustic or in a visual way. For example, an increasing tone sequence can be provided when switching on, or a decreasing tone sequence when switching off, or corresponding LED signaling by means of flashing/illuminated lamps. Following confirmation, the corresponding switch can be released again Optionally, several of the above functions can also be controlled in this way. Thus, approximately after 3 s of pressing down the corresponding switch, a first function can be set, after another 2 s a second function and after another 2 s a third function. The first, second, and third functions may each have a first duration, a second duration, and a third duration, respectively.

The time at which the switch is released determines which function is set. In other words, different functions can be selected or set by pressing for different lengths of time. For example, after pressing down for 3 s, the first function can be set, or after pressing down (directly) for 5 s, the second function can be set, or after pressing down (directly) for 7 s, the third function can be set.

A corresponding light signal from an associated LED lamp can also be used to indicate to the user in a visually defined manner which function has been set.

LEDs and signals generated by the motor are suitable as signal forms for confirming the execution of determined actions on the toothbrush. For example, after the toothbrush has been placed on the charging station, confirmation of the charging process can be provided by means of a visual or audible signal. Reprogramming can also be confirmed accordingly by an optical or acoustic signal.

In the following, possible alternative drive options to the conrod gear unit described above, which can also be used to convert a continuous rotary movement of the motor shaft into a reversing rotary/swiveling movement of the drive shaft, will be briefly discussed again.

In a first transmission variant in accordance with WO 2008/040402 A1, a cam with a reduction ratio is provided. In the process, the motor shaft rotates continuously through 360° and drives a gear wheel. The gear engages with another gear or crown wheel, which drives the eccentric. The eccentric is tapped from the fork (as the pickup), wherein the drive shaft is suspended from the fork. Here, one revolution of the motor shaft results in less than one revolution of the drive shaft. This drive is in context is also conceivable but less preferred.

In a second transmission variant in accordance with WO 2008/040402 A1, a direct drive with a cam is provided. In turn, the motor shaft rotates continuously through 360°, wherein an eccentric is attached to the motor shaft. The eccentric is tapped from the fork with the drive shaft. Here, one revolution of the motor shaft corresponds exactly to one revolution of the drive shaft. This drive is in context is also conceivable but less preferred.

Substantial aspects of the attachment brushes in accordance with the present invention will now also be discussed.

For the attachment brushes according to the invention, (conventional) extruded bristles are preferably used, i.e. in both pointed and cylindrical form, formed from hard and/or soft components and preferably from polyamide (PA) or polyester (PBT).

The production can be done by extrusion of one material or by extrusion of more than one material (co-extrusion). In contrast to injection-molded bristles or rubber-elastic massage and/or cleaning elements, which are produced by means of injection molding, conventional bristles are extruded, cut and, if necessary, machined before being inserted on the brush carrier by means of a suitable method.

The longitudinal shape of the brushes or bristle filaments can be cylindrical, mechanically or chemically pointed (especially with polyester (PBT)), corrugated, twisted and/or helical.

Preferred cross-sectional shapes are circular, round, triangular, rectangular, square, elliptical, polygonal, trapezoidal, parallelogram or rhombus.

For oral hygiene products, the diameter ranges from 0.075 mm to 0.25 mm and the cross-sectional surface from 0.002 $mm^2$ to 0.2 $mm^2$. The diameter describes the smallest circle that can be formed around the cross-sectional shape of the brush.

For cosmetic products, which are also conceivable as attachment brushes in the present context, a diameter of 0.025 mm to 0.2 mm and a cross-sectional surface of 0.001 $mm^2$ to 0.15 $mm^2$ are sufficient.

The surface of the brushes is preferably smooth or textured. The brushes are regularly gathered in bundles.

In preferred embodiments, tongue cleaners may also be provided on the attachment brushes, which are formed from hard components and/or from soft components and/or combinations of hard components and soft components and/or material for injection-molded brushes. The production of the tongue cleaners is regularly carried out by injection molding.

The plastics preferably used as hard components in the present invention generally comprise styrene polymers such as styrene acrylonitrile (SAN), polystyrene (PS), acrylonitrile butadiene styrene (ABS), styrene methyl methacrylate (SMMA) or styrene butadiene (SB); Polyolefins such as polypropylene (PP) or polyethylene (PE) (preferably also in the form of high density polyethylene (HDPE) or low density polyethylene (LDPE)); Polyesters such as polyethylene terephthalate (PET) in the form of acid-modified polyethylene terephthalate (PETA) or glycol-modified polyethylene terephthalate (PETG), polybutylene terephthalate (PBT), acid-modified polycyclohexylene dimethylene terephthalate (PCT-A) or glycol-modified polycyclohexylene dimethylene terephthalate (PCT-G); Cellulose derivatives such as cellulose acetate (CA), cellulose acetobutyrate (CAB), cellulose proprionate (CP), cellulose acetate phthalate (CAP) or cellulose butyrate (CB); Polyamides (PA) such as PA 6. 6, PA 6.10 or PA 6.12; polymethyl methacrylate (PMMA); polycarbonate (PC); polyoxymethylene (POM); polyvinyl chloride (PVC); polyurethane (PUR) and/or polyamide (PA).

Polyethylene (PE) can be used both as a hard component and as a soft component. Similarly, polyurethane (PU) can be used both as a hard component and as a soft component.

Polypropylene (PP) with a modulus of elasticity of 1000 to 2400 $N/mm^2$, preferably of 1200 to 2000 $N/mm^2$, and particularly preferably of 1300 to 1800 $N/mm^2$ is preferably used.

In the context of the present invention, the hard component (or combinations thereof) is preferably used for or in unstable structure-bearing elements.

In the case of the electric toothbrush handpiece, these are approximately the housing, the frame unit, the molded articulation piece with the articulation pin, the connecting rod, the eccentric, the key element and the housing cover.

For the attachment brush according to the invention, these are basically approximately the head portion, the attachment portion, the neck portion, and the brush head.

If several hard components are used (for example in two-component or multi-component injection molding) or if materials are joined by means of ultrasonic welding, the hard components used preferably form a material bond between themselves.

Alternatively, several materials can be used, which do not form a material bond in two- or multi-component injection molding. In these pairings, form closure is provided (e.g., by undercuts and/or apertures as well as partial and/or complete overmolding, etc.).

The second injected hard component then shrinks onto the first injected hard component during cooling, forming a shrinkage connection. Examples of possible hard component pairings that do not form a material bond are polypropylene and polyester or polypropylene and styrene acrylonitrile.

In the context of the present invention, or. generally, the soft component(s) are formed from a thermoplastic styrene elastomer (TPE-S) (preferably a styrene ethylene butylene styrene copolymer (SEBS) or styrene butadiene styrene copolymer (SBS)); a thermoplastic polyurethane elastomer (TPE-U); a thermoplastic polyamide elastomer (TPE-A); a thermoplastic polyolefin elastomer (TPE-O); thermoplastic polyester elastomer (TPE-E); and/or silicones.

In the context of the present invention, soft components are used approximately for injection-molded bristles, for cleaning and massaging elements on the brush head of an attachment brush, for tongue cleaners on or at the brush head of an attachment brush, or as grip-enhancing materials on the handpiece and/or in the area of the switches of the handpiece.

Polyethylene (PE) and polyurethane (PU) can be used both as hard components and as soft components. Soft components are particularly preferred thermoplastic elastomers (TPEs) with a Shore A hardness of less than 90, preferably less than 50 and even more preferably less than 30. The soft components preferably form a material bond with hard components during overmolding in the two- or multi-component injection molding process.

Further preferably, the material(s) for the injection molded brushes are formed from thermoplastic polyurethane elastomers (TPE-U). They have better flow properties than standard TPEs and faster solidification (i.e. faster crystallization wherein the molecular chains bond at high temperatures).

Alternative materials comprise approximately polyethylene (PE), for example in the form of low-density polyethylene (LDPE) or linear low-density polyethylene (LLDPE) or thermoplastic polyester elastomers (TPE-E) or thermoplastic polyamide elastomers (TPE-A).

The materials for injection molded brushes further preferably comprise soft components preferably thermoplastic elastomers and have a Shore D hardness of from 0 to 100 preferably from 30 to 80. Special forms of soft components are used for injection-molded brushes, which generally have higher Shore hardnesses than soft components from which soft-elastic cleaning/massage elements or handle zones or approximately tongue cleaners are manufactured.

During the injection molding process (e.g., a two-component or multi-component injection molding process), the materials for molded brushes generally do not form a material bond with the other soft and/or hard components used (e.g., a carrier plate or brush head). Consequently, a form closure is provided for any connections with other hard or soft materials (e.g. by undercuts and/or apertures as well as partial and/or complete overmoldings, etc.). The material for the sprayed brushes, which is sprayed second, shrinks onto the first sprayed hard or soft component during cooling, thus forming a shrinkage compound.

As special materials, so-called bioplastics (i.e. plastics made from renewable raw materials) or water-soluble polymers can also be used.

Bioplastics consist of basic materials from the following raw materials. The possible raw materials are, for example, corn, hemp, sugar, castor oil, palm oil, potatoes, wheat, sugar cane, rubber, wood or the castor plant/wonder tree. Examples of basic materials comprise cellulose, starch, lactic acid (PLA), glucose, chitin or chitosan.

The main groups of bioplastics preferred here comprise starch-based bioplastics, cellulose-based bioplastics, polyhydroxyalkanoates (e.g. polyhydroxybutyric acid (PHB)), polylactic acid (PLA) or aliphatic/aromatic copolyesters. Other preferred bioplastics comprise approximately lignin-based bioplastics.

In the following, production and possibly bristling processes relevant in particular to the components of the drive unit, the electric toothbrush handpiece and the attachment brushes will be described in general and also on the basis of various preferred design variants.

Injection molding is generally carried out in an injection mold (or a corresponding machine) preferably in the form of a multi-component injection molding. In the process, the materials can bond, either by material closure or by substance closure. However, it is also possible that the materials do not bond, i.e. a hinged connection with mobility or a hinge is created approximately by means of form closure. Hot channel, cold channel or co-injection methods can generally be used. The position of the gating points can vary depending on the component, i.e. the gating points can be arranged at the front of the component, in the center of the component or at the rear of the respective component.

The preferred bristling methods for the brush heads described here are in particular anchor stamping methods and anchorless bristling methods.

In the anchor stamping method, the main part is first molded with corresponding blind holes for the brushes. Subsequently, the brushes are folded and fastened in the blind holes by means of anchors, which are regularly formed from (or cut from) punched wire. In addition to the brushes, the anchor stamping method requires a punching device, a punching tool, punching wire or anchors and corresponding mold inserts.

A variant of anchor punching, which can also be used in the present case, is loop punching. Here, the brushes are constricted by means of wire loops, which are also formed from punched wire, and inserted into the blind holes.

In the anchorless bristling methods, on the other hand, the brushes are not folded and no punch wire is used. The brushes therefore have only half the length compared with the bristles from the anchor or loop punching process.

The sequence of a first preferred method variant is as follows: First, the brush bundles are separated, subsequently the bristle ends are fused, and then the bristle ends are directly overmolded. The brush bundles can generally be brought together here, i.e. united to form a larger bundle. When overmolding also includes injection molding of the handle, it is referred to as the “in mold tufting” method (IMT method). If the brushes are first overmolded with platelets and subsequently the platelets are overmolded with the handle, this is referred to as Integrated Anchorless Production.

The sequence of a second preferred method variant is as follows: First, (separate) carrier plates for the brushes with through holes are injection molded, subsequently the brushes are provided and fed through the carrier plate. The brushes are then melted at their rear ends and fused to the carrier plate, and finally the bristled carrier plate is ultrasonically welded to the handle, which is also manufactured separately. Can brush bundles be merged in the process or not.

The sequence of a third preferred method variant is as follows: First, the main part is injection molded with through holes for brushes in the head area, subsequently the bristles are provided and fed through the through holes in the head area. Then the brushes are fused on the back of the head area and subsequently the bristle melt is overmolded with soft material. Known methods comprise the possibilities in which the merging of brushes is not possible as well as methods in which the merging of brushes is possible.

The sequence of the fourth method variant is as follows: First, a main part is molded with blind holes or recesses for the bristles in the head area, subsequently the bristles are provided in bundles. The brushes are then fused in bundles, subsequently the main part in the head area (i.e. in particular the bristle carrier or brush head) is heated approximately to glass temperature and finally the fused bristle ends are inserted into the blind holes or recesses and the bristle bundles are anchored in the bristle carrier with pressure. In other words, the size of the blind holes is reduced or the geometry of the brush carrier or brush head is deformed in order to anchor the bristle bundles).

Another preferred bristling method is the twist-in method. Here, the brush filaments are first fed, bundled and pre-drawn. In particular, the brush filaments are fed from a roll. Several filament strands can be wound on one roll. Several rolls are preloaded for machine loading in each case, because each brush filament in the brush corresponds to one filament strand. The filaments are spread out appropriately so that they have the width at which they will be inserted into the brush. Subsequently, the filaments are pre-drawn so that they are free for the next step, i.e. so that the wire can be passed over them.

Now the wire is fed, cut and bent. The wire is fed (i.e. unwound) from a wire reel to the bristling machine and introduced into the process. The wire is cut to a length greater than the unwound length of the twisted brush filaments (the final cutting is done after twisting). The wire is then bent into a U so that the open side can later be slid over the filaments (this is also referred to as threading the brushes).

Now the filaments and the bent wire are brought together. The wire is thereby pushed over the filaments from the outside, wherein the wire is held in the bend or at the bottom of the U. The open end of the wire is then clamped so that the filaments hold between the pieces of wire. Subsequently, the filaments are cut to a length that is longer than the final length in the brush, so that the brush can be cut correctly after the filaments are twisted in.

Now the filaments are turned and profiled. I.e. the wire is twisted so that the filaments are clamped or secured between the wire. After the filaments have been clamped or secured between the wire, they are cut to the desired length or profiled accordingly. After the appropriate part of the brush is completed, the excess wire is cut off.

The present invention generally comprises brush products for personal care, oral hygiene and, in particular, electric toothbrushes.

For the attachment brushes according to the invention, the three embodiments described below are particularly preferred.

In the first preferred embodiment, preferably all elements of the brush field on the brush head comprise cylindrical bristles or brush filaments. In principle, however, all possible filament types are conceivable.

The diameter of the brushes or brush filaments is preferably from 0.075 mm to 0.25 mm and the cross-sectional surface is preferably from 0.002 $mm^2$ to 0.2 $mm^2$.

Preferably, the brushes or the brush bundles descend towards the center of the brush head, wherein the difference between the highest and the lowest point is from 1 mm to 4 mm preferably from 2 mm to 3 mm.

Preferably, three different shapes of brush bundles are used here, namely circular segment-shaped brush bundles, small oval brush bundles and large oval brush bundles. Preferably, the individual shapes of brush bundles are arranged in a circular ring with respect to each other, i.e. preferably in three concentric circles, wherein, however, the brush bundles of one shape can also be arranged slightly offset inwardly (i.e. in the direction of the center of the brush head) between the brush bundles of another shape of brush bundles.

The innermost circle preferably comprises identical brush bundles, which further preferably have a uniform, constant height. The brush bundles are preferably arranged in four circular segments, thus forming an interrupted circular ring.

The length of each circle segment depends on the number of bundles used in each case and the gaps between them. The width of the individual circle segments is from 0.2 mm to 1 mm, preferably from 0.3 mm to 0.6 mm. The height of the individual circle segments is from 4 mm to 8 mm preferably from 5.5 mm to 6.5 mm.

The surface of the brush bundles is from 2 $mm^2$ to 4.5 $mm^2$ preferably from 2.3 $mm^2$ to 3 $mm^2$.

The angular area covered by the brush bundles is from 45° to 360°, preferably from 70° to 120°.

The number of brush bundles is from 1 to 8 pieces preferably from 2 to 5 pieces.

The diameter of the circle on which the brush bundles lie (through the center of the bundle) is from 2 mm to 5 mm, preferably from 2.5 mm to 4 mm.

The length of the gaps between the individual circle segments is from 0.5 mm to 1.4 mm preferably from 0.7 mm to 1.1 mm.

The central circle preferably comprises identical brush bundles in the form of large ovals. The centers of the large ovals are preferably located on this circle. The large oval brush bundles further preferably have a bevel (i.e., at their upper end) that slopes downward toward the center. The brush bundles are larger than the brush bundles of the outer circle.

The length of the large oval brush bundles is from 3 mm to 6 mm preferably from 4 mm to 5 mm.

The width of the large oval brush bundles is 0.8 mm to 2.4 mm preferably from 1.2 mm to 1.8 mm.

The outer height of the large oval brush bundles is from 7 mm to 10 mm preferably from 8 mm to 9 mm. The inner height of the large oval brush bundles is from 5.5 mm to 8.5 mm preferably from 6.5 mm to 7.5 mm.

The surface of the large oval brush bundles is from 3 $mm^2$ to 14 $mm^2$ preferably from 4.5 $mm^2$ to 7 $mm^2$.

The number of large oval brush bundles is from 4 to 11 preferably from 6 to 9. The number of large oval brush bundles of the central circle is preferably equal to the number of small oval brush bundles of the outer circle, since the brush bundles are preferably arranged alternately.

The radius of the circle on which the brush bundles lie (through the center of the large oval brush bundles) is from 3 mm to 6.5 mm preferably from 4.2 mm to 5.2 mm.

Preferably, the brush bundles of the middle and outer circles lie inside each other (preferably slightly offset inwards) and alternate.

The ratio of the surface area of the small oval brush bundles to the surface area of the large oval brush bundles is from 1:7 to 5:7 preferably from 2:7 to 1:2.

The outer circle preferably comprises identical brush bundles in the form of small ovals. The centers of the small ovals are preferably located on this circle. The small oval brush bundles further preferably have a bevel that slopes downward toward the center The length of the small oval brush bundles is from 2 mm to 3.5 mm preferably from 2.5 mm to 3 mm.

The width of the small oval brush bundles is 0.5 mm to 2 mm preferably from 1 mm to 1.5 mm.

The outer height of the small oval brush bundles is from 5.5 mm to 8.5 mm preferably from 6.5 mm to 7.5 mm. The inner height of the small oval brush bundles is from 4.5 mm to 7.5 mm preferably from 5.5 mm to 6.7 mm.

The surface of the small oval brush bundles is from 2 $mm^2$ to 7 $mm^2$ preferably from 3 $mm^2$ to 4.5 $mm^2$.

The number of small oval brush bundles is from 4 to 11 preferably from 6 to 9.

The radius of the circle on which the brush bundles lie (through the center of the small oval brush bundles) is from 3.5 mm to 6.5 mm preferably from 4.5 mm to 5.5 mm.

In the first preferred embodiment, preferably all elements of the brush field on the brush head comprise cylindrical bristles or brush filaments. In principle, however, all possible filament types are conceivable.

The diameter of the brushes or brush filaments is preferably from 0.075 mm to 0.25 mm and the cross-sectional surface is preferably from 0.002 $mm^2$ to 0.2 $mm^2$.

Preferably, the brushes or the brush bundles descend towards the center of the brush head, wherein the difference between the highest and the lowest point is from 1 mm to 4 mm preferably from 2 mm to 3 mm.

In this embodiment, two forms of brush bundles are preferably used, namely triangular brush bundles and diamond-shaped brush bundles, which are each arranged on circular rings.

In this context, the innermost circle preferably comprises identical brush bundles, in particular diamond-shaped brush bundles (preferably with a roof-shaped end face, wherein the diamond axis forms the ridge). Further preferably, the diamonds are directed with a tip towards the center of the brush head.

The length of the individual diamond-shaped brush bundles is from 3 mm to 6 mm preferably from 4 mm to 5 mm.

The width of the individual diamond-shaped brush bundles is from 0.7 mm to 2.5 mm, preferably from 1.2 mm to 2 mm.

The height of the individual diamond-shaped brush bundles at the corners (the corners inside and the corners outside are preferably arranged at the same height) is from 5 mm to 8 mm preferably from 6 mm to 7 mm.

The height of the individual diamond-shaped brush bundles on the ridge is from 7 mm to 9 mm preferably from 7.5 mm to 8 mm.

The surface area of the individual diamond-shaped brush bundles is from 2 $mm^2$ to 7 $mm^2$ preferably from 5 $mm^2$ to 7 $mm^2$.

The number of brush bundles is from 3 to 12 preferably from 5 to 8. The diameter of the circle on which the brush bundles lie (through the center of the bundle) is from 5.5 mm to 8.5 mm, preferably from 6.5 mm to 7.5 mm.

The length of the gaps between the individual circle segments is from 0.5 mm to 1.4 mm preferably from 0.7 mm to 1.1 mm.

The outer circle preferably comprises identical brush bundles in the form of triangles. One tip of each triangle is directed towards the center of the brush head.

The triangular brush bundles have a straight sloping cut, i.e. the surface slopes towards the center. The triangular brush bundles are preferably smaller than the bristle bundles of the inner circle.

The side length of the triangle base is from 1.5 mm to 4 mm preferably from 2.2 mm to 3.2 mm.

The side length of each of the triangular legs is from 2 mm to 4 mm preferably from 2.5 mm to 3.5 mm.

The outer height of the triangular brush bundles is from 6.5 mm to 9.5 mm preferably from 7.5 mm to 8.5 mm.

The inner height of the triangular brush bundles is from 5 mm to 8 mm preferably from 6 mm to 7 mm.

The surface of the triangular brush bundles is from 1 $mm^2$ to 5.5 $mm^2$ preferably from 3 $mm^2$ to 4.5 $mm^2$.

The number of triangular brush bundles is from 3 to 12 preferably from 5 to 8. The number of triangular brush bundles of the outer circle is preferably equal to the number of brush bundles of the inner circle, since the brush bundles are preferably arranged alternately.

The radius of the circle on which the brush bundles lie (through the center of the bundle) is from 3 mm to 7 mm, preferably from 4 mm to 5.5 mm.

The ratio of the surface area of the small brush bundles to the surface area of the large triangular brush bundles is from 1:5 to 5:7 preferably from 1:3 to 4:7.

In the third preferred embodiment, preferably all elements of the brush field on the brush head comprise cylindrical and pointed bristles or brush filaments. In principle, however, all possible filament types are conceivable.

The diameter of the brushes or brush filaments is preferably from 0.075 mm to 0.25 mm and the cross-sectional surface is preferably from 0.002 $mm^2$ to 0.2 $mm^2$.

Preferably, all brush bundles are of the same height, namely from 5 mm to 9 mm preferably from 6 mm to 8 mm. In an alternative embodiment, the brush bundle heights may lower toward the center of the brush head (i.e., analogous to the above embodiments).

In this embodiment, three forms of brush bundles are preferably used, namely triangular shaped brush bundles, first circular segment shaped brush bundles and second circular segment shaped brush bundles. The brush bundles are preferably arranged on circular rings.

The innermost circle preferably comprises identical brush bundles of uniform, constant height. In this case, the preferably four triangular brush bundles form a substantially square structure with gaps between them (wherein the gaps form approximately a cross shape). Instead of or in location of the four triangular shaped brush bundles, (third) circular segment shaped brush bundles can also be provided, which are smaller than the first and second circular segment shaped brush bundles.

The side length of the triangle base is from 1.5 mm to 3.5 mm preferably from 1.7 mm to 2.7 mm.

The side length of each of the triangular legs is from 0.8 mm to 2.5 mm preferably from 1.2 mm to 2 mm.

The surface of the triangular brush bundles is from 1 $mm^2$ to 4 $mm^2$ preferably from 2 $mm^2$ to 3 $mm^2$.

The number of triangular brush bundles is from 1 to 8 preferably from 3 to 5.

The diameter (through the center of the bundle) is from 1.5 mm to 4 mm preferably from 2 mm to 3 mm.

The length of the gaps between the triangular bristle bundles ranges from 0.5 mm to 1.5 mm.

The central circle preferably comprises identical brush bundles of uniform, constant height, in the form of first circle segments, which form an interrupted circular ring. The first circular segment brush bundles are smaller than the second circular segment brush bundles of the outer circle.

The width of the first circular segment brush bundles is from 0.3 mm to 1.5 mm preferably from 0.5 mm to 1 mm.

The surface area of the first circular segment brush bundles is from 1.5 $mm^2$ to 5 $mm^2$ preferably from 2 $mm^2$ to 3.5 $mm^2$.

The covered angular area of the first circular segment brush bundles is from 25° to 360° preferably from 50° to 120°.

The number of first circular segment brush bundles is from 2 to 12 preferably from 4 to 8.

The radius of the circular segment brush bundles is from 5.5 mm to 8.5 mm preferably from 6.5 mm to 7.5 mm.

The length of the gap between the first circular segment bristle bundles is from 0.8 mm to 2 mm preferably from 1 mm to 1.5 mm.

The outer circle preferably comprises identical brush bundles of uniform, constant height, in the form of second circle segments, which form an interrupted circular ring. The second circular segment brush bundles are larger than the first circular segment brush bundles of the middle circle.

The width of the second circular segment-shaped brush bundle is from 0.3 mm to 1.5 mm preferably from 0.5 mm to 1 mm (i.e. preferably the same dimensions as for the middle ring).

The surface area of the second circular segment brush bundles is from 2 $mm^2$ to 7 $mm^2$ preferably from 2.5 $mm^2$ to 4 $mm^2$.

The covered angular area of the second circular segment brush bundles is from 25° to 360° preferably from 50° to 120°.

The number of second circular segment brush bundles is from 2 to 12 preferably from 6 to 10.

The diameter (through the center of the brush head) is from 8 mm to 14 mm preferably from 10 mm to 12 mm.

The length of the gap between the second circular segment bristle bundles is from 0.8 mm to 2.4 mm preferably from 1.2 mm to 2 mm.

The ratio of the surface area of the first circular brush bundle to the surface area of the second circular brush bundle is from 1:5 to 4.5:5 preferably from 2:5 to 4:5.

BRIEF DESCRIPTION OF THE DRAWINGS

Further advantageous embodiments of the invention emerge from the following description of exemplary embodiments of the invention with the aid of the schematic drawing. In particular, the drive unit according to the invention, the electric toothbrush handpiece according to the invention, the manufacturing process according to the invention, the attachment brushes according to the invention, and electric toothbrushes according to the invention are described in more detail below with reference to the accompanying drawings by means of embodiment examples.

DETAILED DESCRIPTION

Figure 1:
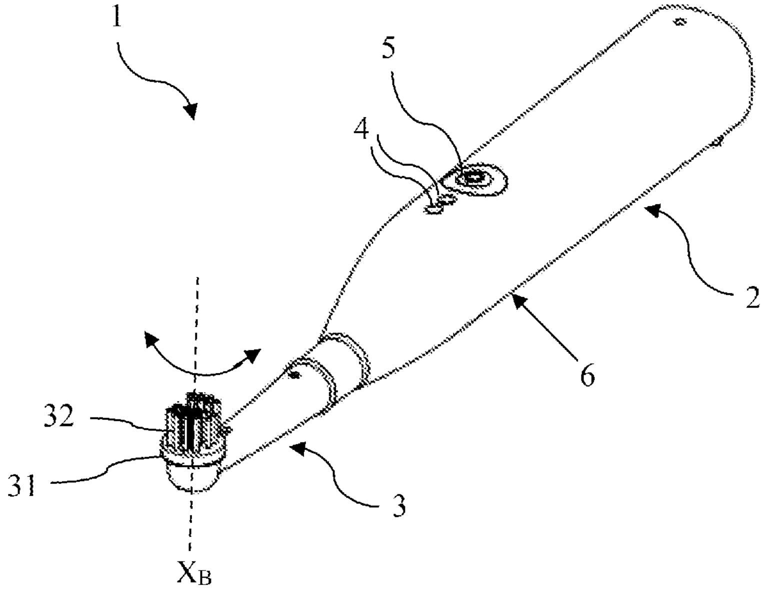
FIG. 1 shows a perspective view of an electric toothbrush or handpiece according to the invention with a mounted attachment brush according to the invention in the front view in accordance with the oscillating variant.

Certain expressions are used in the following description for practical reasons and are not to be understood as limiting. The words "right," "left," "bottom" and "top" denote directions in the drawing to which reference is made. The terms "inward," "outward," "below," "above," "left," "right" or similar are used to describe the arrangement of designated parts relative to one another, the movement of designated parts relative to one another and the directions toward or away from the geometric center of the invention and designated parts thereof as shown in the drawings. This spatial relative information also comprises different positions and orientations from those shown in the drawings. For example, if a part shown in the drawings is reversed, elements or features that are described as "below" are then "above." The terminology comprises the words expressly mentioned above, their derivations and words with similar meanings.

In order to avoid repetitions in the drawings and the associated description of the different aspects and embodiments, certain features are to be understood as common for different aspects and embodiments. The omission of an aspect in the description or a drawing does not suggest that this aspect is missing in the associated embodiment. Rather, such omissions are made for the sake of clarity and to avoid repetition. In this connection, the following stipulations apply to the entire remainder of the description: If, for purposes of clarity in the drawing, a figure contains reference signs, but these are not mentioned in the text of the description relating directly thereto, reference is made to their explanation in preceding figure description. If reference signs are also mentioned in the text of the description relating directly to a figure that are not included in the corresponding figure, reference is made to the preceding and following figures. Similar reference signs in two or more drawings represent similar or identical elements.

FIGS. 1 to 17 illustrate an electric toothbrush 1 in accordance with the present invention for, in particular, the oscillating version.

The electric toothbrush 1 shown in FIG. 1 comprises an electric toothbrush handpiece 2 and an attachment brush 3 attached thereon. The electric toothbrush handpiece 1 comprises an on/off switch 5 and signal elements 4, such as LED lights. The attachment brush 3 comprises a brush head 31 with a plurality of bristle bundles 32 arranged thereon, which together form the brush field. The brush head 31 is designed round here for the oscillating variant. In the oscillating version, the brush head 31 is designed to perform a periodic back-and-forth rotary movement about the brush head axis $X_B$ (cf. double arrow). The attachment brush 3 is permanently mounted opposite the electric toothbrush handpiece.

Figure 2:
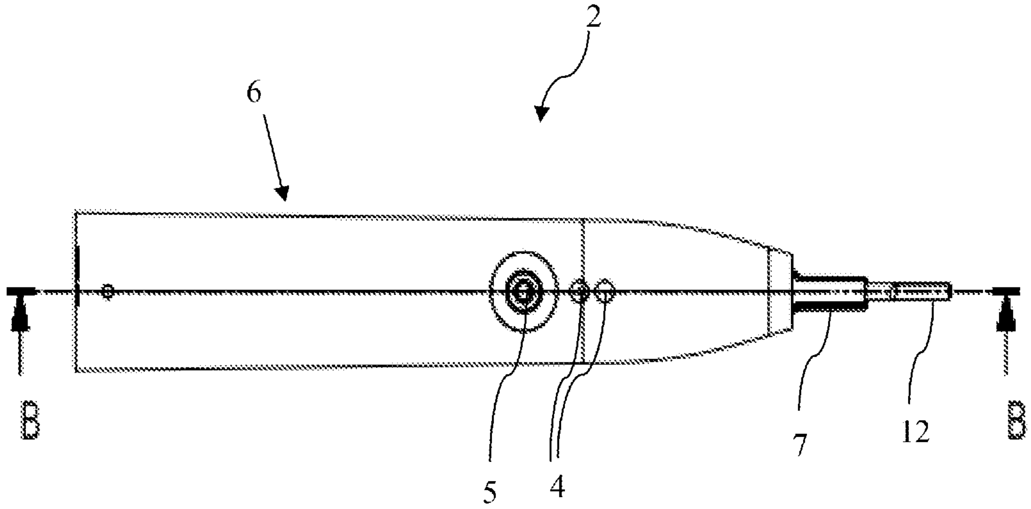
FIG. 2 shows a top view of the handpiece in accordance with FIG. 1.
Figure 3:
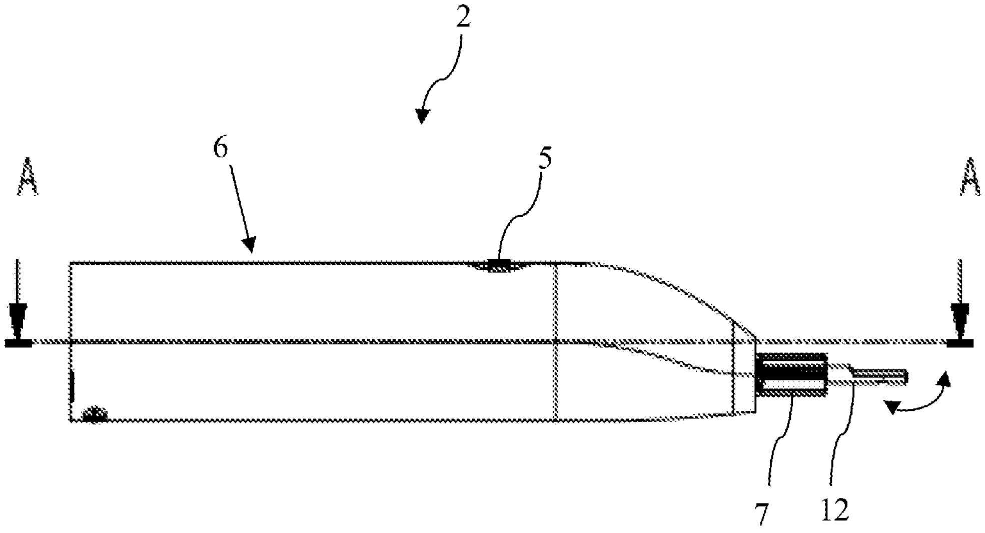
FIG. 3 shows a side view of the handpiece in accordance with FIG. 1.
Figure 4:
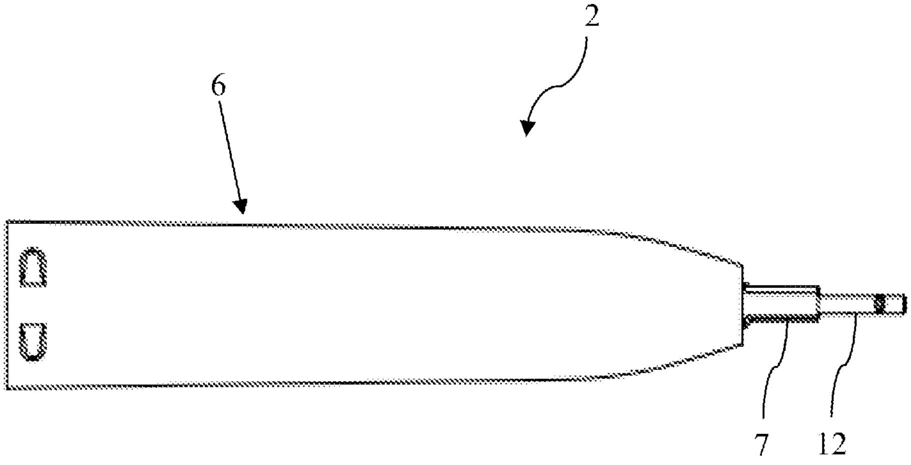
FIG. 4 shows a bottom view of the handpiece in accordance with FIG. 1.

FIGS. 2 to 4 show the associated electric toothbrush handpiece 2 without attachment brush 3 from above, from the side and from below. A key element 7 is attached to the front end of the electric toothbrush handpiece 1, which serves as an interface or coupling structure for the attachment brush 3.

In this case, the attachment brush 3 is arranged fixed relative to the handpiece 2 and fixed relative to the drive shaft 12. From its basic position shown in FIG. 3, the drive shaft 12 performs a periodic back-and-forth pivoting movement (cf. double arrow), which can be converted, if necessary, by a corresponding conversion unit in the corresponding attachment brush into the aforementioned back-and-forth rotary movement for the brush head of an oscillating attachment brush.

Figure 5:
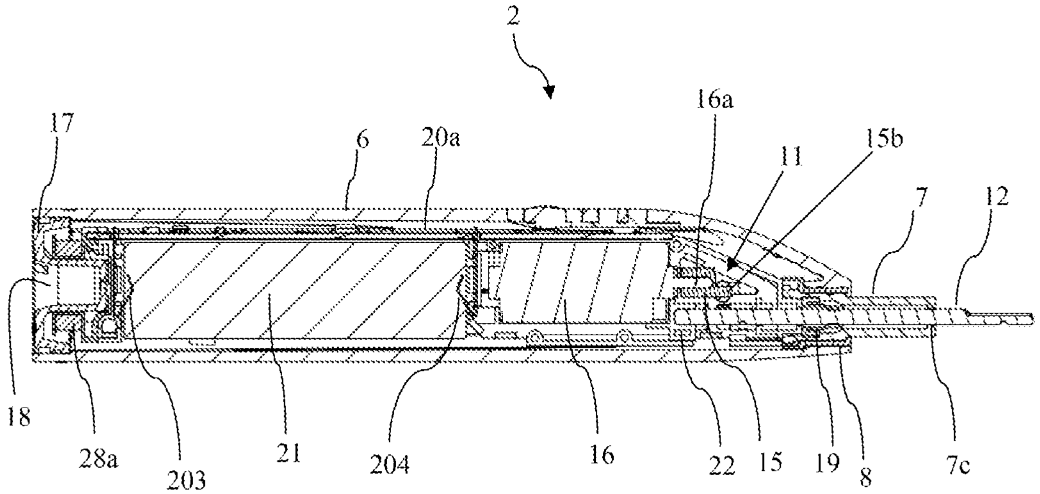
FIG. 5 shows a longitudinal section along the line B-B in FIG. 2.

FIG. 5 shows a longitudinal section of the electric toothbrush handpiece 2 along the line B-B in FIG. 2. This initially comprises the housing 6 and, at its rear end, a housing cover 17 which closes off the housing 6. The housing cover 17 has an opening 18 in the form of a blind hole for inserting a ferrite core of a corresponding charging apparatus. In this respect, a charging coil 28*a* arranged on a coil carrier surrounds the opening 18.

The key element 7 protrudes from the front end of the housing 6, which is mounted with its rear end area inside the housing 6. A sealing/damping element 8 is slipped over the key element 7, which provides a seal between the key element 7 and the housing 6 as well as a damped bearing of the key element 7 within the housing 6. Further, this provides some damped bearing of the frame unit, of which the first half-shell-like half 20*a* is seen here, in the housing.

Also arranged in the front area of the housing 6 is the gear unit 11, which drives the drive shaft 12. The drive shaft 12 is supported at its rear end in a first bearing device 22 and in the area of its front end in a second bearing device 7*c*, which is formed by the front end of the key element 7. The relatively widely spaced bearing devices 22 and 7*c* can ensure particularly smooth and stable running of the drive shaft 12.

In the key element 7, i.e. in the recess 7*d* of the key element 7, a bellows seal 19 is arranged as a sealing arrangement, which is configured to seal the housing against the drive shaft 12. The bellows seal 19 has a rotationally symmetrical design. An annular element of the bellows seal, which is designed internally, abuts the drive shaft 12. An annular element of the bellows seal, which is designed externally, rests against the key element 7. The position of the bellows seal is secured in the longitudinal direction of the drive shaft 12 once at the front by means of a stop in the key element and once at the rear by means of a stop on the frame unit.

The electric motor 16 is arranged directly behind the gear unit 11 and drives the gear unit 11 by means of its motor shaft 16*a*. An eccentric 15 is attached (directly) to the motor shaft 16*a*. A battery 21 is arranged behind the electric motor 16, which is held clamped between a front spring plate 204 and a rear spring plate 203. In FIG. 5, the spring plates 203, 204 are shown in their unloaded position—it is visible from the illustration of the accumulator 21 by how much the spring plates 203, 204 are bent back to realize the clamping.

Figure 6:
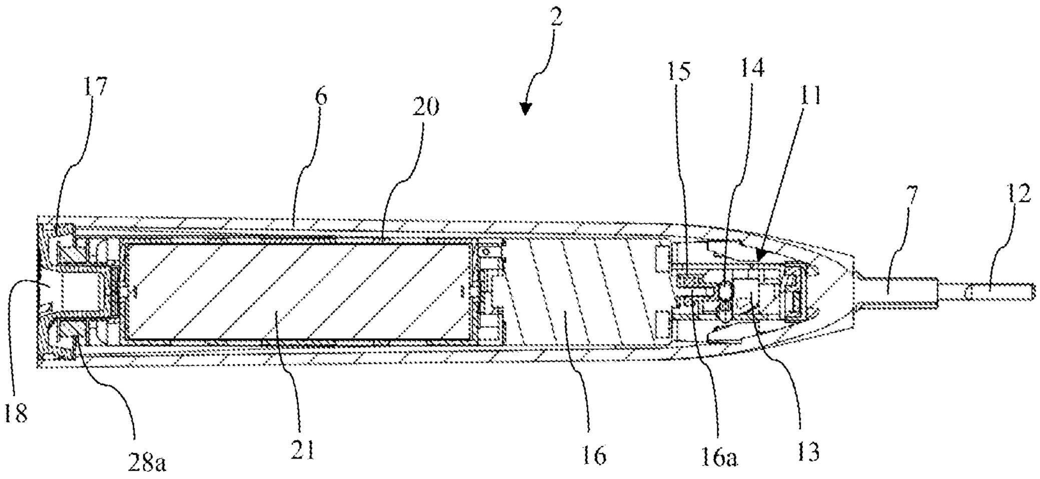
FIG. 6 shows a longitudinal section along the line A-A in FIG. 3.

FIG. 6 illustrates a longitudinal section of the electric toothbrush handpiece 2 along line A-A in FIG. 3. It is possible to see substantially the same components as in FIG. 5, but here the connecting rod 14 attached to the eccentric 15 and to the articulation piece 13 of the drive shaft 12 is clearly visible.

Figure 7:
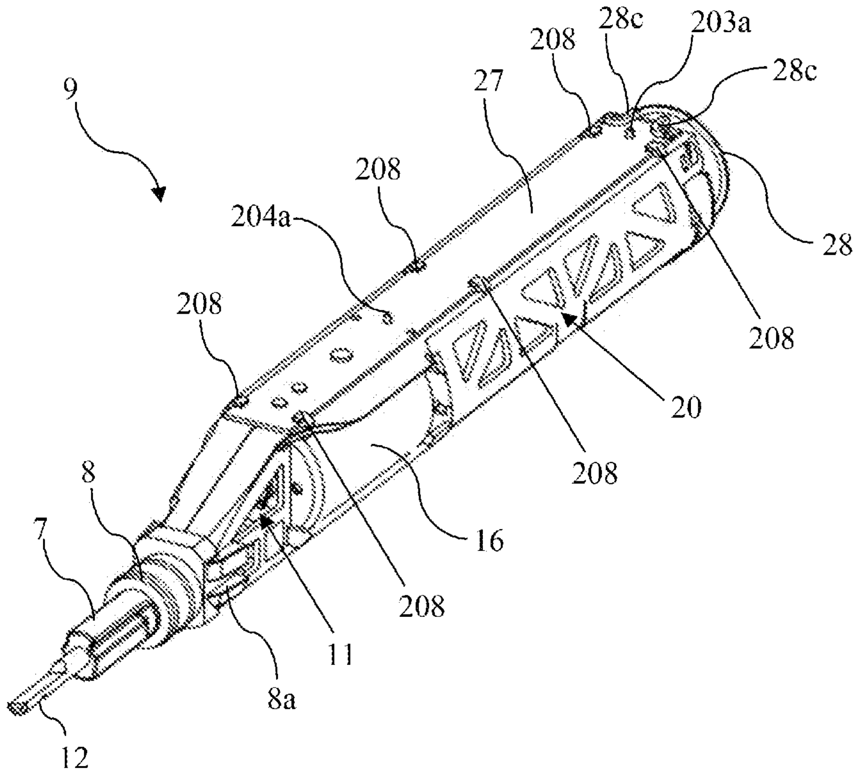
FIG. 7 shows a perspective view of the interior of the handpiece from the front.
Figure 8:
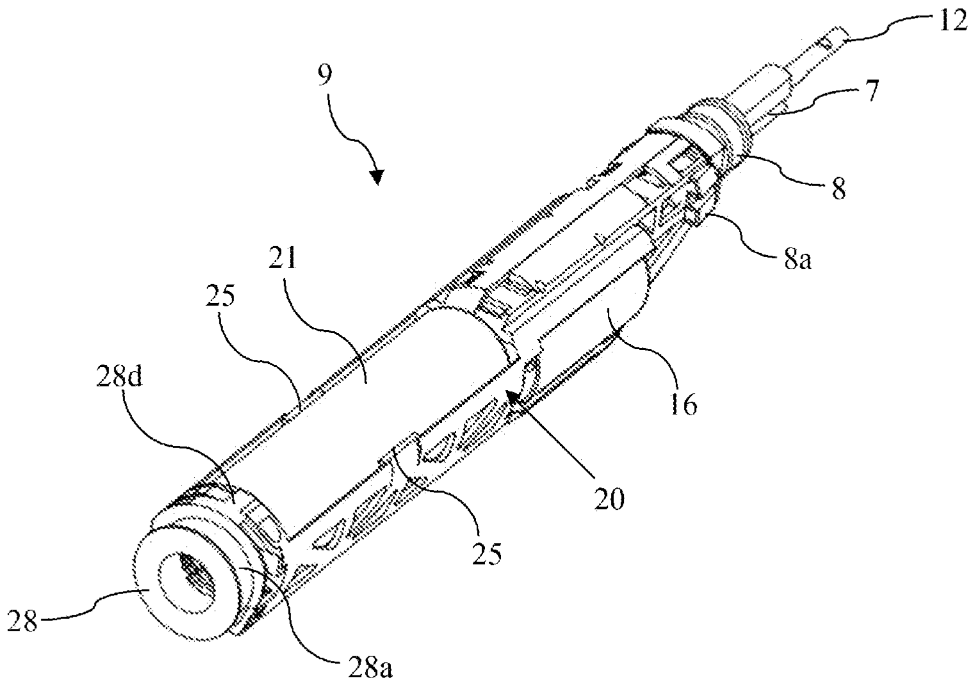
FIG. 8 shows a perspective view of the interior of the handpiece from the rear.

The two views in accordance with FIGS. 7 and 8 substantially show the interior of the handpiece 2 without the housing 6, which in the present assembled form is also referred to as the slide-in unit 9. The frame unit 20 represents a kind of chassis to which all components or parts are fastened to ensure safe and targeted insertion into the housing 6 during final installation.

A print plate 27 is attached on top of the frame unit 20. This has openings through which protrude a first connecting piece 204*b* of the first spring plate 204 and a first connecting piece 203*b* of the rear spring plate 203, which are soldered to the print plate 27. This makes the electrical connection with the electrical conduits on the print plate 27. In addition, the connecting pieces 203*b* and 204*b* serve as orientation aids during the installation of the print plate 27. The print plate is preferably inserted into a recess in the frame unit and held by means of clamping arms 208. The coil carrier 28 can be seen at the rear end of the slide-in unit 9.

The battery 21 is inserted into the frame unit 20 from below, as shown in FIG. 8, and held in place by means of latching apparatuses or preload surfaces 25 and spring plates 203, 204. The electric motor 16 is also received in a form-fit/force-fit manner by the frame unit 20. Two snap elements 201 also protrude from the front of the frame unit, which engage with corresponding latching devices in the key element 7 (here concealed by the sealing/damping element 8). The sealing/damping element 8 has guide rails 8*a* which assist in inserting/positioning the slide-in unit 9 into the handpiece 2 and, if necessary, cooperate with corresponding rails on the inside of the housing 6.

Figure 9:
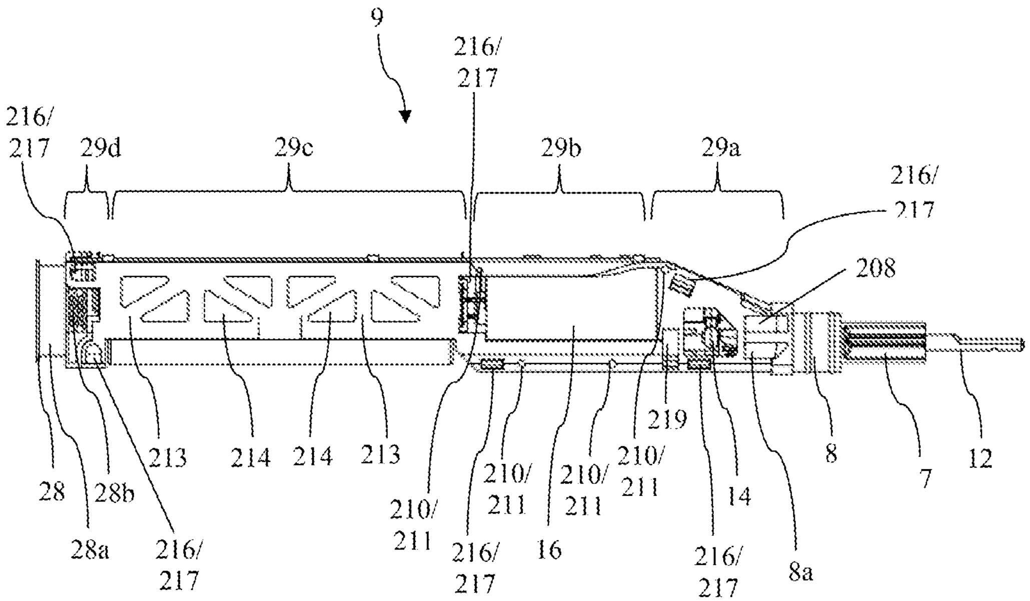
FIG. 9 shows a first side view of the interior of the handpiece in accordance with FIG. 7.
Figure 10:
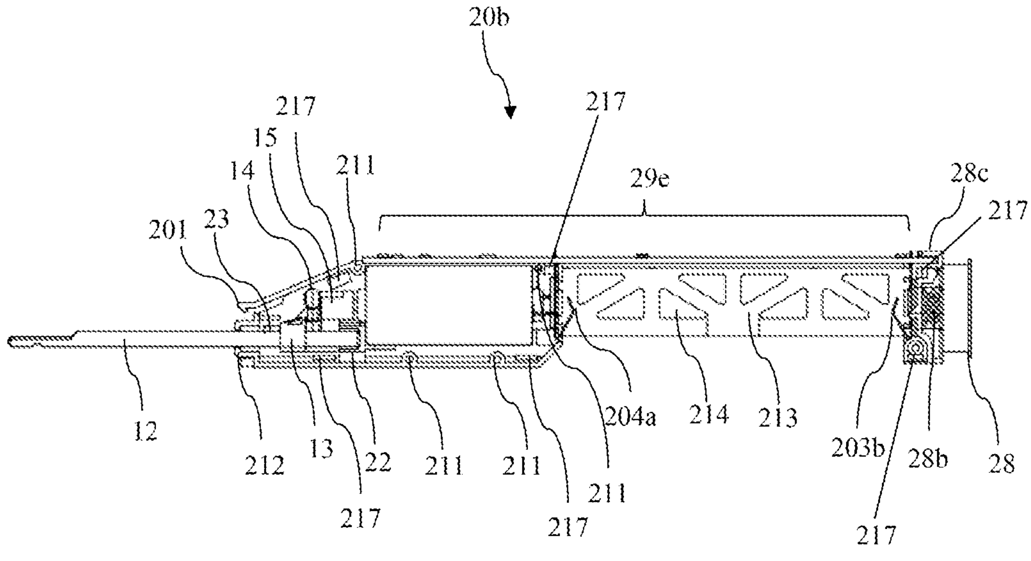
FIG. 10 shows a second side view of the interior of the handpiece in accordance with FIG. 7.

Referring first to FIGS. 9 and 10, it is illustrated that the frame unit 20 is formed from two half-shell-like halves 20*a* and 20*b*. In this respect, in FIG. 9, the slide-in unit 9 is shown from the side and in FIG. 10, the second half-shell-like half 20*b* of the frame unit 20 (the first half-shell-like half 20*a* has been removed) is shown from the side.

The half-shell-like halves 20*a*, 20*b* of the frame unit 20 have multiple zones for the receptacle of interior components. In FIG. 9, viewed from the rear end, one can first see the coil zone 29*d*, the battery zone 29*c*, the motor zone 29*b*, and the gear unit zone 29*a* of the frame unit 20. Both half-shell-like halves of the frame unit 20 have a substantially corresponding configuration or substantially mirrored configuration.

In the coil zone 29*d*, the coil carrier 28 is fitted onto the frame unit 20. The coil carrier 28 comprises a length compensation means 28*b*, which in the installed state resiliently supports the frame unit 20 relative to the housing cover 17. The length compensation means 28*b* is designed in the form of an elastic portion of the coil carrier 28, on which a length compensation between the frame unit 20 and the coil carrier 28 is achieved as well as a floating bearing of the frame unit 20 within the housing 6. In particular, the length compensation means 28*b* can also be designed to be compressible. In addition, the coil carrier 28 comprises upper and lower snap-on means 28*c*, 28*d* (cf. also FIG. 12*b*) with which it (additionally) snaps onto the rear end of the frame unit 20 to ensure an even better hold on the frame unit 20.

Coil zone 29*d* is followed by battery zone 29*c*, which is empty here. In the accumulator zone 29*c*, a plurality of apertures 214 and connecting webs 213 are formed in the side walls of the frame unit, which together form a truss-like structure. In this way, material can be saved on the one hand, and on the other hand the lattice-like structure of the battery zone 29*c* also gives it advantageous flexibility properties, which are decisive approximately for the receptacle as well as the hold of the battery 21. The apertures 214 and the connecting webs 213 are preferably arranged substantially symmetrically with respect to each other.

The battery zone 29*c* is followed by the motor zone 29*b*. The motor zone 29*b* accommodates the electric motor 16. In addition, guide cylinders 210 and corresponding blind holes 211 are arranged in the area of the motor zone 29*b*, which serve in particular to position the two half-shell-like halves 20*a*, 20*b* of the frame unit 20. Furthermore, snapping apparatuses 216 and corresponding snap-in openings 217 are provided in the area of the motor zone 29*b*, which ensure that the two half-shell-like halves 20*a*, 20*b* are held securely after installation. The snapping apparatus 216 and the snap-in openings 217, as well as the guide cylinders 210 and the blind holes 211, are respectively arranged above and below the electric motor 16 on the frame unit 20, preferably substantially evenly distributed to provide optimum guidance and strength characteristics for the frame unit 20. Further, snapping apparatuses 216 and the snap-in openings 217 are arranged in the area of the gear unit zone 29*a* and the coil zone 29*d*. Further, guide cylinders 210 and corresponding blind holes 211 are arranged in the coil zone 29*d*.

The motor zone 29*b* is followed by the gear unit zone 29*a*. The eccentric 15, the connecting rod 14 and the rear part of the drive shaft 12 with the injection-molded articulation piece 13 are arranged in the gear unit zone 29*a*. The rear end of the drive shaft 12 is received in a first bearing device 22, which is preferably designed as a plain bearing. In the side of the articulation piece 13 facing away from the electric motor 16, a tensioning arm 23 is also provided, which presses on the drive shaft 12 to prevent the drive shaft 12 from chattering, if necessary. The gear unit zone 29*a* is terminated at the front by the guide pin 212 of the frame unit 20. Above the guide pin 212 is the snap element 201 for the key element 7. The sealing/damping element 8 (see FIG. 9) is regularly attached to or respectively placed over the key element 7 before it is pushed into the housing.

Figure 11A:
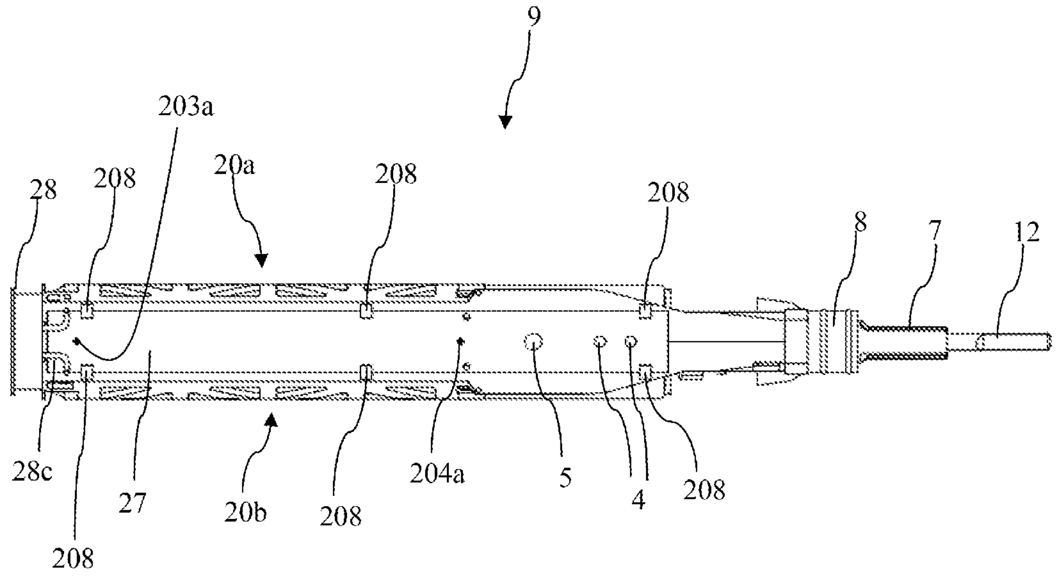
FIG. 11*a* shows a top view of the interior of the handpiece.
Figure 11B:
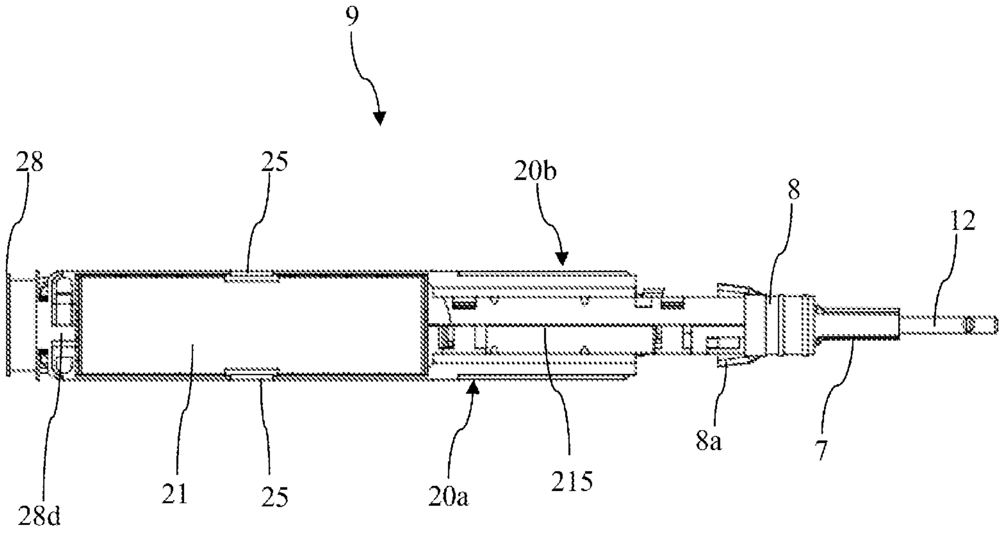
FIG. 11*b* shows a bottom view of the interior of the handpiece.

FIGS. 11*a* and 11*b* are substantially the same as FIGS. 7 and 8 described above. FIG. 11*a* once again illustrates the preferred symmetrical design of the truss structure in the accumulator zone 29*c* on both sides of the frame unit 20. Further, the clamping arms 208 for holding the print plate 27 are clearly visible. FIG. 11*b* shows the lower bump line 215 of the first half-shell-like half 20*a* and the second half-shell-like half 20*b* in the area of the motor zone 29*b* and the gear unit zone 29*a*. Further, the preload surfaces 25 for holding the battery 21 are readily apparent.

Figure 12A:
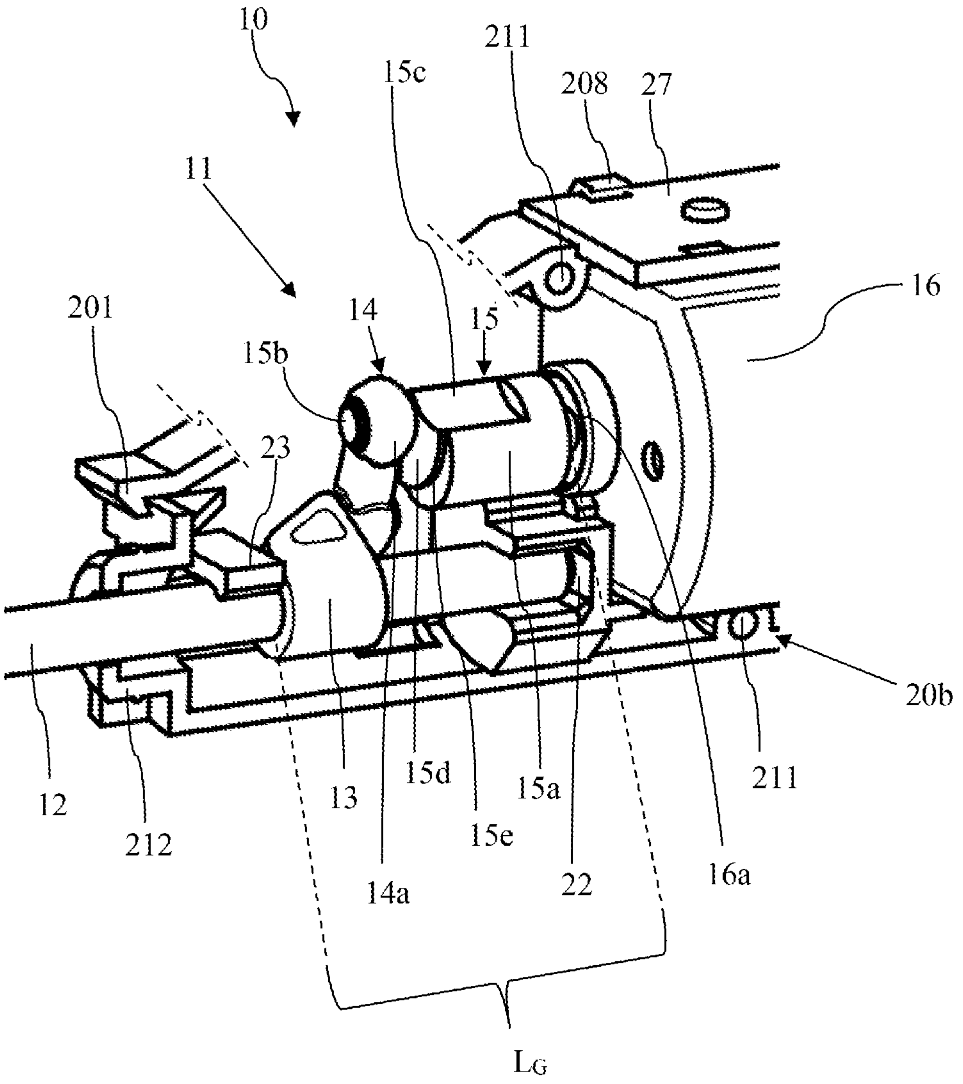
FIG. 12*a* shows a detailed view of the drive unit according to the invention.

FIG. 12*a* shows in particular a detailed view of the drive unit 10 with the gear unit 11 and the motor 16 in accordance with the present invention. The gear unit 11 comprises the drive shaft 12 with the injection-molded articulation piece 13, the connecting rod 14 and the eccentric 15. The main part 15*a* of the eccentric 15 is attached to or pressed onto the motor shaft 16*a* of the electric motor 16 with its rear or motor end. The motor shaft 11*a* and the axis of the main part coincide. The main part 15*a* of the eccentric 15 preferably comprises two recesses 15*c*, of which only one can be seen here. The recesses 15*c* are used to generate an optimized unbalance.

On its face side, the main part 15*a* of the eccentric 15 comprises an offset 15*e* and a corresponding pedestal-like elevation 15*d*. This design of the end face of the eccentric main part 15*a* serves in particular to enable the eccentric 15 and the connecting rod 14 to be operated with as little intermediate space as possible. The offset 15*e* is dimensioned in such a manner that in the movement of the gear unit 11 the eccentric main part 15*a* just passes the lower bearing 14*b* of the connecting rod 14, which cannot be seen here, without touching it. The upper bearing 14*a* of the connecting rod 14 is fitted onto the eccentric pin 15*b*. The bearings 14*a*, 14*b* of the connecting rod 14 are preferably designed as plain bearings directly in the body of the connecting rod 14. The lower bearing 14*b* of the connecting rod 14, which is not shown, is fitted onto an articulation pin 13*a* of the articulation piece 13 corresponding to the eccentric pin 15*b*. This makes it possible to achieve a particularly compact and efficient design of the gear unit 11.

The individual parts of the gear unit 11 are merely fitted into one another with the smallest possible distances and tolerances between them. The rear end of the drive shaft 12 is supported in a first bearing device 22 of the second half-shell-like half 20*b*. In this case, the first bearing device 22 is preferably designed as a plain bearing and is closed off from the second half-shell-like half 20*b* during installation on the first half-shell-like half 20*a* by means of a corresponding cover 219 (cf. FIG. 9). The articulation piece 13 preferably rests on the clamping arm 23 into which the drive shaft 12 is clicked during installation and which presses on the drive shaft 12 from above in order to prevent chattering and enable particularly smooth running. The drive shaft 12 is guided out of the frame unit 20 by the guide pin 212 formed by the two half-shell-like halves 20*a*, 20*b*.

The length $L_G$ of the gear unit 11 from the rear or motor end of the eccentric main part 15*a* to the front end of the fixing of the articulation piece 13 to the drive shaft 12 is from 8 mm to 20 mm preferably from 11 mm to 17 mm.

Figure 12B:
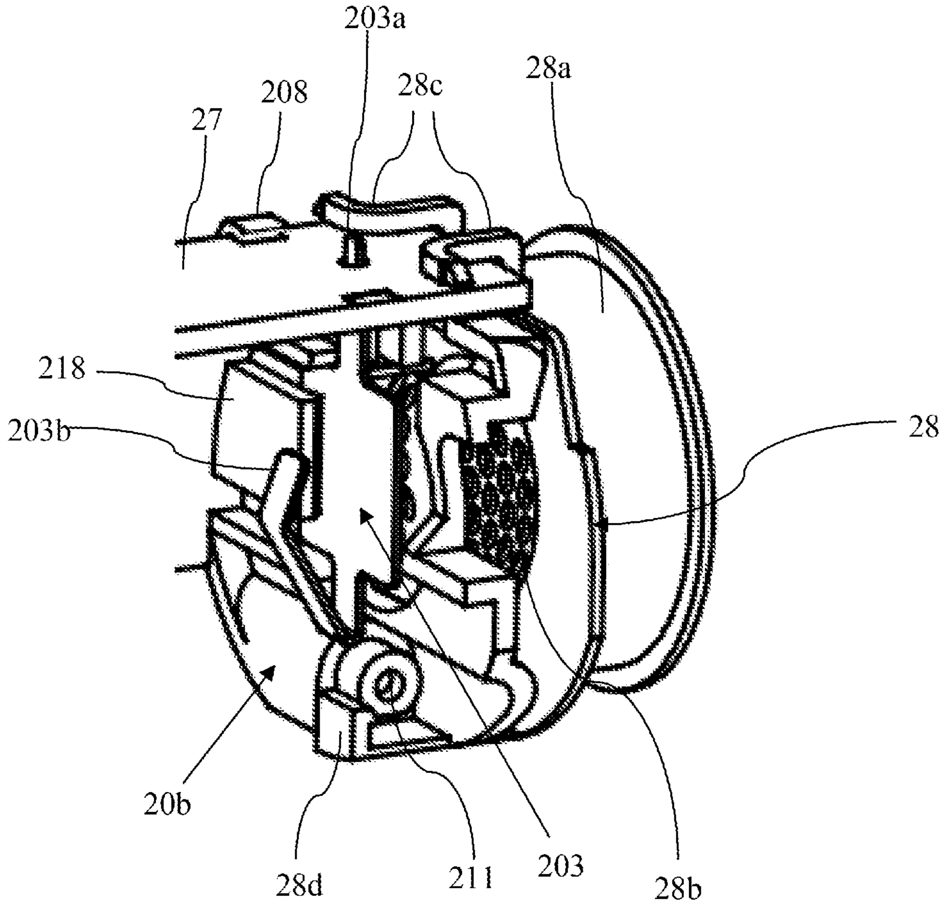
FIG. 12*b* shows a detailed view of the rear end of the frame unit with the coil carrier attached.

FIG. 12*b* illustrates a detailed view of the arrangement of the coil carrier 28 at the rear end of the frame unit 20. The charging coil 28*a* is initially wound onto the coil carrier 28. The coil carrier 28 comprises upper snap-on means 28*c* and lower snap-on means 28*d* with which a secure hold on the frame unit 20 and the print plate 27, respectively, is achieved. The upper snap-on means 28*c* is designed in the form of two outwardly bent flex arms which snap onto the print plate 27, and the lower snap-on means 28*d* is designed in the form of a latching hook which here engages behind one of the blind holes 211 on the second half-shell-like half 20*b*.

The coil carrier 28 further comprises a length compensating means 28*b* in the form of an elastically configured portion which extends in the direction of the rear spring plate 203 but does not contact it. A web 221 of the frame unit is regularly provided between the rear spring plate 203 and the elastic portion of the coil carrier. The elastic portion or length compensation means 28*b* thus supports the frame unit 20 relative to the housing cover 17 (cf. FIG. 5) and provides length compensation as well as floating bearing of the frame unit 20 within the housing.

The rear spring piece 203 is inserted into a corresponding lateral receptacle of the second half-shell-like half 20*b* and is clamped in position by a retaining arm 218 of the second half-shell-like half 20*b*. The first half-shell-like half 20*a* has a corresponding configuration for receiving the rear spring plate 203. The installation of the front spring plate 204 behind the motor zone 29*b* is carried out in an analogous manner (cf. approximately FIG. 10).

FIGS. 13 and 14 once again illustrate all the essential components of the interior or of a slide-in unit 9 for an electric toothbrush handpiece 2, in each case in an exploded view from above and an exploded view from below.

Figure 13:
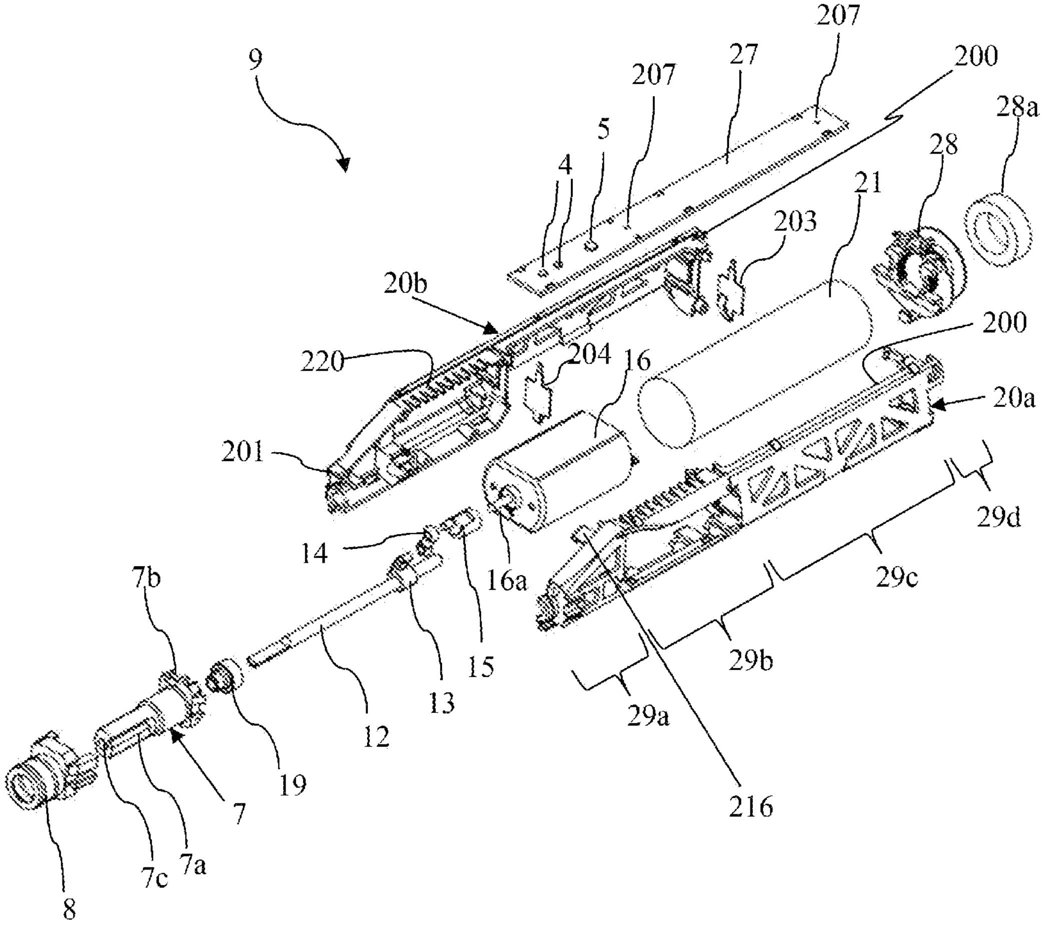
FIG. 13 shows an exploded view of the interior of the handpiece from above.
Figure 14:
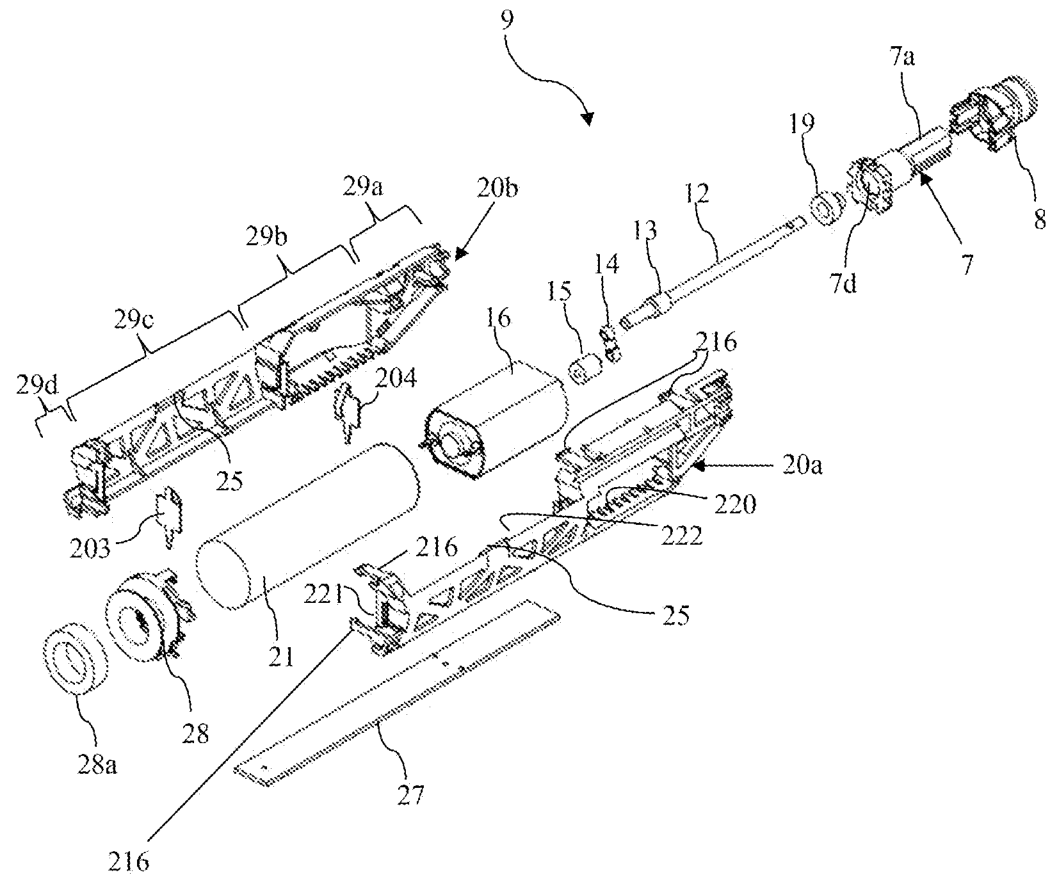
FIG. 14 shows an exploded view of the interior of the handpiece from below.

FIGS. 13 and 14 (also in conjunction with the previous FIGS. 5 to 12*b*) clearly illustrate the installation of the slide-in unit 9 for the electric toothbrush handpiece 2.

First, the second half-shell-like half 20*b* of the frame unit 20 is laid out. Now the drive unit 10 is assembled with the electric motor 16 and the gear unit 11, wherein the electric motor 16 is connected to the gear unit 11 and the electric motor 16 is positioned in the motor zone 29*b* and the gear unit 11 is positioned in a gear unit zone 29*a* of the second half-shell-like half 20*b* and locked there. Here, the eccentric 15 is pressed onto a motor shaft 16*a* of the electric motor 16 and the connecting rod 14 is pushed onto the eccentric 15 or eccentric pin 15*b* and onto the articulation piece 13 or articulation pin 13*a* injection-molded onto the drive shaft 12 (see also FIGS. 15 and 17). The drive shaft 12 thereby engages with the clamping arm 23 and is supported in the first bearing device 22.

Now, the rear spring plate 203 and the front spring plate 204 are inserted from the side into corresponding receptacles of the second half-shell-like half 20*b*, wherein the rear and front spring plates 203, 204 are preferably each held in position by retaining arms 218.

Now the print plate 27 is mounted in the print zone 29*e* of the second half-shell-like half 20*b*, wherein in each case at least a first connecting piece 203*a* of the rear spring plate 203 and a first connecting piece 204*a* of the front spring plate 204 are guided through corresponding recesses 207 in the print plate 27, and the print plate 27 is preferably received in a (double-sided) recess 200 of the print zone 29*e* and locked there if necessary. Support struts 220 are provided on both sides of the upper side of the motor zone 29*b* to support the print plate 27 in the front area, where in particular the on/off switch 5 is arranged. In this way, the pressure exerted by a user on the on/off switch 5 can be better absorbed. The support struts 220 form a kind of bottom of the recess 200 for the print plate 27. Regularly, no support struts 220 are provided in the accumulator zone 29*c*. However, corresponding designs would be conceivable in principle.

Subsequently, the first half-shell-like half 20*a* is installed on the second half-shell-like half 20*b*, wherein the two half-shell-like halves of the frame unit 20 are preferably inserted and/or clicked into each other at several locations (cf. in this respect the guide cylinders 210 and the corresponding blind holes 211 as well as the snapping apparatuses 216 and the corresponding snap-in openings 217 in FIGS. 9 and 10).

Now the key element 7 is installed on the assembled frame unit 20, wherein the key element 7 is slid on over the drive shaft 12 and preferably latches with the snap elements 201 of the frame unit 20. Before this, however, a bellows seal 19 (particularly preferred for the oscillating variant) is usually inserted into the inner geometry area 7*d* of the key element 7. Subsequently, the sealing/damping element 8 is still mounted on the frame unit 20, wherein the sealing/damping element 8 is slid over the key element 7 and preferably snaps onto the frame unit 20 at the front.

Then, the coil carrier 28 with a charging coil 28*a* is mounted to the assembled frame unit 20, wherein the coil carrier 28 is plugged or snapped onto the rear end area of the frame unit 20 (cf. FIG. 12*b*).

Subsequently, the necessary electrical connections are usually made (not shown here), wherein wires are usually run from the print plate 27 to the electric motor 16 (or vice versa) and the first connectors 203*a*, 204*a* of the rear and front spring plates 203, 204 as well as the ends of the cables of the charging coil 28*a* are soldered to the print plate 27.

Finally, the battery 21 is inserted from below through an opening 222 into the battery zone 29*c* of the assembled frame unit 20, where it is received in a clamped manner between the spring piece 203*b* of the rear spring element 203 and the spring piece 204*b* of the front spring element 204 and, if necessary, is additionally held by the lateral preload surfaces 25.

Finally, the fully assembled frame unit 20 is inserted into the housing 6 of the handpiece 2 as a slide-in unit 9 and, if necessary, the housing cover 17 is also attached. The insertion of the frame unit 20 into the housing 6 of the handpiece 2 is regularly supported by insertion aids, preferably by insertion ribs/rails, which are arranged laterally on the frame unit 20 or on the sealing/damping element 8 and/or laterally on the inner wall of the housing 6. The sealing/damping element 8 comprises, in particular, two guide rails 8*a* on each side, which assist in inserting/positioning the interior of the handpiece 2 and, if necessary, cooperate with corresponding rails of the housing.

Figure 15:
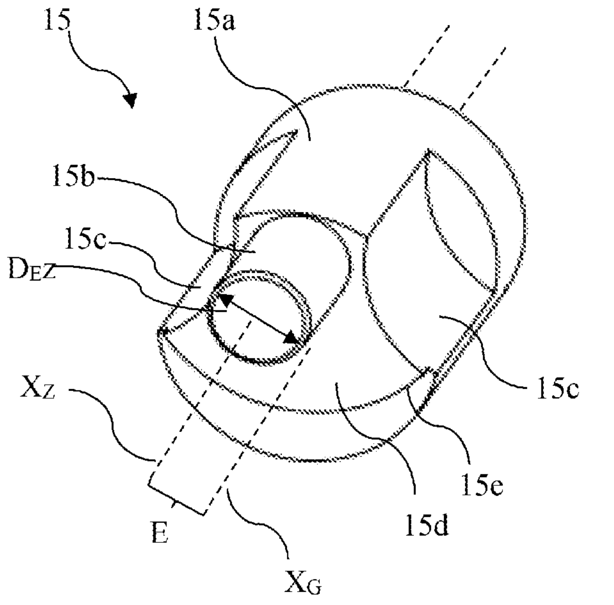
FIG. 15 shows a perspective view of an eccentric from a gear unit according to the invention.

FIG. 15 now shows a single view of an eccentric 15 for the gear unit 11 of the electric toothbrush handpiece 2. The design is basically the same for the oscillating variant and the sonic variant, only the dimensioning of the individual components may differ.

The eccentric 15 comprises a cylindrical main part 15*a*, on which—offset parallel to the main part axis $X_G$—a cylindrical eccentric pin 15*b* with an eccentric pin axis $X_Z$ is arranged. The distance from the main part axis $X_G$ to the eccentric pin axis $X_Z$ forms the eccentricity E. The eccentricity E is between 0.2 mm and 3 mm and preferably between 0.3 mm and 2 mm. For the oscillating variant, the eccentricity E is particularly preferably between 1.4 mm and 2 mm, whereas the eccentricity for the sonic variant is particularly preferably between 0.3 mm and 1 mm.

Lateral recesses 15*c* are made or milled in the main part 15*a* of the eccentric 15. The recesses 15*c* are configured in such a manner, here in the form of two lateral milled recesses, that in operation the center of mass of the eccentric 15 lies on the axis of the motor shaft 16*a* of the electric motor 16 (which coincides with the main body axis), to which the eccentric 15 is attached. The eccentric 15 therefore has an improved design with a correspondingly optimized unbalance.

On its face side, the eccentric main part 15*a* also has an offset 15*e* and a corresponding pedestal-like elevation 15*d*. This ultimately allows the eccentric 15 to be arranged closer to a corresponding connecting rod of the gear unit, resulting in a particularly compact design of the gear unit. The eccentric pin 15*b* is arranged on the pedestal-like elevation 15*d*.

The main part 15*a* of the eccentric 15 has a length (from the pedestal-like elevation to its rear end) of from 4 mm to 9 mm preferably from 5.5 mm to 7.5 mm and a diameter (excluding the recesses) of from 3 mm to 8 mm preferably from 4.5 mm to 6.5 mm.

The eccentric pin 15*b* of the eccentric 15 has a length of from 1 mm to 6 mm preferably from 2 mm to 4 mm and a diameter $D_Z$ of from 1 mm to 4 mm preferably from 1.5 mm to 2.5 mm.

Figure 16:
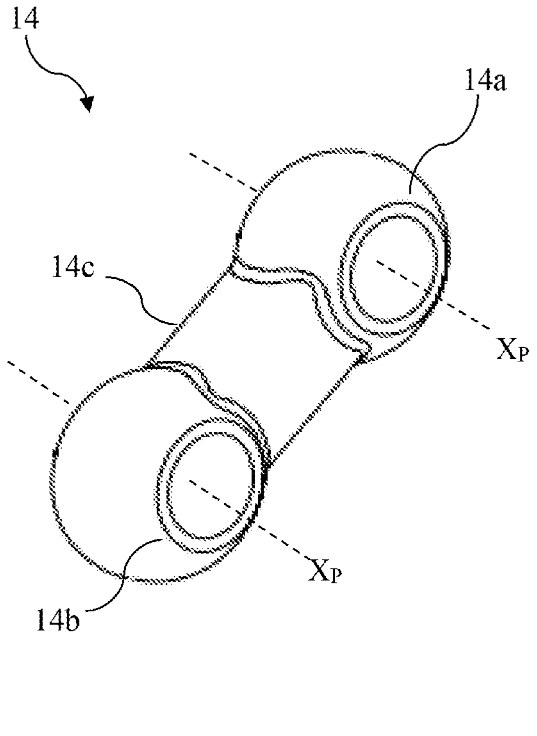
FIG. 16 shows a perspective view of a connecting rod from a gear unit according to the invention.

FIG. 16 illustrates a connecting rod 14 for the gear unit 11 of a drive for an electric toothbrush handpiece 2. The design is basically the same for the oscillating variant and the sonic variant.

The connecting rod 14 comprises two bearings 14*a* and 14*b*, which are connected by a rod element 14*c*. The bearings 14*a* and 14*b* each have a bearing axis $X_P$ and preferably the same (inner and outer) diameter.

The length of the connecting rod 14 (from bearing axis to bearing axis) is from 3 mm to 8 mm preferably from 4.5 mm to 6.5 mm.

The thickness of the connecting rod 14 (in the direction of the bearing axes) is from 1 mm to 5 mm preferably from 1.5 mm to 3.5 mm.

The width of the connecting rod (perpendicular to the bearing axes) is from 1.5 mm to 6.5 mm preferably from 3 mm to 5 mm.

The rod element 14*c* may have a slightly smaller thickness and width than the bearings 14 and 14*b*, resulting in a bone-like shape for the connecting rod 14.

Figure 17:
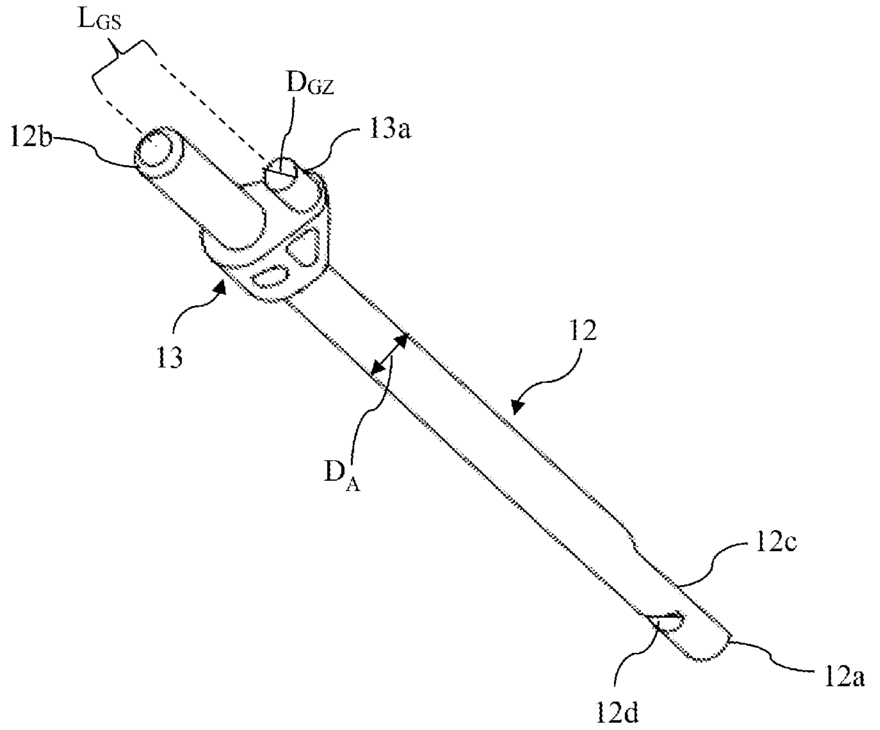
FIG. 17 shows a perspective view of an articulation piece with articulation cylinder from a gear unit according to the invention.

FIG. 17 illustrates a drive shaft 12 with an injection-molded articulation piece 13 for the gear unit 11 of an electric toothbrush handpiece 2. The design is basically the same for the oscillating variant and the sonic variant.

The drive shaft 12 comprises a front end 12*a* and a rear end 12*b*. At the front end 12*a*, the drive shaft has a flattening 12*c* and a notch 12*d*. The flattening 12*c* and the indentation 12*d* are regularly used for connection to or fixing on a corresponding shaft portion of a conversion unit of an oscillating attachment brush 3.

The articulation piece 13 molded onto the drive shaft 12 preferably completely encloses the drive shaft 12 and has an articulation pin 13 which has a diameter $D_{GZ}$ which preferably corresponds to the diameter $D_{EZ}$ of the eccentric pin (i.e. in both the sonic and oscillating variants).

The articulation piece 13 has a length $L_{GS}$ (from "bearing center" to "bearing center") of from 2 mm to 6 mm preferably from 3.5 mm to 4.5 mm.

The drive shaft 12 has a diameter $D_A$ of 1.5 mm to 4.5 mm preferably of 2.5 mm to 3.5 mm. In the area of the flattening 12*c*, these values can be correspondingly smaller, or the diameter is to be understood as the diameter continuation of the non-flattened parts.

FIGS. 18 to 25 illustrate an electric toothbrush 1 in accordance with the present invention for, in particular, the sonic variant.

Figure 18:
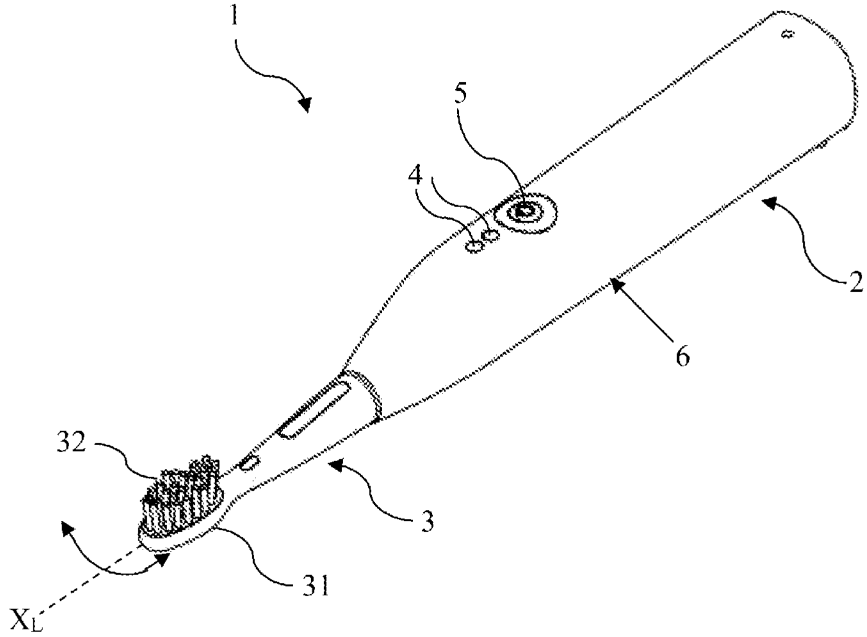
FIG. 18 shows a perspective view of an electric toothbrush or a handpiece according to the invention with a mounted attachment brush according to the invention in the front view in accordance with the sonic variant.

The electric toothbrush 1 shown in FIG. 18 comprises an electric toothbrush handpiece 2 and an attachment brush 3 attached thereon. The electric toothbrush handpiece 1 comprises an on/off switch 5 and signal elements 4, such as LED lights. The attachment brush 3 comprises a brush head 31 with a plurality of bristle bundles 32 arranged thereon, which together form the brush field. The brush head 31 is substantially oval in design here. In the sonic variant, the brush head 31 is designed to perform a periodic back-and-forth swinging movement around the longitudinal axis of the attachment brush $X_L$ (cf. double arrow). Here, the entire attachment brush 3 moves, i.e., the attachment brush 3 is not mounted in a secured position relative to the electric toothbrush handpiece 2.

Figure 19:
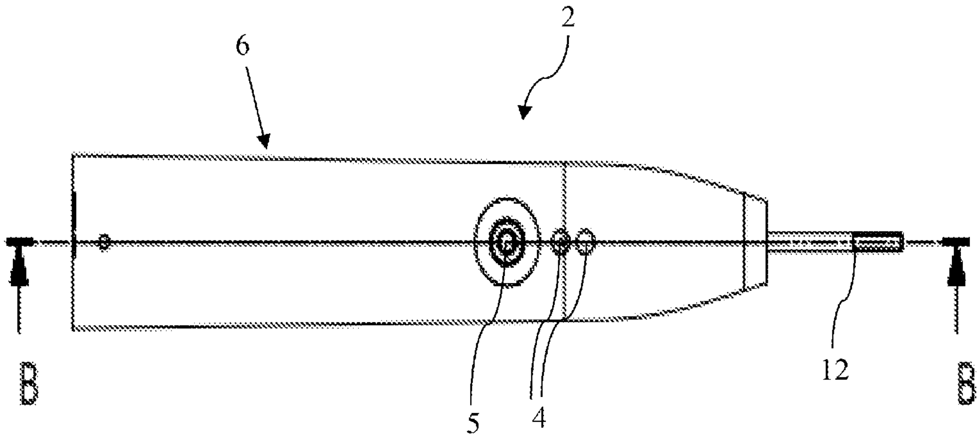
FIG. 19 shows a top view of the handpiece in accordance with FIG. 18.
Figure 20:
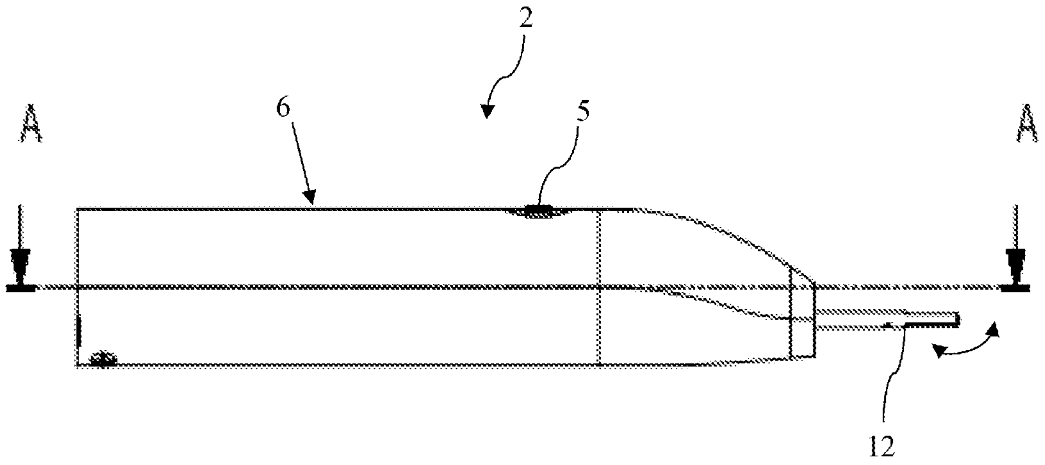
FIG. 20 shows a side view of the handpiece in accordance with FIG. 18.

FIGS. 18 to 20 show the associated electric toothbrush handpiece 2 without attachment brush 3 from above, from the side and from below. No key element 7 can be seen at the front end of the electric toothbrush handpiece 2, since the sonic variant does not require a coupling structure of this type for the attachment brush 3. The attachment brush 3 is secured here by the geometry of the drive shaft 12 together with a corresponding inner geometry of the attachment brush 3. Here, too, the drive shaft 12 performs a periodic back-and-forth pivoting movement from its basic position shown in FIG. 20 (cf. double arrow), which can be transmitted directly to a corresponding (sonic) attachment brush 3.

Figure 21:
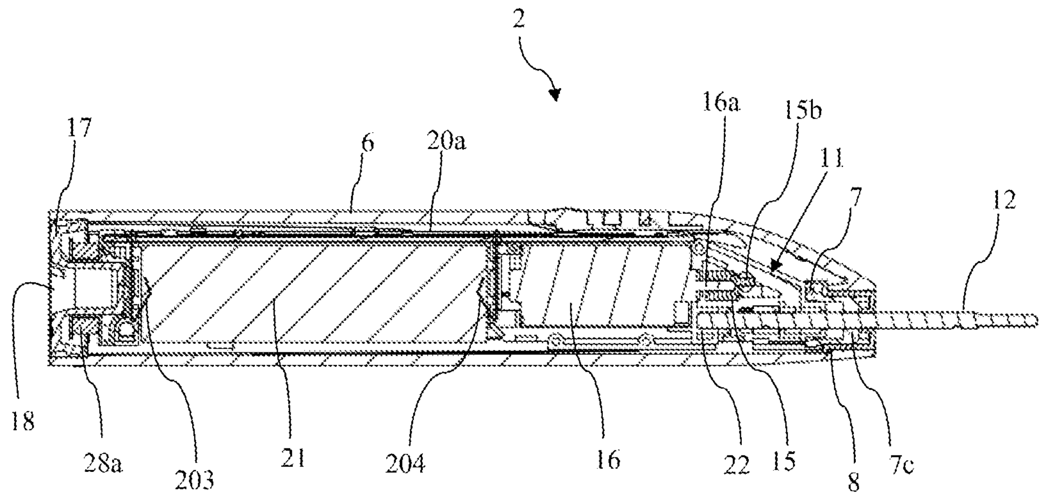
FIG. 21 shows a longitudinal section along the line B-B in FIG. 19.

FIG. 21 shows a longitudinal section of the electric toothbrush handpiece 2 along the line B-B in FIG. 19. This initially comprises the housing 6 and, at its rear end, a housing cover 17 which closes off the housing 6. The housing cover 17 has an opening 18 in the form of a blind hole for inserting a ferrite core of a corresponding charging apparatus. In this respect, a charging coil 28*a* arranged on a coil carrier surrounds the opening 18.

The front end area of the housing 6 supports the key element 7, which here has no key geometry projecting outward, as explained above. However, a sealing/damping element 8 is again slipped over the key element 7, which provides a seal between the key element 7 and the housing 6 as well as a damped bearing of the key element 7 within the housing 6. Further, the sealing/damping element 8 seals against the drive shaft 12 and provides a certain amount of damped bearing of the frame unit 20 in the housing.

Also arranged in the front area of the housing 6 is the gear unit 11, which drives the drive shaft 12. The drive shaft 12 is supported at its rear end in a first bearing device 22 and in the area of its front end in a second bearing device 7*c*, which is formed by the key element 7. The bearing devices 22 and 7*c*, which are still relatively far apart in this case, can ensure particularly smooth and stable running of the drive shaft 12.

The electric motor 16 is arranged directly behind the gear unit 11 and drives the gear unit 11 by means of its motor shaft 16*a*. An eccentric 15 is attached to the motor shaft 16*a*. A battery 21 is arranged behind the electric motor 16, which is held clamped between a front spring plate 204 and a rear spring plate 203. In FIG. 21, the spring plates 203, 204 are shown in their unloaded position—it is visible from the illustration of the accumulator 21 by how much the spring plates 203, 204 are bent back to realize the clamping.

Figure 22:
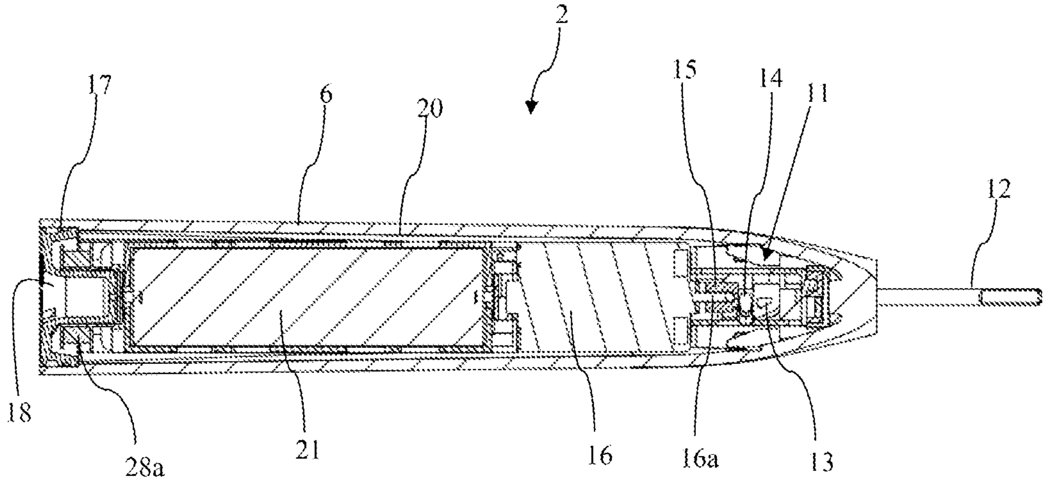
FIG. 22 shows a longitudinal section along the line A-A in FIG. 20.

FIG. 22 illustrates a longitudinal section on the electric toothbrush handpiece 2 along the line B-B in FIG. 2. It is possible to see substantially the same components as in FIG. 21, but here the connecting rod 14 attached to the eccentric 15 and to the articulation piece 13 of the drive shaft 12 is clearly visible.

Figure 23:
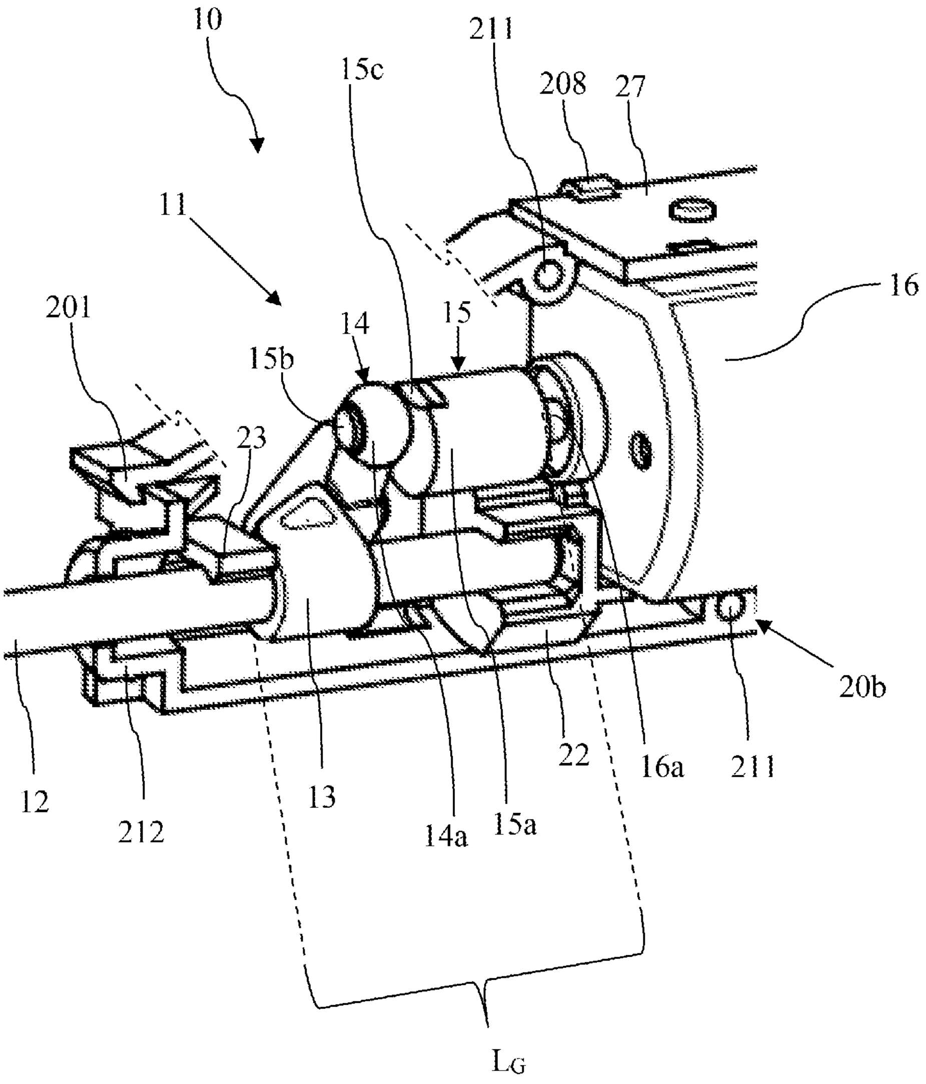
FIG. 23 shows a detailed view of a gear unit according to the invention.

FIG. 23 shows in particular a detailed view of the drive unit 10 with the gear unit 11 and the motor 16 in accordance with the present invention. The gear unit 11 comprises the drive shaft 12 with the injection-molded articulation piece 13, the connecting rod 14 and the eccentric 15. The main part 15*a* of the eccentric 15 is attached to or pressed onto the motor shaft 16*a* of the electric motor 16 with its rear or motor end. The motor shaft 16*a* and the axis of the main part coincide. The main part 15*a* of the eccentric 15 preferably comprises two recesses 15*c*, of which only one can be seen here. The recesses 15*c* again serve to generate an optimized unbalance and are usually somewhat smaller in the sonic variant than in the oscillating variant (where the eccentricity is also usually larger, see FIG. 12*a*).

The upper bearing 14*a* of the connecting rod 14 is fitted onto the eccentric pin 15*b*. The bearings 14*a*, 14*b* of the connecting rod 14 are preferably designed as plain bearings directly in the body of the connecting rod 14. The lower bearing 14*b* of the connecting rod 14, which is not shown, is fitted onto an articulation pin 13*a* of the articulation piece 13 corresponding to the eccentric pin 15*b*. This makes it possible to achieve a particularly compact and efficient design of the gear unit.

The individual parts of the gear unit are again merely plugged into one another with the smallest possible distances and tolerances between them. The rear end of the drive shaft 12 is supported in a first bearing device 22 of the second half-shell-like half 20*b*. The first bearing device 22 is preferably designed as a plain bearing and is closed by the first half-shell-like half 20*a* during installation on the second half-shell-like half 20*b* by means of a corresponding cover 219 (cf. analogously FIG. 9 of the oscillating variant). The articulation piece 13 preferably rests on the clamping arm 23 into which a drive shaft 12 is clicked during installation and which presses on the drive shaft 12 from above in order to prevent chattering and enable particularly smooth running. The drive shaft 12 is guided out of the frame unit 20 by the guide pin 212 formed by the two half-shell-like halves 20*a*, 20*b*.

The length $L_G$ of the gear unit 11 from the rear or motor end of the eccentric main part 15*a* to the front end of the fixing of the articulation piece 13 to the drive shaft 12 is from 8 mm to 20 mm preferably from 11 mm to 17 mm.

Figure 24:
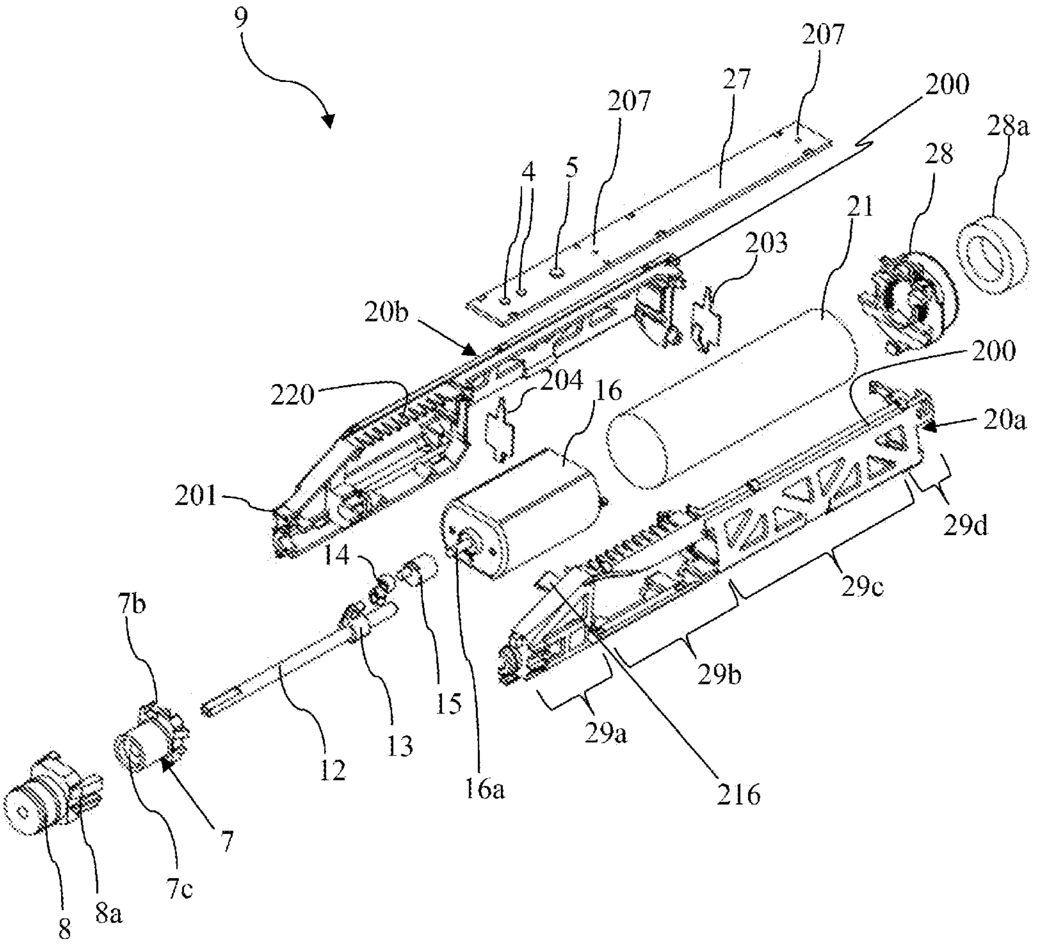
FIG. 24 shows an exploded view of the interior of the handpiece from above.
Figure 25:
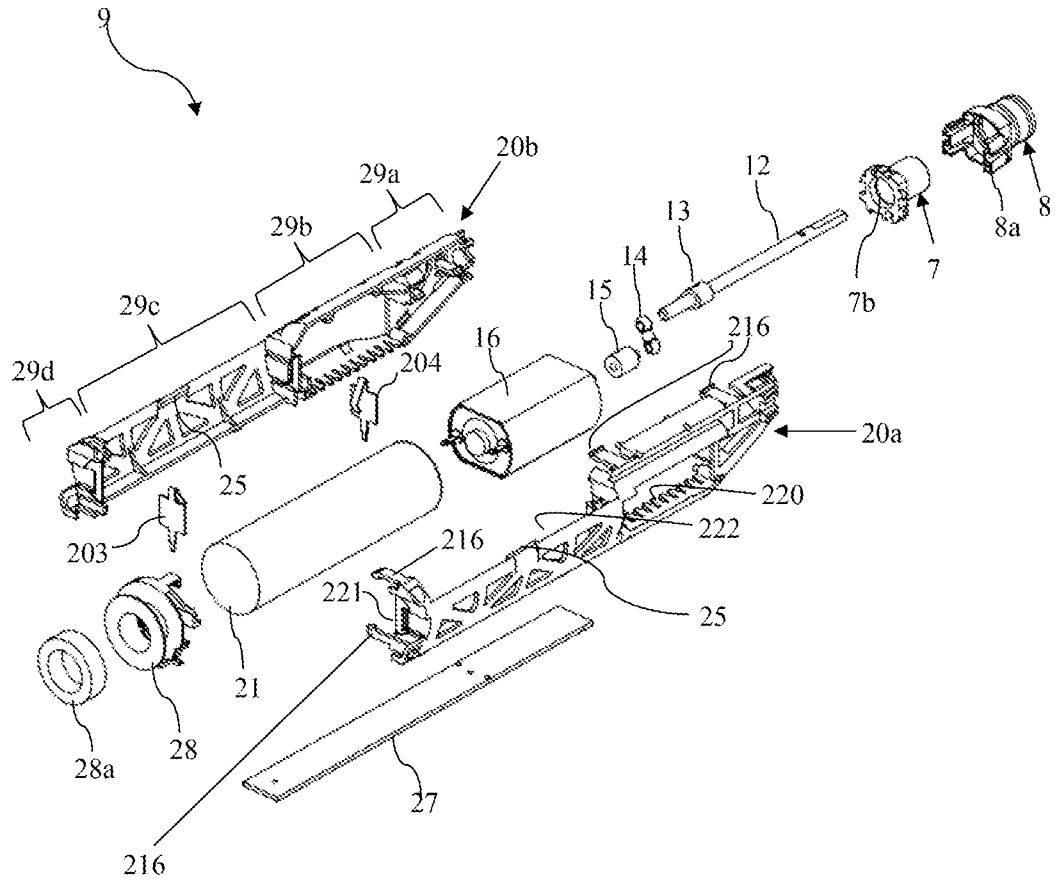
FIG. 25 shows an exploded view of the interior of the handpiece from below.

In FIGS. 24 and 25, all components of the inner workings or of a slide-in unit 9 for an electric toothbrush handpiece 2 are again illustrated in each case in an exploded view from above and an exploded view from below.

FIGS. 24 and 25 (also in conjunction with FIGS. 21 to 23) clearly illustrate the installation of the slide-in unit 9 for the electric toothbrush handpiece 2.

First, the second half-shell-like half 20*b* of the frame unit 20 is laid out. Now the drive unit 10 is assembled with the electric motor 16 and the gear unit 11, wherein the electric motor 16 is connected to the gear unit 11 and the electric motor 16 is positioned in the motor zone 29*b* and the gear unit 11 is positioned in a gear unit zone 29*a* of the second half-shell-like half 20*b* and locked there. Here, specifically, the eccentric 15 is pressed onto a motor shaft 16*a* of the electric motor 16 and the connecting rod 14 is fitted onto the eccentric 15 or eccentric pin 15*b* and onto the articulation piece 13 or articulation pin 13*a* injection-molded onto the drive shaft 12. The drive shaft 12 thereby engages with the clamping arm 23 and is supported in the first bearing device 22.

Now, the rear spring plate 203 and the front spring plate 204 are inserted from the side into corresponding receptacles of the second half-shell-like half 20*b*, wherein the rear and front spring plates 203, 204 are preferably each held in position by retaining arms 218.

Now the print plate 27 is mounted in the print zone 29*e* of the second half-shell-like half 20*b*, wherein in each case at least a first connecting piece 203*a* of the rear spring plate 203 and a first connecting piece 204a of the front spring plate 204 are guided through corresponding recesses 207 in the print plate 27, and the print plate 27 is preferably received in a (double-sided) recess 200 of the print zone 29e and locked there if necessary. Support struts 220 are provided on both sides of the upper side of the motor zone 29b to support the print plate 27 in the front area, where in particular the on/off switch 5 is arranged. In this way, the pressure exerted by a user on the on/off switch 5 can be better absorbed. The support struts 220 form a kind of bottom of the recess 200 for the print plate 27. Regularly, no support struts 220 are provided in the accumulator zone. However, corresponding designs would be conceivable.

Subsequently, the first half-shell-like half 20a is installed on the second half-shell-like half 20b, wherein the two half-shell-like halves of the frame unit 20 are preferably inserted and/or clicked into each other at several locations (cf. in this respect the guide cylinders 210 and the corresponding blind holes 211 as well as the snapping apparatuses 216 and the corresponding snap-in openings 217 in FIGS. 9 and 10).

Now the installation of the key element 7 (here shortened by the key geometry) to the assembled frame unit 20 takes place, wherein the key element 7 is pushed on over the drive shaft 12 and preferably latches with the snap elements 201 of the frame unit 20. In the sonic variant, no bellows seal 19 is regularly inserted in the key element 7 (although this is also possible in principle). Subsequently, the sealing/damping element 8 is still mounted on the frame unit 20, wherein the sealing/damping element 8 is slid over the key element 7 and preferably snaps onto the frame unit 20 at the front.

Then, the coil carrier 28 with a charging coil 28a is mounted to the assembled frame unit 20, wherein the coil carrier 28 is plugged or snapped onto the rear end area of the frame unit 20 (cf. also FIG. 12b).

Subsequently, the necessary electrical connections are usually made (not shown here), wherein wires are usually run from the print plate 27 to the electric motor 16 (or vice versa) and the first connectors 203a, 204a of the rear and front spring plates 203, 204 as well as the ends of the cables of the charging coil 28a are soldered to the print plate 27.

Finally, the battery 21 is inserted from below through an opening 222 into the battery zone 29c of the assembled frame unit 20, where it is received in a clamped manner between the spring piece 203b of the rear spring element 203 and the spring piece 204b of the front spring element 204 and, if necessary, is additionally held by the lateral preload surfaces 25.

Finally, the fully assembled frame unit 20 is inserted into the housing 6 of the handpiece 2 as a slide-in unit 9 and, if necessary, the housing cover 17 is also attached. The insertion of the insertion unit 9 into the housing 6 of the handpiece 2 is regularly supported by insertion aids, preferably by insertion ribs/rails, which are arranged laterally on the frame unit 20 or on the sealing/damping element 8 and/or laterally on the inner wall of the housing 6. The sealing/damping element 8 comprises, in particular, two guide rails 8a on each side, which assist in inserting/positioning the interior of the handpiece 2 and, if necessary, cooperate with corresponding rails of the housing.

With reference to FIGS. 26 to 34, three particularly preferred embodiments for an attachment brush 3 according to the invention, particularly for the oscillating variant, are now illustrated. However, the use of the corresponding bristle field geometries is also conceivable in connection with the sonic variant.

Figure 26:
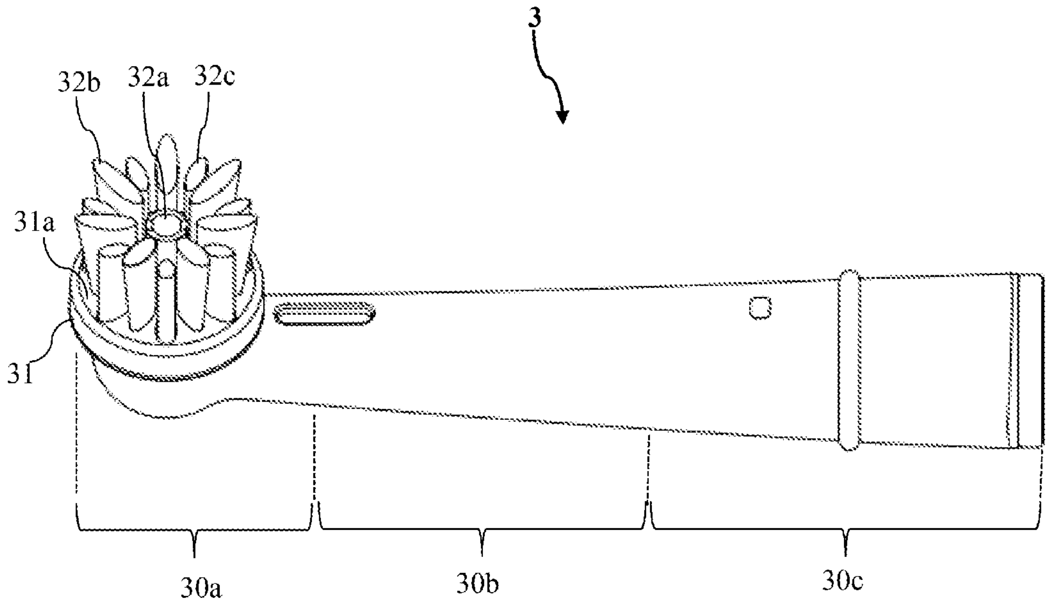
FIG. 26 shows a perspective view of a first embodiment of a brush head according to the invention.
Figure 27:
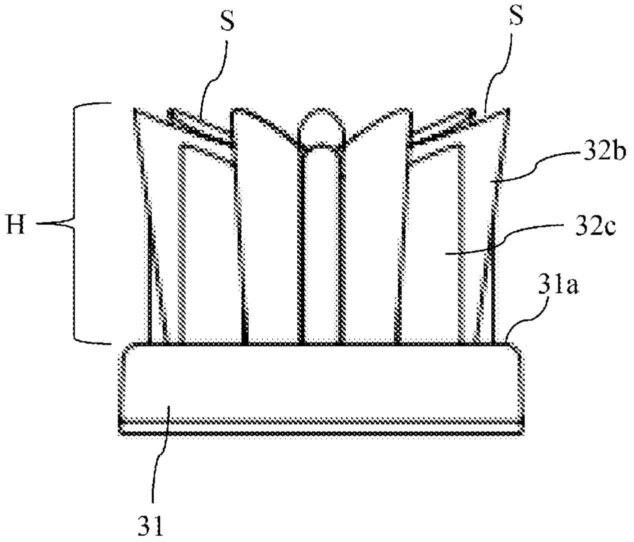
FIG. 27 shows a side view of the brush head in accordance with FIG. 26.
Figure 28:
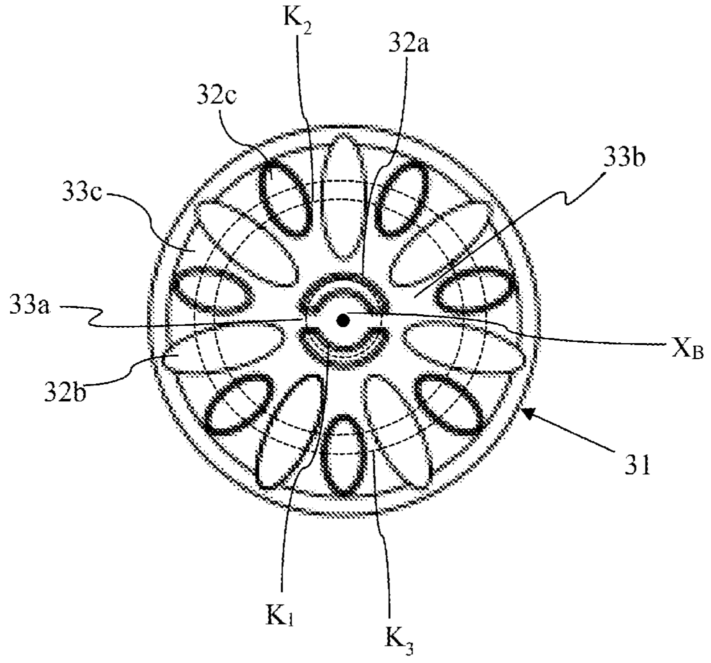
FIG. 28 shows a top view of the brush head in accordance with FIG. 26.

In the first preferred embodiment shown in FIGS. 26 to 28, the attachment brush 3 comprises a head portion 30a having a round brush head 31, an attachment portion 30c, and a neck portion 30b connecting the head portion 30a to the attachment portion 30c, wherein the brush head 31 has a brush field formed by a plurality of bristle bundles.

The brush field on the brush head 31 is formed here by three different shapes of brush bundles, namely circular segment shaped brush bundles 32a (first shape), small oval brush bundles 32c (second shape) and large oval brush bundles 32b (third shape).

The individual brush bundles are arranged on three circles $K_1$, $K_2$ and $K_3$ concentric to the brush head axis $X_B$. The dotted circles $K_1$, $K_2$ and $K_3$ extend approximately through the center of the individual brush bundles 32a, 32b, 32c. The center of the circles preferably corresponds to the center of rotation of the oscillating movement.

On the inner circle $K_1$ the circular segment-shaped brush bundles 32a of the first shape are provided here, on the middle circle $K_2$ the large oval brush bundles 32b of the third shape and on the outer circle $K_3$ the small oval brush bundles 32c of the second shape.

Between the individual bristle bundles 32a, 32b, 32c on each of the circles $K_1$, $K_2$ and $K_3$ there remain gaps 33a, 33b, 33c which are not occupied by the corresponding bristle bundles.

However, as seen here, the large oval brush bundles 32b of the third shape may be arranged on the central circle $K_2$ in an offset manner with respect to the small oval brush bundles of the second shape 32c on the outer circle $K_3$. In any case, the large oval brush bundles 32b of the third shape on the middle circle $K_2$ partially engage in the gaps 33c between the small oval brush bundles of the second shape 32c on the outer circle $K_3$.

The large oval brush bundles 32b of the third shape on the central circle $K_2$ and the small oval brush bundles 32c of the second shape on the outer circle $K_3$ have a bevel S in the direction of the brush head axis $X_B$, wherein the difference between the highest and the lowest point is from 1 mm to 4 mm preferably from 2 mm to 3 mm. It is also conceivable that only the large oval brush bundles 32b of the third shape or only the small oval brush bundles 32c of the second shape have a corresponding bevel S.

The inner circle $K_1$ here comprises, by way of example, two identical circular segment-shaped brush bundles 32a (the preferred number is between 1 and 8, even more preferably between 2 and 5), which regularly have a uniform, constant height. The circular segment-shaped brush bundles 32a on the inner circle are separated here accordingly by two gaps 33a.

The length of the individual circle segments depends on the number of brush bundles 32a used in each case and the gaps between them. The width of the individual circular segment-shaped brush bundles 32a is from 0.2 mm to 1 mm preferably from 0.3 mm to 0.6 mm. The height of the individual circular segment-shaped brush bundles 32a is from 4 mm to 8 mm preferably from 5.5 to 6.5 mm (i.e. measured from the bristle exit surface 31a).

The surface of the circular segment-shaped brush bundles 32a is from 2 $mm^2$ to 4.5 $mm^2$ preferably from 2.3 $mm^2$ to 3 $mm^2$ (i.e. in accordance with the plan view shown in FIG. 28).

The length of the gaps 33a between the individual circular segment bristle bundles 32a along the circle $K_1$ is from 0.5 mm to 1.4 mm preferably from 0.7 mm to 1.1 mm.

The central circle K2 here comprises, by way of example, seven identical brush bundles in the form 32b of large ovals (the preferred number is between 4 and 11 even more preferably between 6 and 9). The centers of the large ovals are approximately on the circle K2. The large oval brush bundles 32*b* regularly have a sloping bevel S in the direction of the brush head axis XB.

The length of the large oval brush bundles 32*b* is from 3 mm to 6 mm preferably from 4 mm to 5 mm.

The width of the large oval brush bundles 32*b* is from 0.8 mm to 2.4 mm preferably from 1.2 mm to 1.8 mm.

The outer height H of the large oval brush bundles 32*b* (i.e. away from the brush head axis $X_B$) is from 7 mm to 10 mm preferably from 8 mm to 9 mm. The inner height (i.e., toward the brush head axis $X_B$) of the large oval brush bundles 32*b* is from 5.5 mm to 8.5 mm preferably from 6.5 mm to 7.5 mm.

The surface of the large oval brush bundles 32*b* is from 3 $mm^2$ to 14 $mm^2$ preferably from 4.5 $mm^2$ to 7 $mm^2$ (i.e. in accordance with the plan view shown in FIG. 28).

The brush bundles 32*a*, 32*b* of the middle and outer circles $K_1$, $K_2$ alternate here in circumferential direction.

The ratio of the surface area of the small oval brush bundles 32*c* to the surface area of the large oval brush bundles 32*b* is from 1:7 to 5:7 preferably from 2:7 to 1:2.

The outer circle $K_3$ here comprises, by way of example, seven identical brush bundles 32*c* in the form of small ovals (the preferred number is between 4 and 11, even more preferably between 6 and 7). The centers of the small ovals are approximately on the circle $K_3$. The small oval brush bundles 32*c* regularly have a sloping bevel S in the direction of the brush head axis $X_B$.

The length of the small oval brush bundles 32*c* is from 2 mm to 3.5 mm preferably from 2.5 mm to 3 mm.

The width of the small oval brush bundles 32*c* is 0.5 mm to 2 mm preferably from 1 mm to 1.5 mm.

The outer height of the small oval brush bundles 32*c* (i.e. away from the brush head axis $X_B$) is from 5.5 mm to 8.5 mm preferably from 6.5 mm to 7.5 mm. The inner height of the small oval brush bundles 32*c* (i.e. towards the brush head axis $X_B$) is from 4.5 mm to 7.5 mm preferably from 5.5 mm to 6.7 mm.

The surface of the small oval brush bundles 32*c* is from 2 $mm^2$ to 7 $mm^2$ preferably from 3 $mm^2$ to 4.5 $mm^2$ (i.e. in plan view in accordance with FIG. 28).

Figure 29:
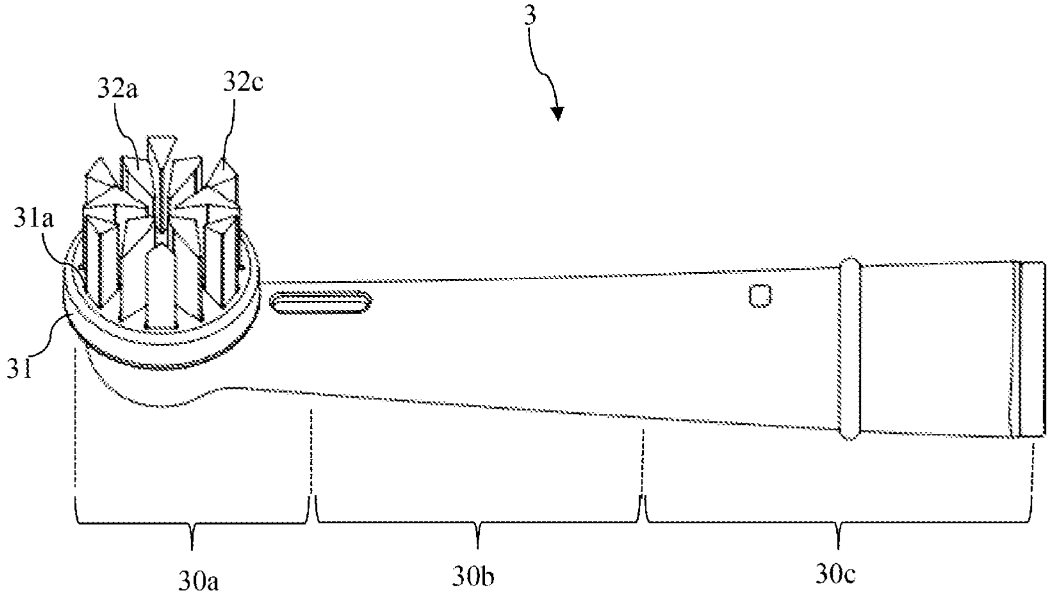
FIG. 29 shows a perspective view of a second embodiment of a brush head according to the invention.
Figure 30:
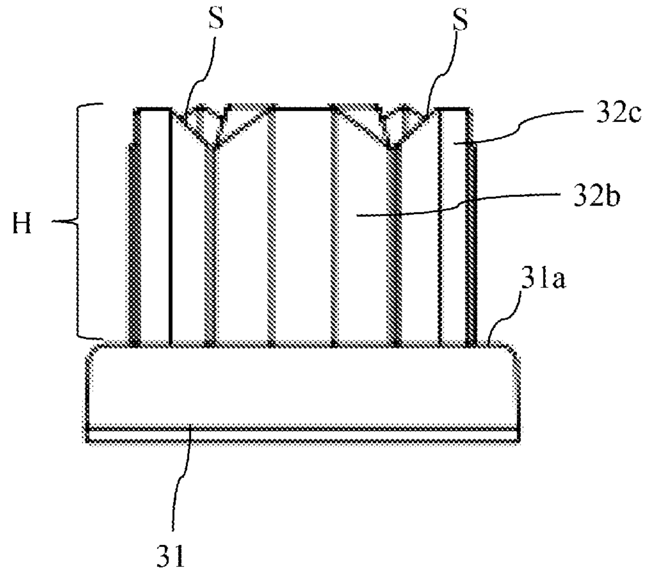
FIG. 30 shows a side view of the brush head in accordance with FIG. 29.
Figure 31:
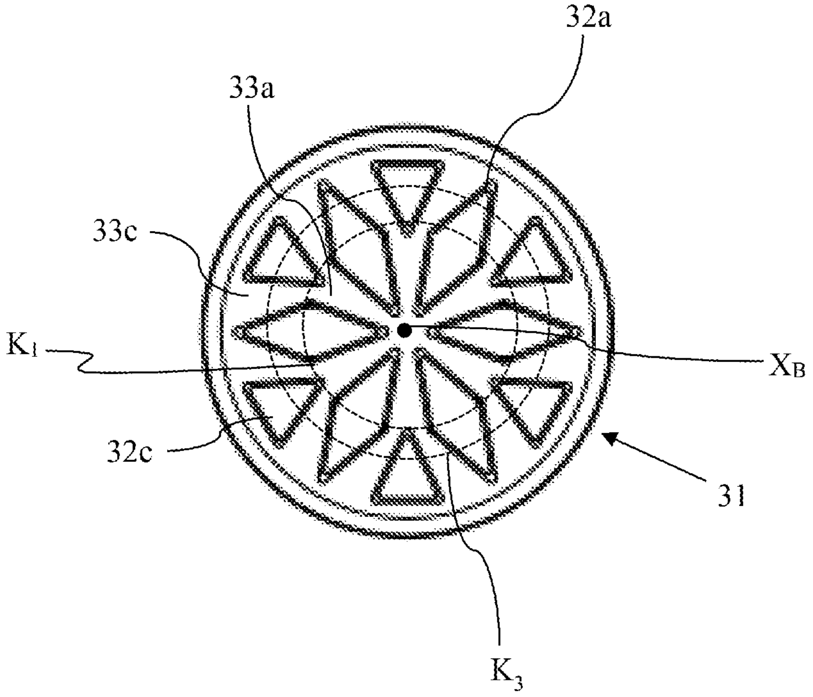
FIG. 31 shows a top view of the brush head in accordance with FIG. 29.

In the second preferred embodiment shown in FIGS. 29 to 31, the attachment brush 3 again comprises a head portion 30*a* having a brush head 31, with an attachment portion 30*c*, and with a neck portion 30*b* connecting the head portion 30*a* to the attachment portion 30*c*, wherein the brush head 31 has a brush field formed by a plurality of bristle bundles.

The brush field on the brush head 31 is formed here by two different shapes of bristle bundles, namely diamond-shaped bristle bundles 32*a* (first shape) and triangular-shaped bristle bundles 32*c* (second shape).

The individual brush bundles are arranged on two circles $K_1$ and $K_3$ concentric to the brush head axis $X_B$. The dotted circles $K_1$ and $K_3$ extend approximately through the center of the individual brush bundles 32*a*, 32*c*.

The diamond-shaped brush bundles 32*a* of the first shape are provided here on the inner circle $K_1$, and the triangular-shaped brush bundles 32*c* of the second shape are provided on the outer circle $K_3$.

Between the individual bristle bundles 32*a* and 32*c* on each of the circles $K_1$ and $K_3$, gaps 33*a* and 33*c* remain which are not occupied by the corresponding bristle bundles.

However, as seen here, the diamond-shaped brush bundles 32*a* of the first shape may be arranged on the inner circle $K_1$ offset from the triangular-shaped brush bundles of the second shape 32*c* on the outer circle $K_3$. In this case, the diamond-shaped brush bundles 32*a* of the first shape on the inner circle $K_1$ at least partially engage in the gaps 33*c* between the triangular-shaped brush bundles 32*c* of the second shape on the outer circle $K_3$.

The diamond-shaped brush bundles 32*a* of the first shape on the inner circle $K_1$ and the triangular-shaped brush bundles 32*c* of the third shape on the outer circle $K_3$ have a bevel S in the direction of the brush head axis $X_B$. It is also conceivable that only the diamond-shaped brush bundles 32*a* of the first shape or only the triangular-shaped brush bundles 32*c* of the second shape have a corresponding bevel S.

In the present example, the inner circle $K_1$ comprises six identical diamond-shaped brush bundles 32*a* (the preferred number is between 3 and 12, even more preferably between 5 and 8), in particular with a roof-shaped end face, wherein preferably the diamond axis forms the ridge. The diamond-shaped brush bundles 32*a* have a tip directed towards the brush head axis $X_B$.

The length of the individual diamond-shaped brush bundles 32*a* is from 3 mm to 6 mm preferably from 4 mm to 5 mm.

The width of the individual diamond-shaped brush bundles 32*a* is from 0.7 mm to 2.5 mm, preferably from 1.2 mm to 2 mm.

The height of the individual diamond-shaped brush bundles 32*a* at the corners (the inside corners and the outside corners are preferably arranged at the same height) is from 5 mm to 8 mm preferably from 6 mm to 7 mm (measured from the bristle exit surface 31*a*).

The height of the individual diamond-shaped brush bundles 32*a* at the ridge is from 7 mm to 9 mm preferably from 7.5 mm to 8 mm (measured from the bristle exit surface 31*a*).

The surface of the individual diamond-shaped brush bundles 32*a* is from 2 $mm^2$ to 7 $mm^2$ preferably from 5 $mm^2$ to 7 $mm^2$ (i.e. in plan view in accordance with FIG. 31).

The number of diamond-shaped brush bundles 32*a* is six in this example.

The brush bundles 32*a* and 32*c* of the inner and outer circles $K_1$ and $K_3$ alternate here in circumferential direction.

The outer circle $K_3$ here comprises, by way of example, six identical brush bundles 32*c* in the form of triangles (the preferred number is between 3 and 12, even more preferably between 5 and 8). One tip of each triangle is directed toward the brush head axis $X_B$.

The triangular-shaped brush bundles 32*c* have a bevel S in the direction of the brush head axis $X_B$. The triangular-shaped brush bundles 32*c* are preferably smaller than the diamond-shaped brush bundles 32*a* of the inner circle.

The side length of the triangle base is from 1.5 mm to 4 mm preferably from 2.2 mm to 3.2 mm.

The side length of the triangular legs (i.e. the two sides facing the brush head axis $X_B$) is in each case from 2 mm to 4 mm preferably from 2.5 mm to 3.5 mm.

The outer height of the triangular brush bundles is from 6.5 mm to 9.5 mm preferably from 7.5 mm to 8.5 mm (measured from the bristle exit surface 31*a*).

The inner height of the triangular brush bundles is from 5 mm to 8 mm preferably from 6 mm to 7 mm (measured from the bristle exit surface 31*a*).

The surface of the triangular brush bundles 32*c* is from 1 $mm^2$ to 5.5 $mm^2$ preferably from 3 $mm^2$ to 4.5 $mm^2$ (i.e. in the plan view in accordance with FIG. 31)

The number of triangular brush bundles 32*c* is six in this example. The number of triangular brush bundles 32*c* of the outer circle $K_3$ is regularly preferably equal to the number of diamond-shaped brush bundles 32*a* of the inner circle $K_1$, since the brush bundles are preferably arranged alternately.

The ratio of the surface of the diamond-shaped brush bundles 32*a* to the surface of the triangular-shaped brush bundles 32*c* is from 1:5 to 5:7 preferably from 1:3 to 4:7.

Figure 32:
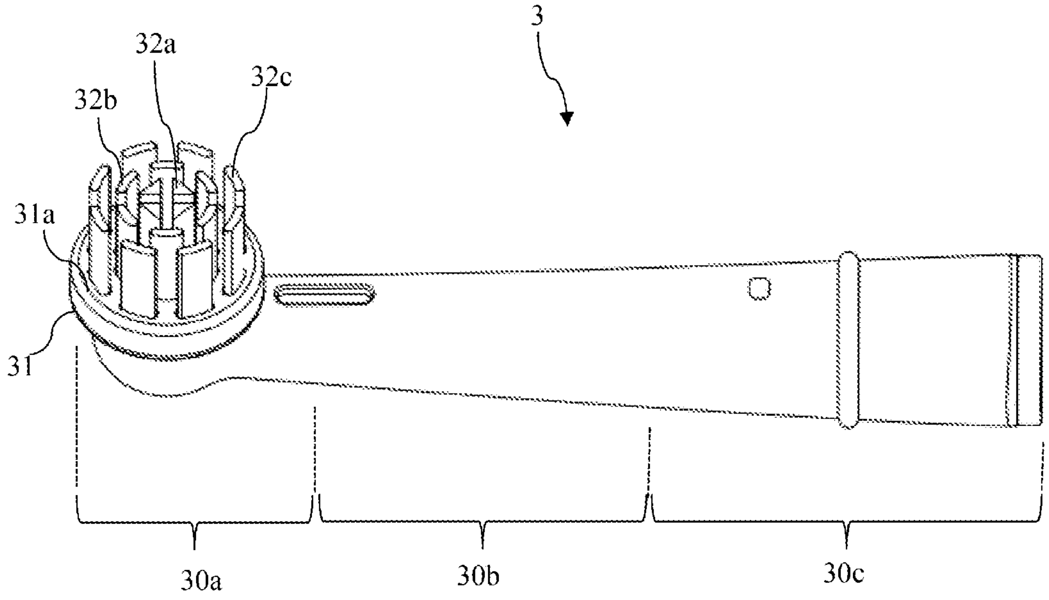
FIG. 32 shows a perspective view of a third embodiment of a brush head according to the invention.
Figure 33:
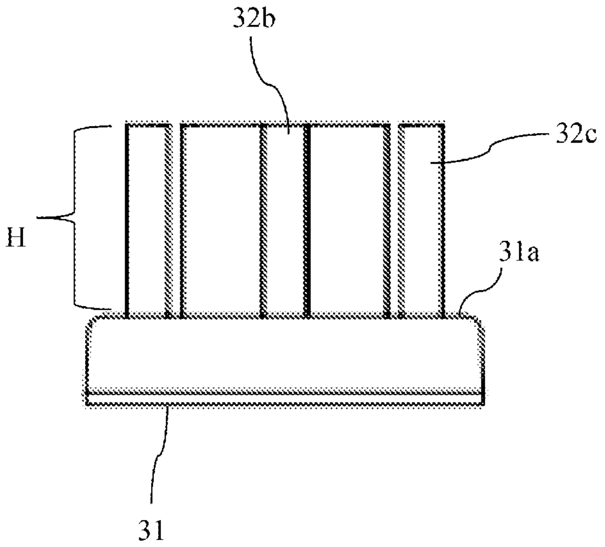
FIG. 33 shows a side view of the brush head in accordance with FIG. 32.
Figure 34:
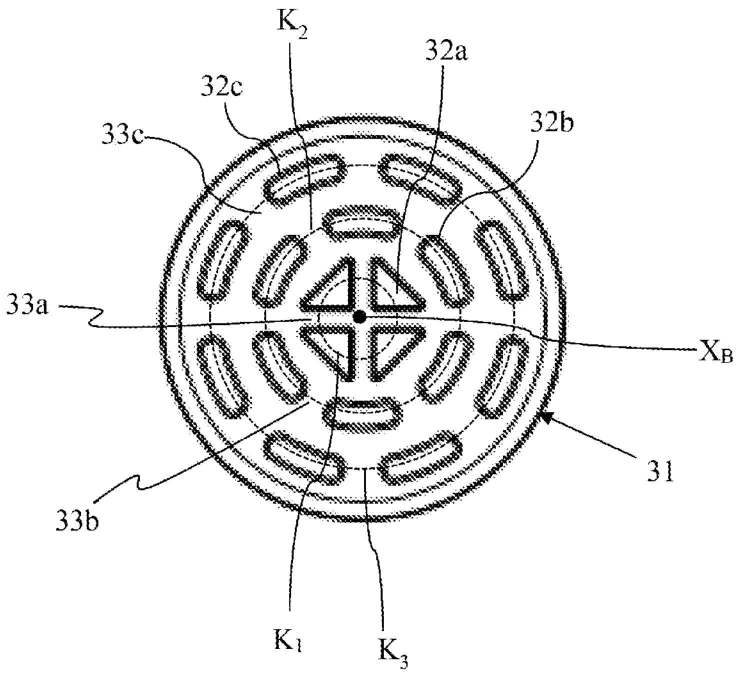
FIG. 34 shows a top view of the brush head in accordance with FIG. 32.

In the third preferred embodiment shown in FIGS. 32 to 34, the attachment brush 3 again comprises a head portion 30*a* having a brush head 31, an attachment portion 30*c*, and a neck portion 30*b* connecting the head portion 30*a* to the attachment portion 30*c*, wherein the brush head 31 has a brush field formed by a plurality of brush bundles.

The brush field on the brush head 31 is formed here by three shapes of different bristle bundles, namely triangular shaped bristle bundles 32*a* (first shape), first circular segment shaped bristle bundles 32*c* (second shape) and second circular segment shaped bristle bundles 32*b* (third shape).

The individual brush bundles are arranged on three circles $K_1$, $K_2$ and $K_3$ concentric to the brush head axis $X_B$. The dotted circles $K_1$, $K_2$ and $K_3$ extend approximately through the center of the individual brush bundles 32*a*, 32*b*, 32*c*.

The triangular brush bundles 32*a* of the first shape are provided here on the inner circle $K_1$, the first circular-segment-shaped brush bundles 32*b* of the third shape are provided on the middle circle $K_2$, and the second circular-segment-shaped brush bundles 32*c* of the second shape are provided on the outer circle $K_3$.

Between the individual bristle bundles 32*a*, 32*b*, 32*c* on each of the circles $K_1$, $K_2$ and $K_3$ there remain gaps 33*a*, 33*b*, 33*c* which are not occupied by the bristle bundles.

The inner circle $K_1$ here comprises identical triangular brush bundles 32*a* with preferably uniform, constant height. The four triangular brush bundles 32*a* shown here as examples (the preferred number is between 1 and 8, even more preferably between 3 and 5) regularly form a substantially square structure with gaps 33*a* between them (wherein the corresponding gaps 33*a* form approximately a cross shape).

The side length of the triangle base is from 1.5 mm to 3.5 mm preferably from 1.7 mm to 2.7 mm.

The side length of the triangular legs (i.e. the two sides facing in the direction of the brush head axis $X_B$) is in each case from 0.8 mm to 2.5 mm preferably from 1.2 mm to 2 mm.

The surface of the triangular brush bundles 32*a* is from 1 $mm^2$ to 4 $mm^2$ preferably from 2 $mm^2$ to 3 $mm^2$ (i.e. in the plan view in accordance with FIG. 34).

The length of the gaps 33*a* between the triangular bristle bundles 32*a* ranges from 0.5 mm to 1.5 mm.

The center circle $K_2$ here preferably comprises identical brush bundles 32*b* with preferably uniform, constant height in the form of first circle segments which form an interrupted circular ring. This comprises, by way of example here, six first circular-segment brush bundles 32*b* (the preferred number being between 2 and 12, and even more preferably between 4 and 8). The first circle-segment-shaped brush bundles 32*b* are smaller than the second circle-segment-shaped brush bundles 32*c* of the outer circle $K_3$.

The width of the first circular segment brush bundles 32*b* is from 0.3 mm to 1.5 mm preferably from 0.5 mm to 1 mm.

The surface area of the first circular segment brush bundles 32*b* is from 1.5 $mm^2$ to 5 $mm^2$ preferably from 2 $mm^2$ to 3.5 $mm^2$ (i.e. in plan view in accordance with FIG. 34).

The radius of the first circular segment shaped brush bundle 32*b* is from 5.5 mm to 8.5 mm preferably from 6.5 mm to 7.5 mm (starting from the brush head axis $X_B$).

The length of the gap 33*b* between the first circular segment bristle bundles 32*b* is from 0.8 mm to 2 mm preferably from 1 mm to 1.5 mm.

The outer circle $K_3$ here preferably comprises identical brush bundles of uniform, constant height, in the form of second circle segments which form an interrupted circular ring. This comprises, by way of example here, eight first circular-segment brush bundles 32*b* (the preferred number being between 2 and 12, and even more preferably between 6 and 10). The second circle-segment-shaped brush bundles 32*c* are larger than the first circle-segment-shaped brush bundles 32*b* of the middle circle $K_2$.

The width of the second circular segment brush bundles 32*c* is from 0.3 mm to 1.5 mm preferably from 0.5 mm to 1 mm (i.e., preferably the same dimensions as the first circular segment brush bundles 32*b*).

The surface area of the second circular segment brush bundles 32*c* is from 2 $mm^2$ to 7 $mm^2$ preferably from 2.5 $mm^2$ to 4 $mm^2$ (i.e. in plan view in accordance with FIG. 34).

The diameter (through the center of the brush head) is from 8 mm to 14 mm preferably from 10 mm to 12 mm (starting from the brush head axis $X_B$).

The length of the gap 33*c* between the second circular segment bristle bundles 32*c* is from 0.8 mm to 2.4 mm preferably from 1.2 mm to 2 mm.

The ratio of the surface area of the first circular segment brush bundles 32*b* to the surface area of the second circular segment brush bundles 32*c* is from 1:5 to 4.5:5 preferably from 2:5 to 4:5.

Figure 35:
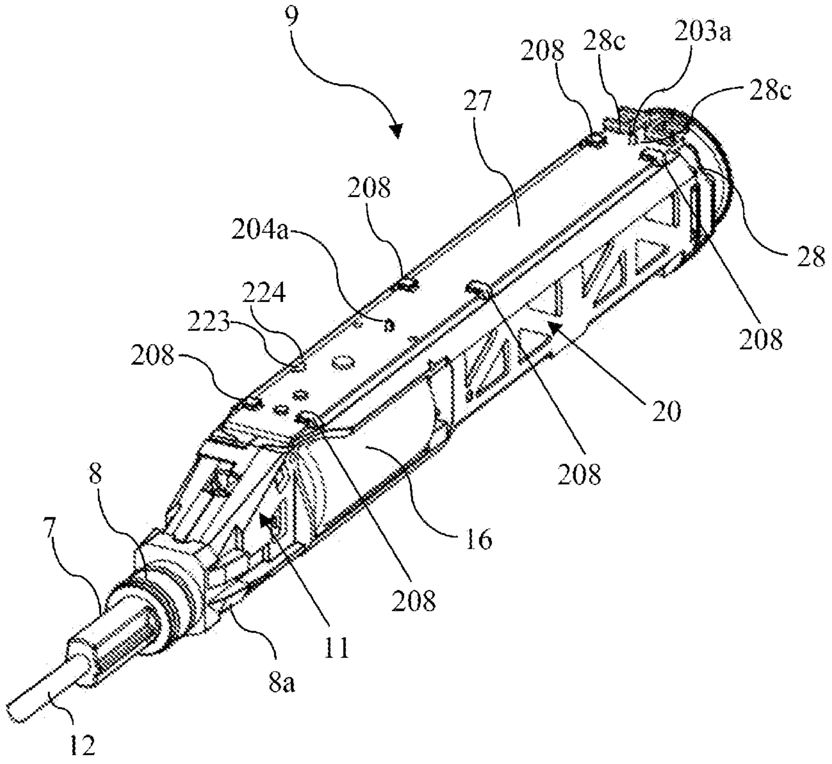
FIG. 35 shows a perspective view of a further embodiment of the interior of the handpiece from the front.
Figure 36:
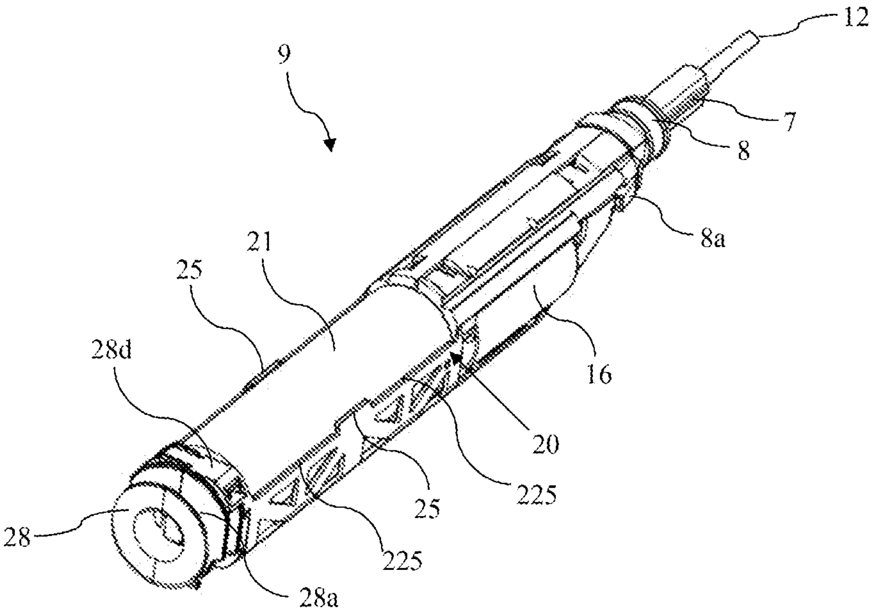
FIG. 36 shows a perspective view of a further embodiment of FIG. 35 of the interior of the handpiece from the rear.

The two views in accordance with FIGS. 35 and 36 show an alternative embodiment analogous to FIGS. 7 and 8. Substantially the interior of the handpiece 2 is shown without the housing 6, which in the present assembled form is also referred to as the slide-in unit 9. The frame unit 20 represents a kind of chassis to which all components or parts are fastened to ensure safe and targeted insertion into the housing 6 during final installation.

A print plate 27 is attached on top of the frame unit 20. This has openings through which protrude a first connecting piece 204*a* of the first spring plate 204 and a first connecting piece 203*a* of the rear spring plate 203, which are soldered to the print plate 27. This makes the electrical connection with the electrical conduits on the print plate 27. In addition, the connecting pieces 203*a* and 204*a* serve as orientation aids during the installation of the print plate 27. The print plate 27 is preferably inserted into a recess in the frame unit 20 and held by means of clamping arms 208. The coil carrier 28 can be seen at the rear end of the slide-in unit 9. Complementing the recess is a combination of a lug 223 on the frame unit with a recess 224 on the print plate 27. The lug 223 of the frame unit engages in the recess 224 on the print plate 27. This allows the print plate 27 to be aligned (i.e., in terms of unambiguous installation) and can prevent longitudinal displacement.

The battery 21 is inserted into the frame unit 20 from below, as shown in FIG. 36, and held in place by means of latching apparatuses or preload surfaces 25 and spring plates 203, 204. Supportively, retaining ribs 225 are provided laterally adjacent to the preload surfaces 25 on the frame unit, at the edge of the opening of the frame unit, to also hold or assist in holding the battery or accumulator. The electric motor 16 is also received in a form-fit/force-fit manner by the frame unit 20. Two snap elements 201 also protrude from the front of the frame unit, which engage with corresponding latching devices in the key element 7 (here concealed by the sealing/damping element 8). The sealing/damping element 8 has guide rails 8*a* which assist in inserting/positioning the slide-in unit 9 into the handpiece 2 and, if necessary, cooperate with corresponding rails on the inside of the housing 6.

Figure 37:
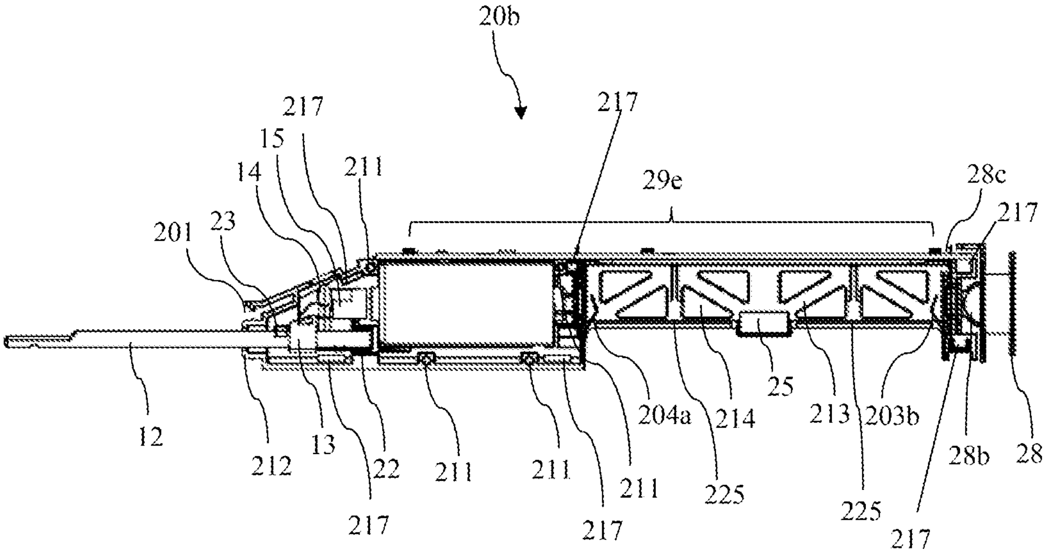
FIG. 37 shows a side view of the interior of the handpiece in accordance with FIG. 35.

FIG. 37 shows various details which differ from those in FIGS. 9 and 10.

In the coil zone 29*d*, the coil carrier 28 is fitted onto the frame unit 20. The coil carrier 28 comprises a length compensation means 28*b*, which in the installed state resiliently supports the frame unit 20 relative to the housing cover 17. The length compensation means 28*b* is designed in the form of an elastic portion of the coil carrier 28, on which a length compensation between frame unit 20 and coil carrier 28 is achieved as well as a floating bearing of the frame unit 20 within the housing 6. In particular, the length compensation means 28*b* can also be designed to be compressible. In addition, the coil carrier 28 comprises upper snap-on means 28*c* and lateral snap-on means 28*e* (cf. also FIG. 38*b*), with which it (additionally) snaps onto the rear end of the frame unit 20, thus ensuring an even better hold on the frame unit 20.

The length compensation means 28*b* is configured as a resilient bridge, with a bridge element on the left and a bridge element on the right. The two bridge elements can each spring individually and are thus not directly coupled as if they would influence each other. This optimizes the individual adaptation to the housing with the length compensation.

Further, the retaining ribs 225 are clearly visible in the illustration, which are arranged to the side of the preload surface 25. They support the holding of the accumulator or battery.

Figure 38A:
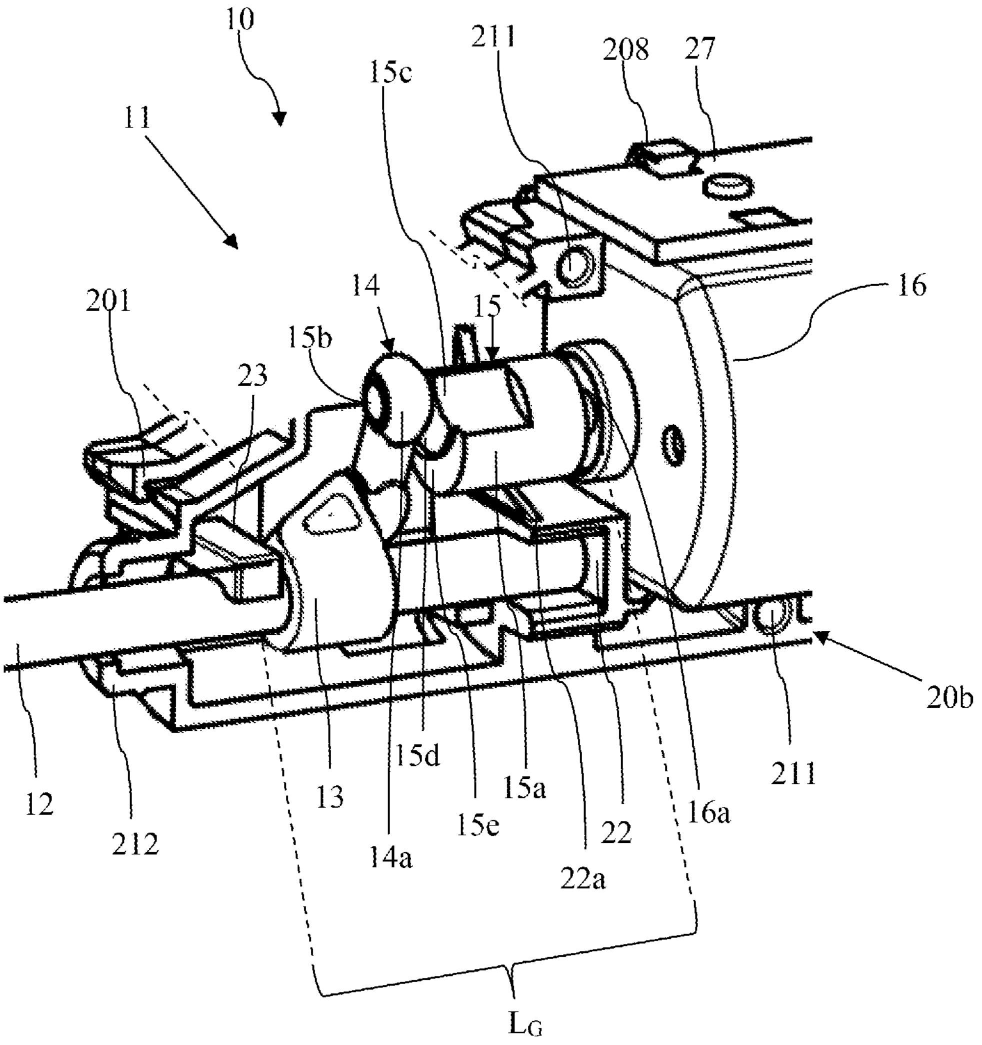
FIG. 38*a* shows a detailed view of the drive unit according to the invention from FIG. 35.

FIG. 38*a* shows in particular a detailed view of the drive unit 10 with the gear unit 11 and the motor 16 in accordance with the present invention. The gear unit 11 comprises the drive shaft 12 with the injection-molded articulation piece 13, the connecting rod 14 and the eccentric 15. The main part 15*a* of the eccentric 15 is attached to or pressed onto the motor shaft 16*a* of the electric motor 16 with its rear or motor end. The motor shaft 16*a* and the axis of the main part coincide. The main part 15*a* of the eccentric 15 preferably comprises two recesses 15*c*, of which only one can be seen here. The recesses 15*c* are used to generate an optimized unbalance.

On its face side, the main part 15*a* of the eccentric 15 comprises an offset 15*e* and a corresponding pedestal-like elevation 15*d*. This design of the end face of the eccentric main part 15*a* serves in particular to enable the eccentric 15 and the connecting rod 14 to be operated with as little intermediate space as possible. The offset 15*e* is dimensioned in such a manner that in the movement of the gear unit 11 the eccentric main part 15*a* just passes the lower bearing 14*b* of the connecting rod 14, which cannot be seen here, without touching it. The upper bearing 14*a* of the connecting rod 14 is fitted onto the eccentric pin 15*b*. The bearings 14*a*, 14*b* of the connecting rod 14 are preferably designed as plain bearings directly in the body of the connecting rod 14. The lower bearing 14*b* of the connecting rod 14, which is not shown, is fitted onto an articulation pin 13*a* of the articulation piece 13 corresponding to the eccentric pin 15*b*. This makes it possible to achieve a particularly compact and efficient design of the gear unit 11.

The individual parts of the gear unit 11 are merely fitted into one another with the smallest possible distances and tolerances between them. The rear end of the drive shaft 12 is supported in a first bearing device 22 of the second half-shell-like half 20*b*. In this case, the first bearing device 22 is preferably designed as a plain bearing and is closed off from the second half-shell-like half 20*b* during installation on the first half-shell-like half 20*a* by means of a corresponding cover 219 (cf. FIG. 9). The bearing device 22 may be designed to be reinforced to better absorb forces impacting the drive shaft 12. The reinforcement can happen, for example, with a reinforcement rib 22*a* on the upper side of the bearing device 22. The articulation piece 13 preferably rests on the clamping arm 23 into which the drive shaft 12 is clicked during installation and which presses on the drive shaft 12 from above in order to prevent chattering and enable particularly smooth running. The drive shaft 12 is guided out of the frame unit 20 by the guide pin 212 formed by the two half-shell-like halves 20*a*, 20*b*.

Figure 38B:
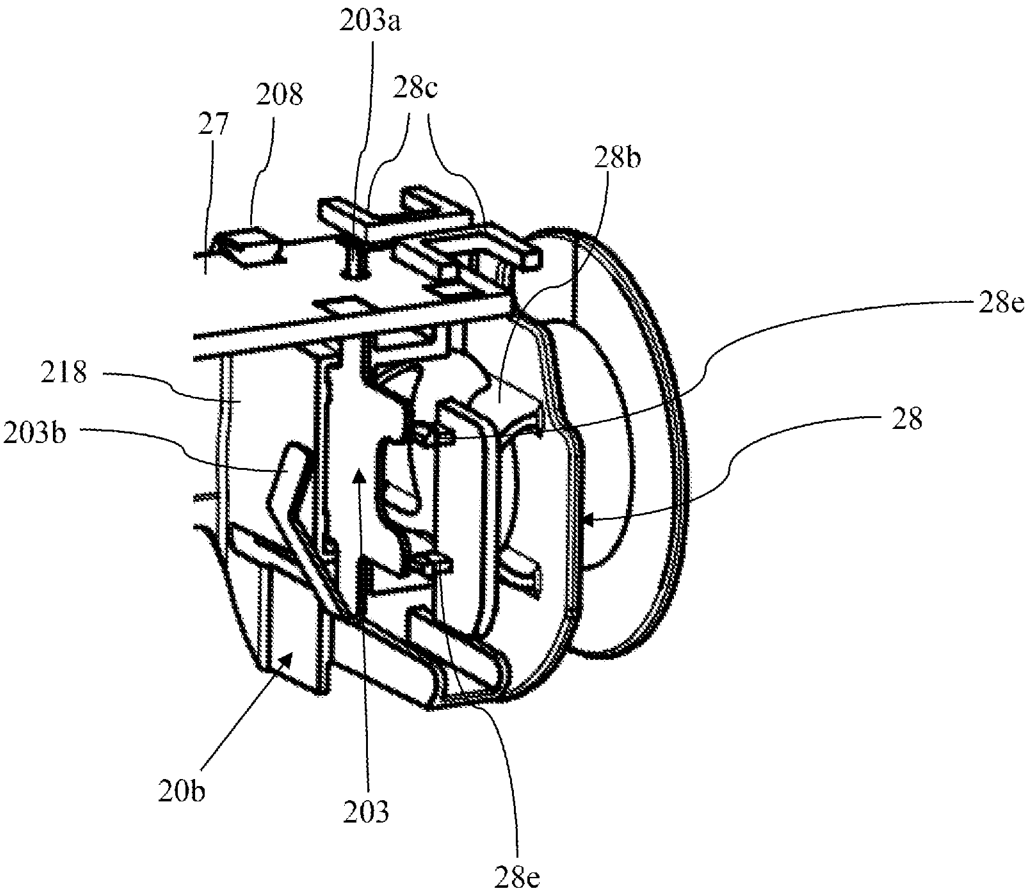
FIG. 38*b* shows a detailed view of the rear end of the frame unit of FIG. 35 with coil carrier attached.

FIG. 38*b* illustrates a detailed view of the arrangement of the coil carrier 28 at the rear end of the frame unit 20. The charging coil 28*a* (not shown) is initially wound onto the coil carrier 28. The coil carrier 28 comprises upper snap-on means 28*c* and lateral snap-on means 28*e* with which a secure hold on the frame unit 20 or the print plate 27 is achieved. The upper snap-on means 28*c* are designed in the form of two outwardly bent flex arms which snap onto the print plate 27, and the lateral snap-on means 28*e* in the form of two snap-in hooks per side which snap into corresponding recesses on the frame unit.

The coil carrier 28 further comprises a length compensating means 28*b* in the form of a resiliently configured portion in the form of a resilient bridge (left and right), which extends in the direction of the rear spring plate 203 but does not contact it. The elastic portion or length compensation means 28*b* thus supports the frame unit 20 relative to the housing cover 17, providing length compensation and a floating bearing for the frame unit 20 within the housing.

The rear spring piece 203 is inserted into a corresponding lateral receptacle of the second half-shell-like half 20*b* and is clamped in position by a retaining arm 218 of the second half-shell-like half 20*b*. The first half-shell-like half 20*a* has a corresponding configuration for receiving the rear spring plate 203. The installation of the front spring plate 204 behind the motor zone 29*b* is carried out in an analogous manner.

FIGS. 39 and 40 once again illustrate all the essential components of the interior or of a slide-in unit 9 for an electric toothbrush handpiece 2, in each case in an exploded view from above and an exploded view from below.

Figure 39:
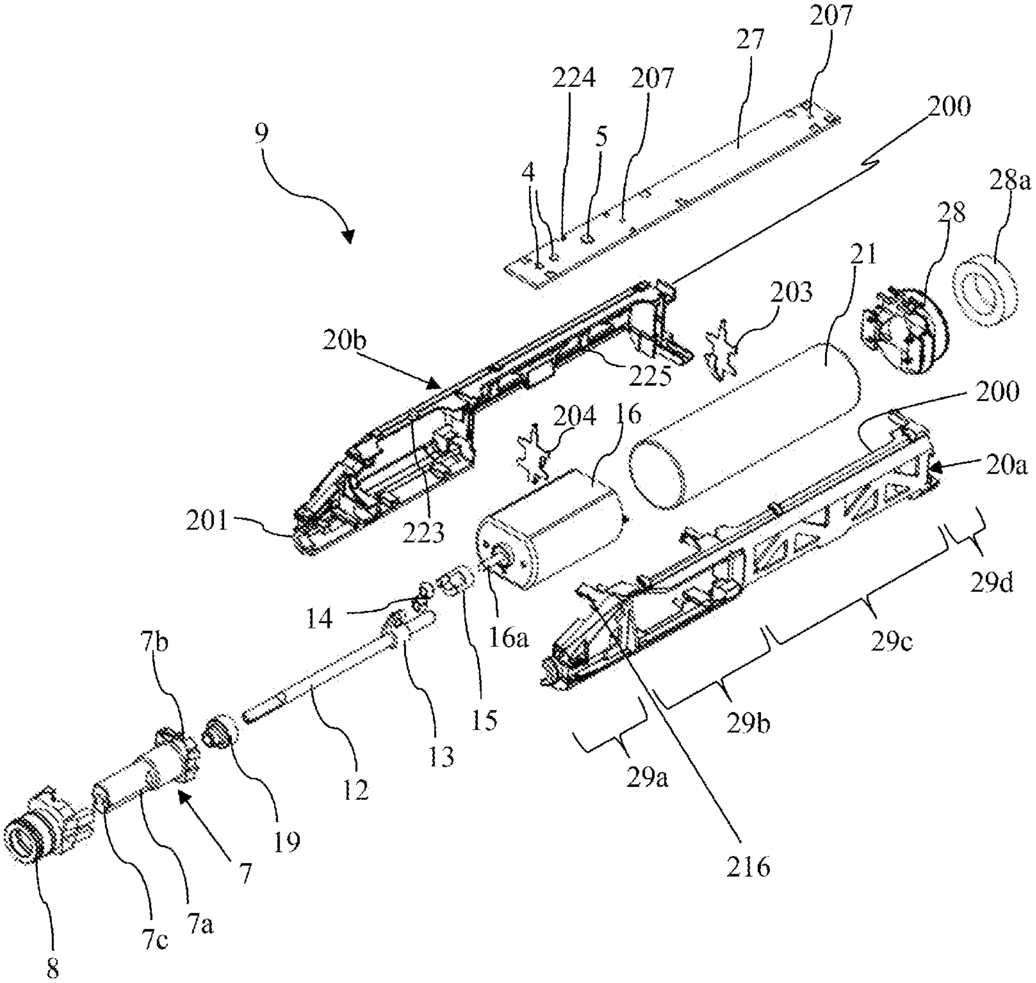
FIG. 39 shows an exploded top view of the interior of the handpiece of FIG. 35.
Figure 40:
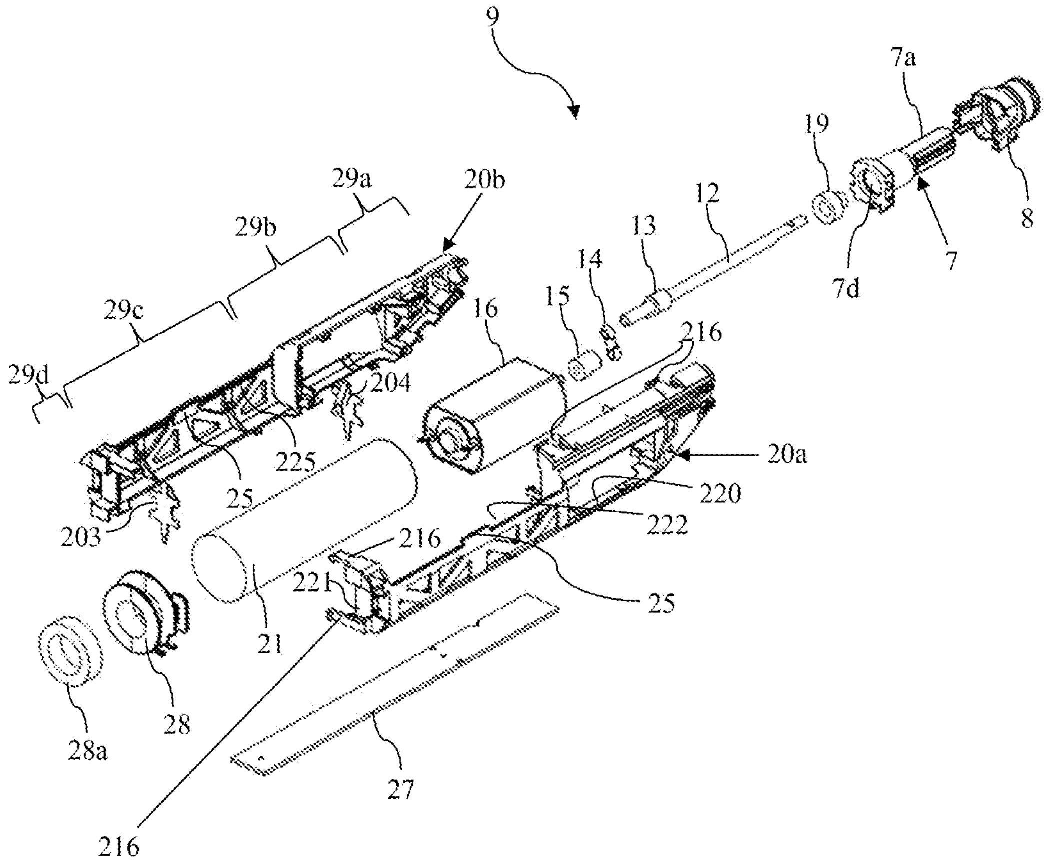
FIG. 40 shows an exploded view of the interior of the handpiece of FIG. 35 from below.

FIGS. 39 and 40 clearly illustrate the installation of the slide-in unit 9 for the electric toothbrush handpiece 2. In FIG. 39, the lug 223 on the frame unit and the corresponding recess 224 on the print plate 27 (see FIG. 35) can be seen once again. Furthermore, reference is made to the description of FIGS. 13 and 14.

Figure 41A:
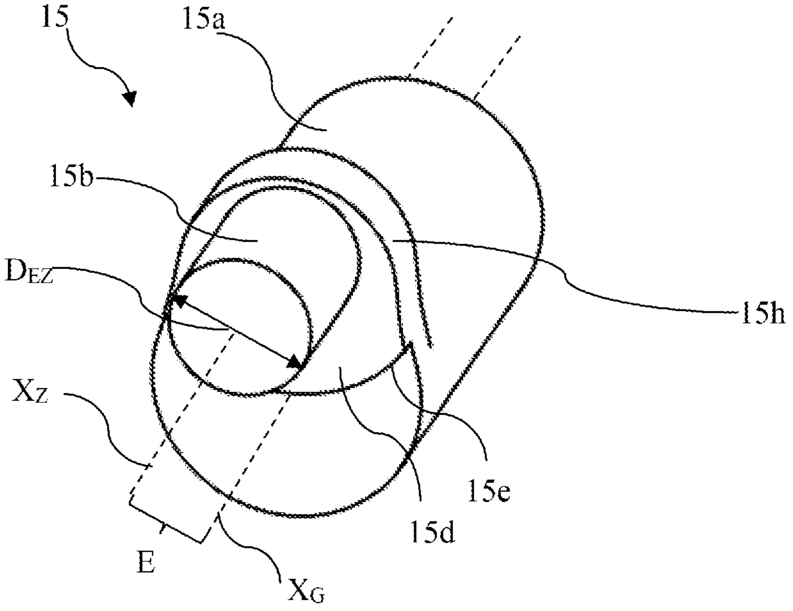
FIG. 41*a* shows a perspective view of an eccentric from a gear unit according to the invention in another embodiment from the front.
Figure 41B:
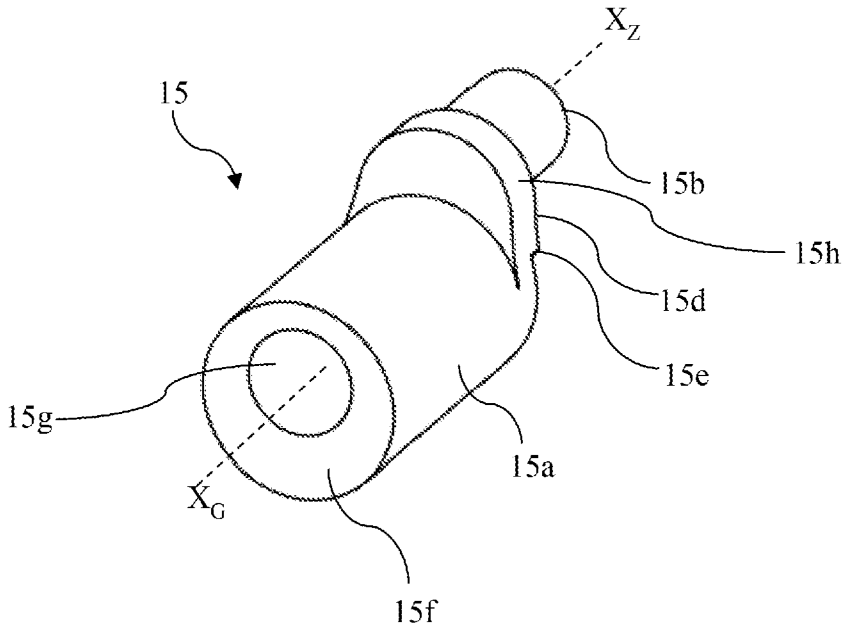
FIG. 41*b* shows a perspective view from behind of an eccentric of a gear unit according to the invention in an embodiment of FIG. 40*a*.

In FIGS. 41*a* and 41*b*, a variant of an eccentric 15 for the gear unit 11 of the electric toothbrush handpiece 2 for the oscillating variant is shown in individual view.

The eccentric 15 comprises a cylindrical main part 15*a*, on which—offset parallel to the main part axis XG—a cylindrical eccentric pin 15*b* with an eccentric pin axis XZ is arranged. The distance from the main part axis XG to the eccentric pin axis XZ forms the eccentricity E. The eccentricity E is between 0.2 mm and 3 mm and preferably between 0.3 mm and 2 mm. The connection between the main part 15*a* and the eccentric pin 15*b* occurs via a connecting surface 15*h*. In this case, the eccentric pin 15*b* is mounted on a pedestal-like elevation 15*d* on the connecting surface 15*h*. This ultimately allows the eccentric 15 to be arranged closer to a corresponding connecting rod of the gear unit, resulting in a particularly compact design of the gear unit. The eccentric pin 15*b* is arranged entirely on the pedestal-like elevation 15*d*.

The receiving opening 15*g* for the motor shaft is made in the rear side 15*f* of the eccentric 15. The main part axis XG may, but need not, coincide with the center axis of the main part 15*a*. The eccentric 15 rotates around the main part axis XG.

The structure of the eccentric 15 is designed in such a way that it has an improved structure with respect to the center of mass of the eccentric 15 due to the optimized volume of the body and thus also brings an optimized unbalance.

The main part 15*a* of the eccentric 15 has a length (from the pedestal-like elevation 15*d* to its rear end or rear face 15*f*) of from 4 mm to 9 mm preferably from 5.5 mm to 7.5 mm and a diameter of from 3 mm to 8 mm preferably from 3.5 mm to 5.5 mm.

The eccentric pin 15*b* of the eccentric 15 has a length of from 1 mm to 6 mm preferably from 2 mm to 4 mm and a diameter DEZ of from 1 mm to 4 mm preferably from 1.5 mm to 2.5 mm.

Figure 42A:
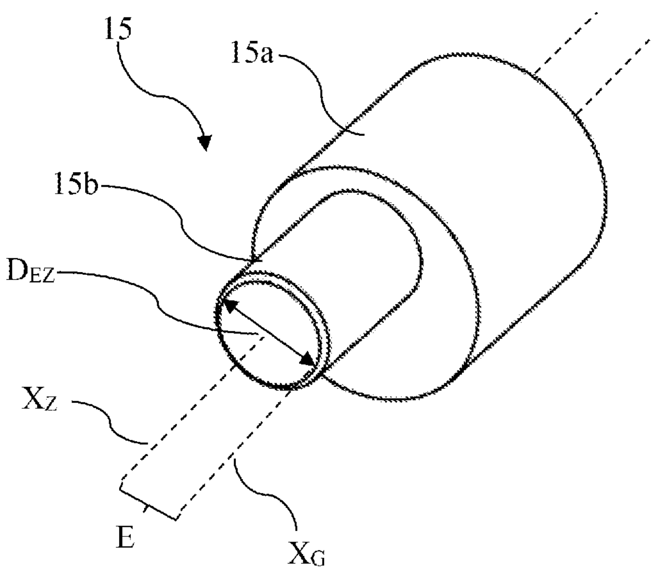
FIG. 42*a* shows a perspective view of an eccentric from a gear unit according to the invention in yet another embodiment from the front.
Figure 42B:
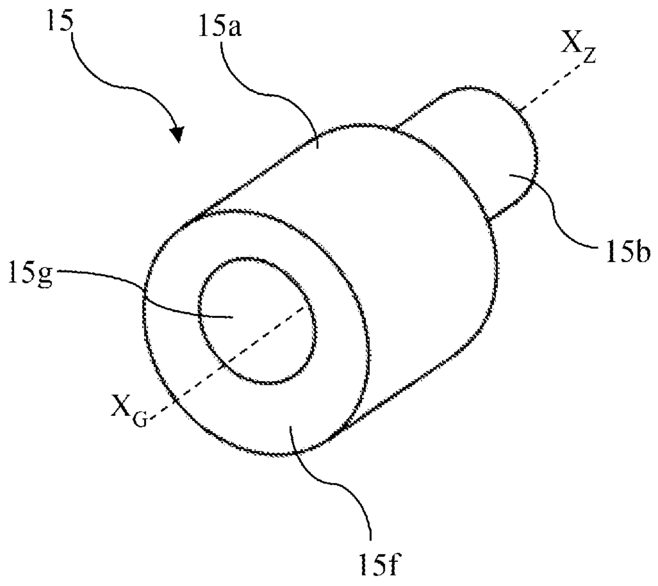
FIG. 42*b* shows a perspective view from behind of an eccentric of a gear unit according to the invention in an embodiment of FIG. 41*a*.

In FIGS. 42*a* and 42*b*, a variant of an eccentric 15 for the gear unit 11 of the electric toothbrush handpiece 2 for the sonic variant is shown in individual view.

The eccentric 15 comprises a cylindrical main part 15*a*, on which—offset parallel to the main part axis $X_G$—a cylindrical eccentric pin 15*b* with an eccentric pin axis $X_Z$ is arranged. The distance from the main part axis $X_G$ to the eccentric pin axis $X_Z$ forms the eccentricity E. The eccentricity E is between 0.2 mm and 3 mm and preferably between 0.3 mm and 2 mm.

The main part 15*a* of the eccentric 15 has a length of from 3 mm to 7 mm preferably from 3.5 mm to 5.5 mm and a diameter of from 3 mm to 8 mm preferably from 3.5 mm to 5.5 mm.

The eccentric pin 15*b* of the eccentric 15 has a length of from 1 mm to 6 mm preferably from 2 mm to 4 mm and a diameter $D_{EZ}$ of from 1 mm to 4 mm preferably from 1.5 mm to 2.5 mm.

The receiving opening 15*g* for the motor shaft is made in the rear side 15*f* of the eccentric 15. The main part axis XG may, but need not, coincide with the center axis of the main part 15*a*. The eccentric 15 rotates around the main part axis XG.

Figure 43:
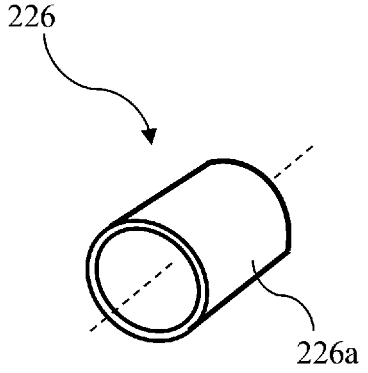
FIG. 43 shows a sleeve for the eccentric pin according to the invention, the articulation pin according to the invention or the connecting rod according to the invention or its bearing.

Finally, FIG. 43 shows an example of a sleeve 226 as it can be provided for the eccentric pin 15*b*, the articulation pin 13*a* and/or the connecting rod 14 or its bearings 14*a*, 14*b* (i.e. in particular if the latter are made of plastic) or can be fitted or inserted on the latter. The sleeve 226 is preferably designed in the form of a bearing or plain bearing sleeve, which improves the sliding properties of the moving parts of the gear unit. The sleeve 226 is preferably formed of metal, particularly brass. The sleeve 226 may further be open at both ends (i.e., approximately in the form of a tubular member) or closed at one end (i.e., approximately in the form of a thimble). The sleeve 226 preferably has a substantially cylindrical sidewall 226*a*.

Although the invention is illustrated and described in detail by means of the figures and the accompanying description, such illustration and detailed description are to be understood as illustrative and exemplary and do not limit the invention. In order not to obscure the invention, well-known structures and techniques may not be shown and described in detail in certain cases. It is understood that a person skilled in the art can make changes and modifications without departing from the scope of the following claims. In particular, the present invention covers further exemplary embodiments with any combinations of features that may deviate from the explicitly described feature combinations.

The present disclosure also includes embodiments having any combination of features that are mentioned or shown above or below with respect to various embodiments. It also includes individual features in the figures, even if they are shown there in connection with other features and/or are not mentioned above or below. Alternatives of embodiments described in the figures and the description and individual alternatives of their features can also be excluded from the subject matter of the invention or from the disclosed subject matter. The disclosure includes embodiments comprising exclusively the features described in the claims or in the exemplary embodiments and those comprising additional features.

Furthermore, the expression "comprise" and derivations thereof do not exclude other elements or steps. Likewise, the indefinite article "a" or "an" and derivations thereof do not exclude a plurality. The functions of several features listed in the claims can be performed by one unit or one step. The mere fact that certain measures are listed in different dependent claims does not mean that a combination of those measures cannot be used advantageously. The terms "substantially," "approximately," "about" and the like, when used in conjunction with a property or value, in particular also define precisely that property or that value. The terms "approximately" and "about," when used in connection with a given numerical value or range, can refer to a value or range that is within 20%, within 10%, within 5% or within 2% of the given value or range. All reference signs in the claims are not to be understood as limiting the scope of the claims.

LIST OF REFERENCE SIGNS

1 electric toothbrush
2 electric toothbrush handpiece (handpiece)
3 attachment brush
4 signal elements
5 on/off switch
6 housing
7 key element
7*a* key geometry
7*b* recess
7*c* second bearing device
7*d* interior geometry
8 sealing/damping element
8*a* guide rails
9 slide-in unit
10 drive unit
11 gear unit
12 drive shaft
12*a* front end drive shaft
12*b* rear end drive shaft
12*c* flattening
12*d* notch
13 articulation piece
13*a* articulation pin
14 connecting rod
14*a* first bearing
14*b* second bearing
14*c* rod element
15 eccentric
15*a* main part
15*b* eccentric pin
15*c* recesses
15*d* pedestal-like elevation

15*e* offset
15*f* rear side
15*g* receiving opening
15*h* connecting surface
16 electric motor
16*a* motor shaft
17 housing cover
18 opening
19 bellows seal
20 frame unit
20*a* first half-shell-like half
20*b* second half-shell-like half
21 energy source (battery)
22 first storage device
22*a* reinforcement rib
23 clamping arm
24 latching device (motor)
25 preload surfaces (battery zone)
26 holding device (coil)
27 print plate
28 coil carrier
28*a* charging coil
28*b* length compensation means
28*c* snap-on means (top)
28*d* snap-on means (bottom)
28*e* snap-on means (side)
29*a* gear unit zone
29*b* motor zone
29*c* energy source zone (battery zone)
29*d* coil zone
29*e* print zone
200 recess for print plate
201 snap element (front)
203 rear spring plate
203*a* first connecting piece
203*b* spring piece
204 front spring plate
204*a* first connecting piece
204*b* spring piece
207 recesses print plate
208 clamping arms for print plate
210 guide cylinder frame (positioning aids)
211 blind holes (positioning aids)
212 guide pin (front frame)
213 connecting webs
214 apertures
215 bump line (bottom)
216 snapping apparatuses
217 snap-in openings
218 retaining arms (spring plates)
219 cover
220 support struts
221 web
222 opening battery
223 lug (frame)
224 recess (print plate)
225 holding ribs
226 sleeve
226*a* side wall sleeve
30*a* head portion
30*b* neck portion
30*c* attachment portion
31 brush head
31*a* exit surface brushes
32 brush bundle (general)
32*a* brush bundle (first shape)
32*b* brush bundle (third shape)
32*c* brush bundle (second shape)
33*a* gaps
33*b* gaps
33*c* gaps
$D_A$ diameter drive shaft
$D_{EZ}$ diameter eccentric pin
$D_{GZ}$ diameter articulation pin
E eccentricity
H height brush bundle (outside)
$K_1$ inner circle
$K_2$ center circle
$K_3$ outer circle
$L_G$ gear unit length
$L_{GS}$ articulation piece length
S bevel
$X_B$ brush head axis
$X_G$ main part axis
$X_L$ longitudinal axis attachment brush
$X_Z$ eccentric pin axis
$X_P$ bearing axle connecting rod

What is claimed is:

1. An electric toothbrush handpiece comprising:
a housing;
a frame unit;
an energy source;
a key element; and
a drive unit with a gear unit and an electric motor, wherein
the housing surrounds the frame unit, the drive unit and the energy source,
the frame unit has at least a gear unit zone, a motor zone, and an energy source zone, wherein the gear unit zone is configured to receive the gear unit, the motor zone is configured to receive the electric motor, and the energy source zone is configured to receive the energy source,
the key element is arranged on a front part of the housing and preferably has a key geometry which is configured to couple with a corresponding key coupling geometry of an attachment brush,
the energy source is configured to supply the drive unit with energy, and
the drive unit is configured to generate a movement of a drive shaft of the gear unit, wherein the drive shaft extends through the key element and preferably has an axis geometry which is configured to couple with a corresponding axis coupling geometry of the attachment brush.

2. The electric toothbrush handpiece according to claim 1, wherein the gear unit zone has a first bearing device for a rear end of the drive shaft.

3. The electric toothbrush handpiece of claim 1, wherein the motor zone is configured to secure the electric motor.

4. The electric toothbrush handpiece according to claim 1, wherein the energy source zone has at least one preload surface configured to secure the energy source.

5. The electric toothbrush handpiece according to claim 1, wherein the frame unit has a coil zone configured to receive a coil carrier which is preferably formed of a soft component.

6. The electric toothbrush handpiece according to claim 5, wherein the coil carrier has a length compensating means, preferably elastic, which supports the frame unit relative to a housing cover of the handpiece.

7. The electric toothbrush handpiece according to claim 1, wherein the frame unit has a print zone which is configured to receive a print plate and which preferably comprises a recess in which the print plate is received.

8. The electric toothbrush handpiece according to claim 1, wherein the key element is configured to latch to the frame unit at its rear end facing the handpiece.

9. The electric toothbrush handpiece according to claim 1, wherein the frame unit comprises a first half-shell-like half and a second half-shell-like half.

10. The electric toothbrush handpiece according to claim 9, wherein the first half-shell-like half and the second half-shell-like half of the frame unit have positioning aids.

11. The electric toothbrush handpiece according to claim 1, wherein the key element has a through bore for the drive shaft and has a second bearing device for a front area of the drive shaft, wherein the second bearing device is preferably arranged at the end of the key element facing away from the handpiece.

12. The electric toothbrush handpiece according to claim 1, wherein the key element has an internal geometry in which is arranged a sealing element, preferably a bellows seal, which is configured to seal the housing against the drive shaft.

13. The electric toothbrush handpiece according to claim 1, wherein a sealing/damping element made of a soft component is attached to the end of the key element facing the frame unit, which sealing/damping element is configured to seal the housing against the key element and which sealing/damping element is configured to provide a damping bearing for the key element.

14. An electric toothbrush comprising an electric toothbrush handpiece according to claim 1 and an attachment brush.

15. A method of producing an electric toothbrush handpiece, comprising the following steps:

laying out a second half-shell-like half of a frame unit and a first half-shell-like half corresponding thereto;

installing a drive unit comprising an electric motor and a gear unit, wherein the electric motor is connected to the gear unit and the electric motor is positioned in a motor zone and the gear unit is positioned in a gear unit zone of the second half-shell-like half and secured therein;

optionally installing a rear and a front spring plate in the second half-shell-like half;

installing a print plate in a print zone of the second half-shell-like half;

installing the first half-shell-like half to the second half-shell-like half;

optionally installing a key element to the frame unit, wherein the key element is pushed on via the drive shaft and preferably latches with the frame unit;

optionally installing a coil carrier with a charging coil to the frame unit, wherein the coil carrier is attached to a rear end area of the frame unit;

optionally establishing electrical connections, wherein wires are preferably routed from the print plate to the electric motor (or vice versa) and the first connecting pieces of the rear and front spring plates and, if necessary, the ends of the cables of the charging coil are soldered to the print plate;

optionally installing an energy source, wherein the energy source is received in an energy source zone of the frame unit preferably in a clamped manner between a spring piece of the rear spring element and a spring piece of the front spring element; and optionally sliding in the frame unit into the housing of the handpiece.

16. The method according to claim 15, wherein the step of installing the drive unit further comprises connecting the gear unit having an eccentric, a connecting rod, a drive shaft, and a articulation piece securely connected to the drive shaft, to the electric motor by attaching the eccentric to a motor shaft of the electric motor and by attaching, preferably plugging on, the connecting rod to the eccentric and to the articulation piece securely connected to the drive shaft.

17. The method according to claim 16, wherein the step of installing the drive unit further comprises the drive shaft is locked in the gear unit zone of the first half-shell-like half and preferably further that it is mounted in a first bearing device of the gear unit zone.

18. The method according to claim 15, wherein a sealing element, preferably a bellows seal, is introduced into the key element prior to the step of optionally installing the key element.

19. The method according to claim 15, wherein after the step of optionally installing the key element, a sealing/damping element is attached to the frame unit, wherein the sealing/damping element is slid onto the key element and preferably latches to the frame unit.

20. The method according to claim 15, wherein in the step of sliding in the frame unit into the housing, the insertion of the frame unit into the housing of the handpiece is supported by insertion aids, preferably by insertion ribs, which are arranged laterally on the frame unit and/or laterally on the inner wall of the housing.

* * * * *